United States Patent
Ikai

(10) Patent No.: US 10,178,384 B2
(45) Date of Patent: Jan. 8, 2019

(54) IMAGE DECODING DEVICE, IMAGE CODING DEVICE, AND RESIDUAL PREDICTION DEVICE

(71) Applicant: SHARP KABUSHIKI KAISHA, Osaka-shi, Osaka (JP)

(72) Inventor: Tomohiro Ikai, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 230 days.

(21) Appl. No.: 15/103,971

(22) PCT Filed: Dec. 18, 2014

(86) PCT No.: PCT/JP2014/083566
§ 371 (c)(1),
(2) Date: Jun. 13, 2016

(87) PCT Pub. No.: WO2015/093565
PCT Pub. Date: Jun. 25, 2015

(65) Prior Publication Data
US 2016/0323573 A1    Nov. 3, 2016

(30) Foreign Application Priority Data

Dec. 19, 2013 (JP) .................................. 2013-262816
Mar. 7, 2014 (JP) .................................. 2014-044923

(51) Int. Cl.
*H04N 19/105* (2014.01)
*H04N 19/134* (2014.01)
(Continued)

(52) U.S. Cl.
CPC ......... *H04N 19/105* (2014.11); *H04N 19/134* (2014.11); *H04N 19/176* (2014.11);
(Continued)

(58) Field of Classification Search
CPC .. H04N 19/105; H04N 19/134; H04N 19/176; H04N 19/30; H04N 19/597; H04N 19/70; H04N 19/186
(Continued)

(56) References Cited

U.S. PATENT DOCUMENTS

| 2010/0290532 A1* | 11/2010 | Yamamoto | H04N 19/176 375/240.16 |
| 2014/0072041 A1* | 3/2014 | Seregin | H04N 19/00569 375/240.13 |
| 2014/0161189 A1* | 6/2014 | Zhang | H04N 19/597 375/240.16 |

FOREIGN PATENT DOCUMENTS

WO    WO 2014/089461 A1    6/2014

OTHER PUBLICATIONS

Ikai, "CE4-related: ARP simplification, Joint Collaborative Team on 3D Video Coding Extensions of ITU-T SG 16 WP 3 and ISO/IEC JTC 1/SC 29/WG 11", JCT3V-G0033_r2, pp. 1-3, Jan. 11-17, 2014, 7th Meeting: San Jose, US.
(Continued)

*Primary Examiner* — Marnie A Matt
(74) *Attorney, Agent, or Firm* — Birch, Stewart, Kolasch & Birch, LLP

(57) ABSTRACT

Residual prediction poses a problem that deriving a residual involves a large amount of processing for generating two motion-compensated images and deriving a difference. Provided is a residual prediction device including a reference image interpolation unit that derives two residual prediction motion-compensated images, and a residual synthesis unit that derives a residual from a difference between the two residual prediction motion-compensated images and derives a predicted image by adding the residual to a motion-compensated image, in which the residual synthesis unit derives a predicted image by adding the residual to the
(Continued)

motion-compensated image in a case where a target block size is greater than a predetermined size and derives the motion-compensated image as the predicted image in a case where the target block size is less than or equal to a predetermined size.

7 Claims, 18 Drawing Sheets

(51) Int. Cl.
*H04N 19/176* (2014.01)
*H04N 19/597* (2014.01)
*H04N 19/30* (2014.01)
*H04N 19/70* (2014.01)
*H04N 19/186* (2014.01)

(52) U.S. Cl.
CPC .......... *H04N 19/30* (2014.11); *H04N 19/597* (2014.11); *H04N 19/70* (2014.11); *H04N 19/186* (2014.11)

(58) Field of Classification Search
USPC ..................................... 375/240.12
See application file for complete search history.

(56) References Cited

OTHER PUBLICATIONS

Tech et al., "3D-HEVC Draft Text 2, Joint Collaborative Team on 3D Video Coding Extension Development of ITU-T SG 16 WP 3 and ISO/IEC JTC 1/SC 29/WG 11", JCT3V-F1001-v4, pp. 1-94, Oct. 25-Nov. 1, 2013, 6th Meeting: Geneva, CH.

Zhang et al., "3D-CE4: Advanced residual prediction for multiview coding, Joint Collaborative Team on 3D Video Coding Extension Development of ITU-T SG 16 WP 3 and ISO/IEC JTC 1/SC 29/WG 11", JCT3V-C0049, pp. 1-6, Jan. 2013, 3rd Meeting: Geneva, CH.

Zhang et al., "CE4: Further improvements on advanced residual prediction, Joint Collaborative Team on 3D Video Coding Extensions of ITU-T SG 16 WP 3 and ISO/IEC JTC 1/SC 29/WG 11", JCT3V-G0121, pp. 1-5, Jan. 11-17, 2014, 7th Meeting: San José.

* cited by examiner

FIG. 1
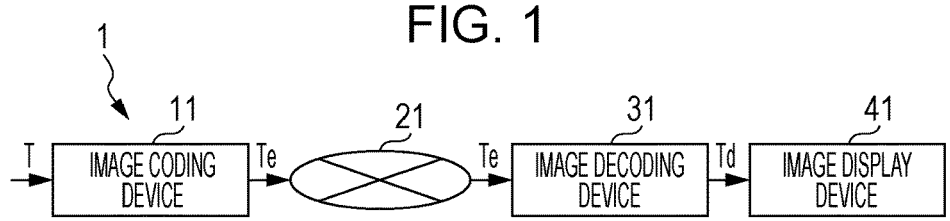
FIG. 2
(a) SEQUENCE LAYER 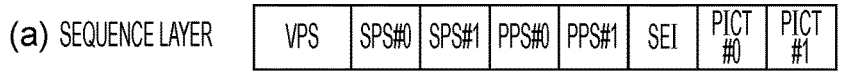
(b) PICTURE LAYER 
(c) SLICE LAYER 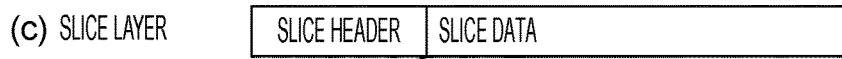
(d) SLICE DATA LAYER 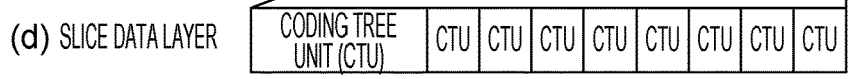
(e) CODING TREE LAYER
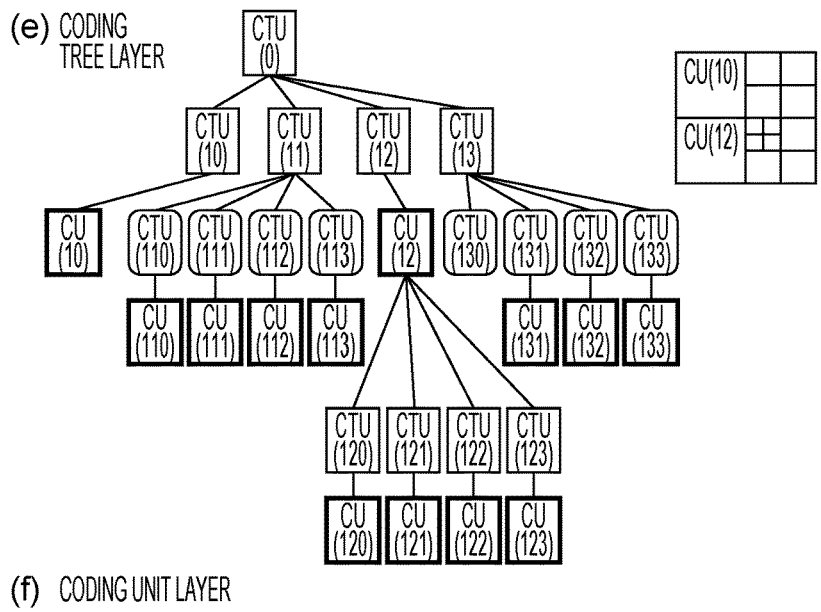
(f) CODING UNIT LAYER
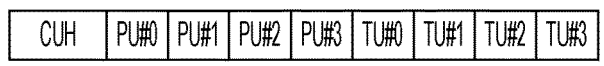
FIG. 3
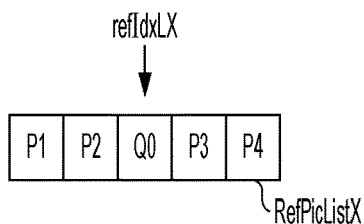

FIG. 12
(a) IN CASE OF height % 8 ! = 0
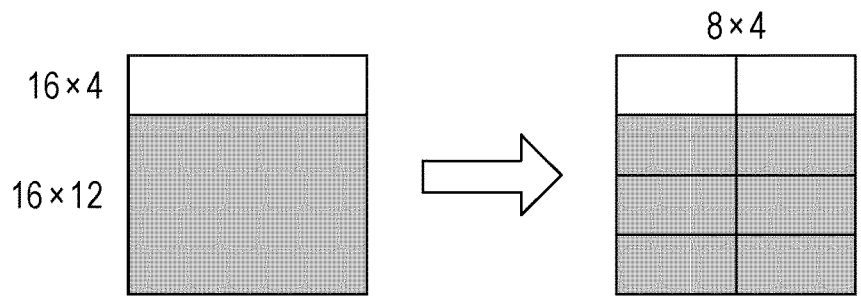
(b) IN CASE OF width % 8 ! = 0
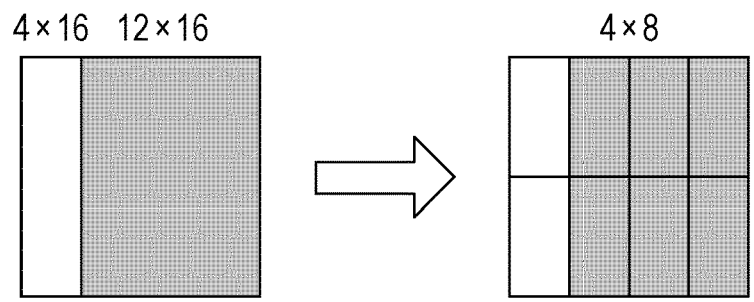
(c) OTHERWISE
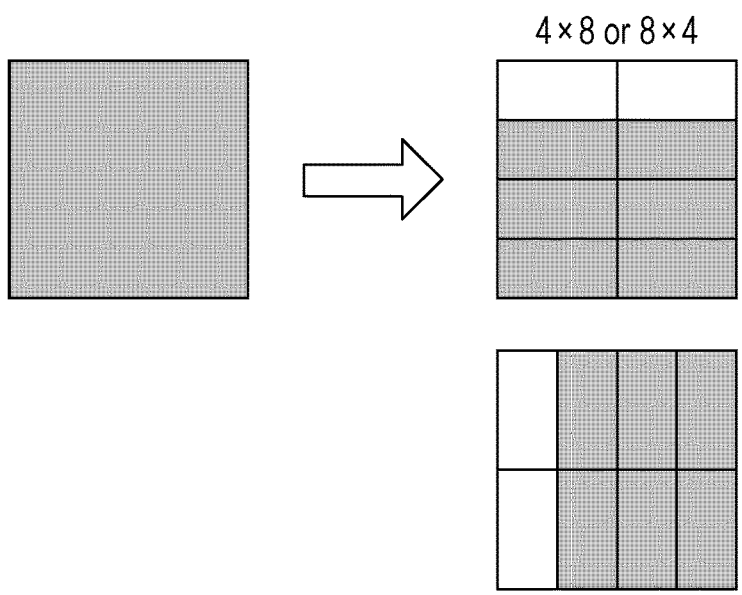

FIG. 17
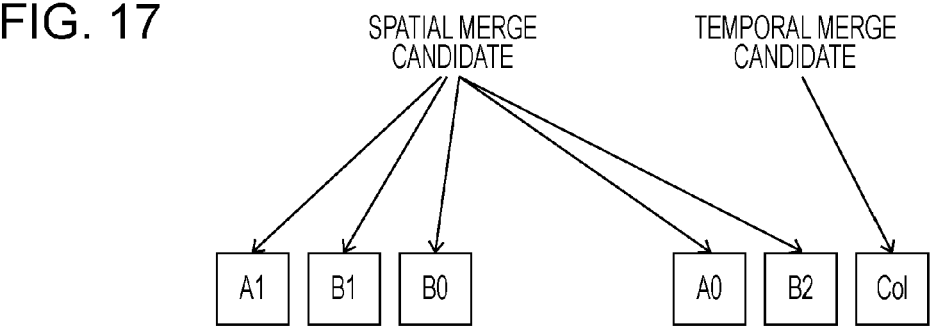
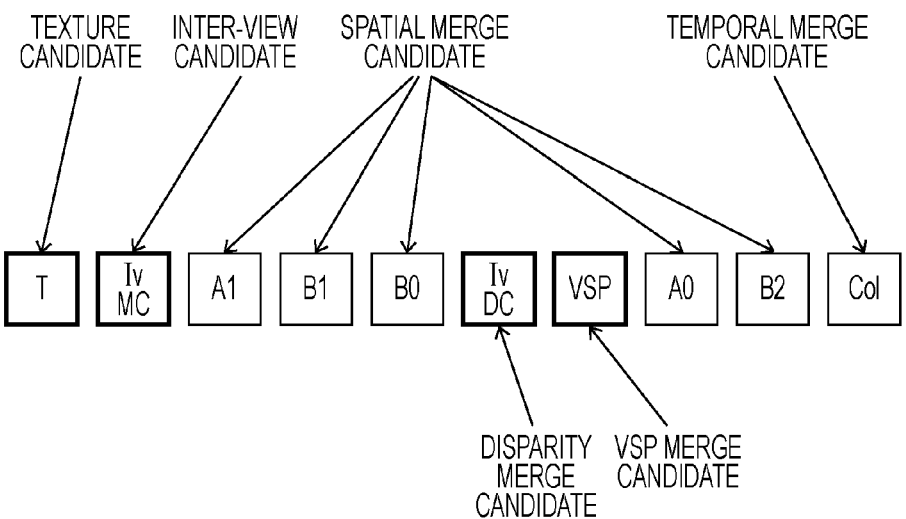
FIG. 18
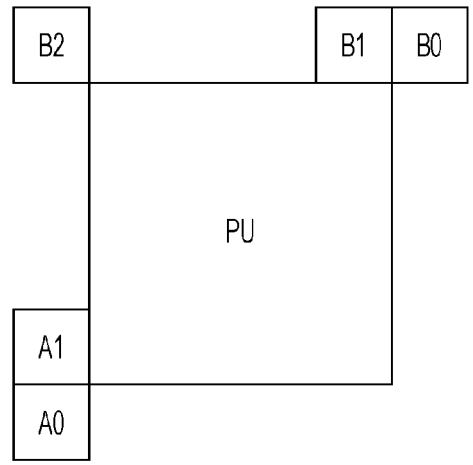

FIG. 23
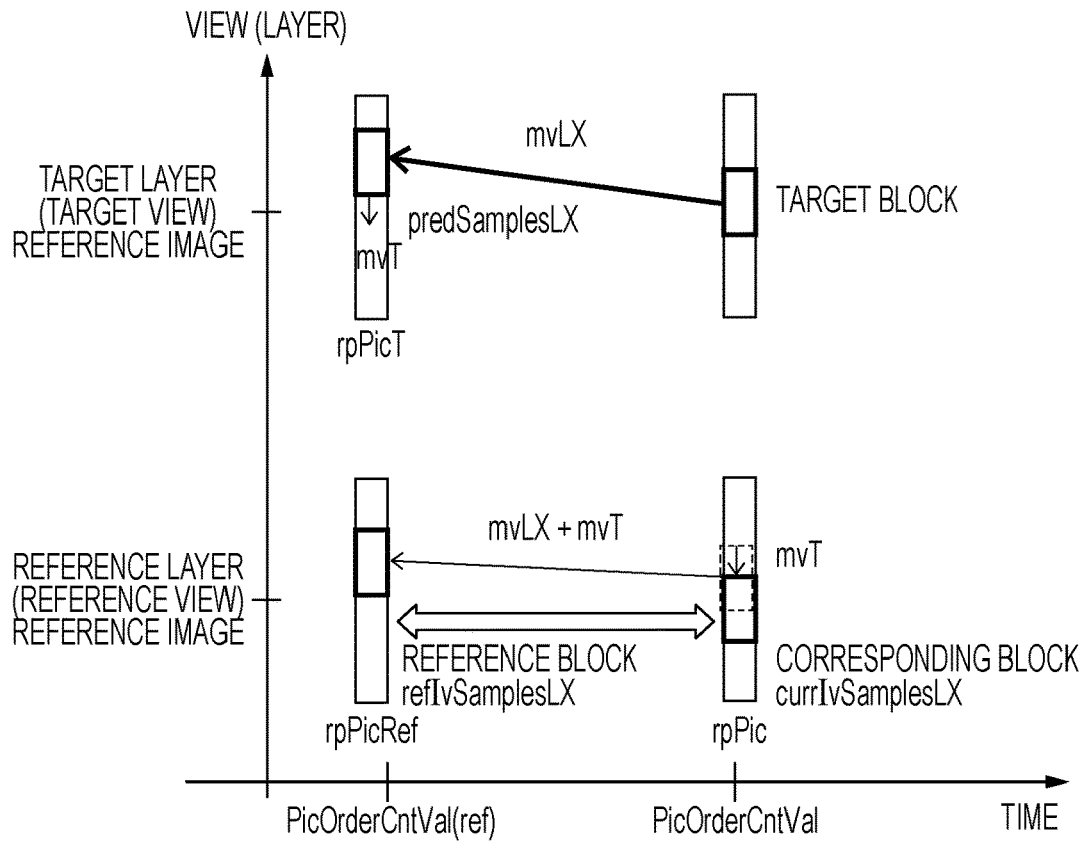
FIG. 24
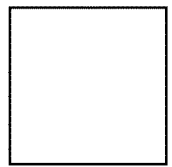
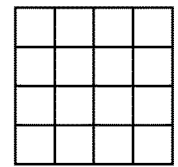

IMAGE DECODING DEVICE, IMAGE CODING DEVICE, AND RESIDUAL PREDICTION DEVICE

TECHNICAL FIELD

The present invention relates to an image decoding device and an image coding device.

BACKGROUND ART

In multiple-viewpoint image coding technologies, there is suggested disparity prediction coding that reduces the amount of information by predicting a disparity between images upon multiple-viewpoint image coding, and also suggested is a decoding method corresponding to the coding method. A vector that represents a disparity between viewpoint images is referred to as a disparity vector. The disparity vector is a two-dimensional vector having a horizontal element (x component) and a vertical element (y component) and is calculated for each block that is a split region of one image. Obtaining multiple-viewpoint images generally uses a camera that is arranged at each viewpoint. In multiple-viewpoint image coding, each viewpoint image is coded as different layers in a plurality of layers. A coding method for a moving image configured of a plurality of layers is generally referred to as scalable coding or hierarchical coding. In the scalable coding, high coding efficiency is realized by performing prediction between layers. A layer that serves as a reference and for which prediction between layers is not performed is referred to as a base layer, and a layer other than the base layer is referred to as an enhancement layer. The scalable coding in a case where a layer is configured of viewpoint images is referred to as view scalable coding. In this case, the base layer is referred to as a base view, and the enhancement layer is referred to as a non-base view. In addition to the view scalable coding, the scalable coding in a case where a layer is configured of a texture layer (image layer) and a depth layer (distance image layer) is referred to as three-dimensional scalable coding.

Types of scalable coding include, in addition to the view scalable coding, spatial scalable coding (processing a low-resolution picture as the base layer and a high-resolution picture as the enhancement layer), SNR scalable coding (processing a low-quality picture as the base layer and a high-resolution picture as the enhancement layer), and the like. In the scalable coding, a picture of the base layer, for example, may be used as a reference picture in coding of a picture of the enhancement layer.

In NPL 1, there is known a technology referred to as view synthesis prediction that obtains a high-accuracy predicted image by splitting a prediction unit into small sub-blocks and performing prediction using a disparity vector for each sub-block. In addition, in NPL 1, there is known a technology referred to as residual prediction that estimates a residual using an image of a view different from a target view and adds the residual. In addition, in NPL 1, there is known a technology that derives enhancement merge candidates such as an inter-view merge candidate.

In NPL 2, there is known a technology that further splits a residual prediction block into a plurality of sub-blocks. In addition, in NPL 2, there is known a technology that improves the accuracy of a disparity vector in residual prediction performed in a time direction using a vector of a block of a picture different from a picture belonging to a target block (target picture) that has the same view ID as the target block.

CITATION LIST

Non Patent Literature

NPL 1: 3D-HEVC Draft Text 2, JCT3V-F1001-v4, JCT-3V 6th Meeting: CH, 25 Oct.-1 Nov. 2013 (published 14 Dec. 2013)

NPL 2: CE4: Further improvements on advanced residual prediction, JCT3V-G0121-v1, JCT-3V 7th Meeting: CH, 25 Oct.-1 Nov. 2013 (published 3 Jan. 2014)

SUMMARY OF INVENTION

Technical Problem

The residual prediction of NPL 1 poses a problem in that deriving a residual involves a large amount of processing for generating two motion-compensated images and deriving a difference. In particular, in a case where the block size is small, generating a motion-compensated image involves a large amount of overhead for image transmission and interpolation, thereby posing the problem of an increase in the worst-case amount of processing.

In NPL 2, the block size is decreased because of splitting into sub-blocks, thereby posing the problem of a further increase in the amount of processing.

Solution to Problem

One aspect of the present invention is a residual prediction device characterized by including a reference image interpolation unit that derives two residual prediction motion-compensated images and a residual synthesis unit that derives a residual from a difference between the two residual prediction motion-compensated images and derives a predicted image by adding the residual to an interpolated image, in which the residual synthesis unit derives a predicted image by adding the residual to the motion-compensated image in a case where a target block size is greater than a predetermined block size and derives the interpolated image as a predicted image in a case where the target block size is less than or equal to the predetermined size.

Advantageous Effects of Invention

According to the present invention, the effect of reducing the amount of processing is achieved because a case of performing residual prediction is limited according to a block size. Furthermore, the effect of suppressing degradation of coding due to the limitation according to a block size and reducing the amount of processing is achieved by splitting a luma block into sub-blocks and performing residual prediction and by performing residual prediction without splitting a chroma block into sub-blocks. Furthermore, the effect of suppressing degradation of coding due to the limitation according to a block size and reducing the amount of processing is achieved by updating a disparity vector in a case where disparity prediction is not performed for the target block (in a case where ivRefFlag is equal to 0).

BRIEF DESCRIPTION OF DRAWINGS

FIG. 1 is a schematic diagram illustrating a configuration of an image transmission system according to an embodiment of the present invention.

FIG. 2 is a diagram illustrating a hierarchical structure of data of a coded stream according to the present embodiment.

FIG. 3 is a conceptual diagram illustrating an example of a reference picture list.

FIG. 12 is a diagram illustrating a splitting method for a sub-block in a view synthesis unit.

FIG. 17 is a diagram illustrating an example of a merge candidate list.

FIG. 18 is a diagram illustrating a position of a neighbouring block referenced by a spatial merge candidate.

FIG. 23 is a diagram illustrating operation of a residual prediction unit 3092B of the present embodiment.

FIG. 24 is a diagram illustrating operation of a residual prediction unit 3092C of the present embodiment.

DESCRIPTION OF EMBODIMENTS

First Embodiment

Figure 4:
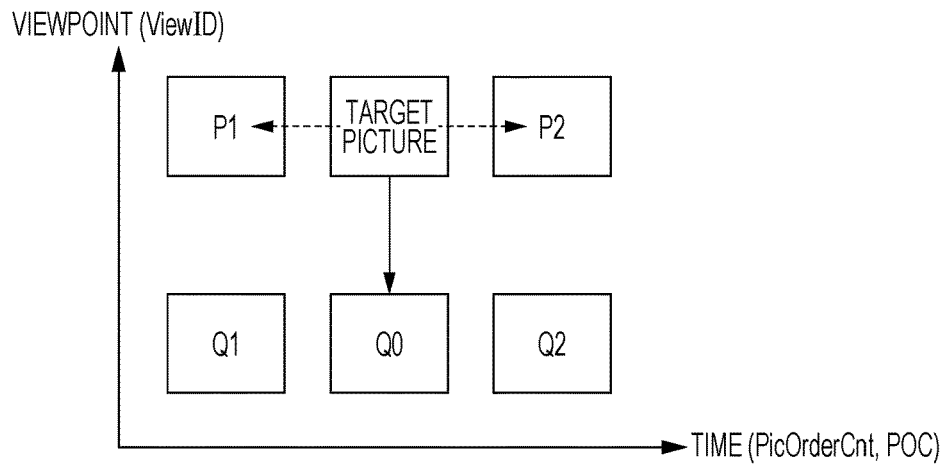
FIG. 4 is a conceptual diagram illustrating an example of a reference picture.

Hereinafter, an embodiment of the present invention will be described with reference to the drawings.

FIG. 1 is a schematic diagram illustrating a configuration of an image transmission system 1 according to the present embodiment.

The image transmission system 1 is a system that transmits a code in which a plurality of layer images is coded and displays an image decoded from the transmitted code. The image transmission system 1 is configured to include an image coding device 11, a network 21, an image decoding device 31, and an image display device 41.

A signal T that indicates a plurality of layer images (referred to as texture images) is input into the image coding device 11. A layer image is an image that is visually recognized or captured at a certain viewpoint and at a certain resolution. In a case of performing view scalable coding that codes a three-dimensional image using a plurality of layer images, each of the plurality of layer images is referred to as a viewpoint image. A viewpoint corresponds to a position of a capturing device or a point of observation. For example, multiple viewpoint images are images that are respectively captured by left and right capturing devices directed toward an object. The image coding device 11 codes each signal to generate a coded stream Te (coded data). Details of the coded stream Te will be described later. A viewpoint image is a two-dimensional image (planar image) that is observed at a certain viewpoint. The viewpoint image is represented by, for example, a luminance value or a color signal value for each pixel arranged in a two-dimensional plane. Hereinafter, one viewpoint image or a signal that represents the viewpoint image will be referred to as a picture. In a case of performing spatial scalable coding using a plurality of layer images, the plurality of layer images is configured of a low-resolution base layer image and a high-resolution enhancement layer image. In a case of performing SNR scalable coding using a plurality of layer images, the plurality of layer images is configured of a low-quality base layer image and a high-quality enhancement layer image. The view scalable coding, spatial scalable coding, and SNR scalable coding may be arbitrarily combined and performed. The present embodiment deals with coding and decoding of images that include at least a base layer image and an image (enhancement layer image) other than the base layer image as a plurality of layer images. Of two layers of the plurality of layers that are in a reference relationship (dependency relationship) with respect to images or coding parameters, the image that is referenced is referred to as a first layer image, and the image that references is referred to as a second layer image. For example, in a case where there is an enhancement layer image (other than the base layer) that is coded by referencing the base layer, the base layer image is regarded as the first layer image, and the enhancement layer image is regarded as the second layer image. Examples of the enhancement layer image include an image of a viewpoint other than a base view, a depth image, and the like.

A depth image (referred to as a depth map or "distance image") is an image signal that is configured of a signal value (pixel value), for each pixel arranged in a two-dimensional plane, corresponding to the distance from a viewpoint (capturing device and the like) to an object or a background included in an object plane (referred to as "depth value", "depth", or the like). A pixel constituting the depth image corresponds to a pixel constituting the viewpoint image. Therefore, the depth map serves as a clue for representing a three-dimensional object plane using a viewpoint image, an image signal that serves as a reference and is obtained by projecting the object plane on a two-dimensional plane.

The network 21 transmits the coded stream Te generated by the image coding device 11 to the image decoding device 31. The network 21 is either the Internet, a wide area network (WAN) or a small-scale network (local area network; LAN) or a combination thereof. The network 21 is not necessarily limited to a bi-directional communication network and may be a uni-directional or bi-directional communication network that transmits a broadcast wave of terrestrial digital broadcasting, satellite broadcasting, and the like. The network 21 may be replaced by a storage medium in which the coded stream Te is recorded, such as a digital versatile disc (DVD) or a Blue-ray Disc (BD).

The image decoding device 31 decodes each coded stream Te transmitted by the network 21 to generate a plurality of decoded layer images Td (decoded viewpoint images Td).

The image display device 41 displays all or a part of the plurality of decoded layer images Td generated by the image decoding device 31. For example, in the view scalable coding, a three-dimensional image (stereoscopic image) or a free viewpoint image is displayed in a case of displaying all, and a two-dimensional image is displayed in a case of displaying a part. The image display device 41 includes a display device such as a liquid crystal display or an organic electroluminescence (EL) display. In the spatial scalable coding and SNR scalable coding, a high-quality enhancement layer image is displayed in a case where the image decoding device 31 and the image display device 41 have high processing capabilities, and the base layer image that does not require a processing capability and a display capability as high as those for the enhancement layer is displayed in a case where the image decoding device 31 and the image display device 41 have lower processing capabilities.

<Structure of Coded Stream Te>

Prior to detailed descriptions of the image coding device 11 and the image decoding device 31 according to the present embodiment, a data structure of the coded stream Te generated by the image coding device 11 and decoded by the image decoding device 31 will be described.

FIG. 2 is a diagram illustrating a hierarchical structure of data in the coded stream Te. The coded stream Te illustratively includes a sequence and a plurality of pictures constituting the sequence. FIGS. 2(a) to 2(f) are diagrams respectively illustrating a sequence layer that predefines a sequence SEQ, a picture layer that defines a picture PICT, a slice layer that defines a slice S, a slice data layer that defines slice data, a coding tree layer that defines a coding tree unit included in the slice data, and a coding unit layer that defines a coding unit (CU) included in the coding tree.

(Sequence Layer)

The sequence layer defines a set of data that is referenced by the image decoding device 31 in order to decode a processing target sequence SEQ (hereinafter, referred to as a target sequence). The sequence SEQ, as illustrated in FIG. 2(a), includes a video parameter set, a sequence parameter set SPS, a picture parameter set PPS, the picture PICT, and supplemental enhancement information SEI. A value that appears after # indicates a layer ID. While FIG. 2 illustrates an example in which there exists coded data of #0 and #1, that is, a layer 0 and a layer 1, types and the number of layers are not limited thereto.

A video parameter set VPS defines a set of coding parameters that are common for a plurality of moving images, each moving image being configured of a plurality of layers, and a set of coding parameters that are related to the plurality of layers and each individual layer included in the moving images.

The sequence parameter set SPS defines a set of coding parameters that are referenced by the image decoding device 31 in order to decode the target sequence. For example, the width and height of a picture are defined.

The picture parameter set PPS defines a set of coding parameters that are referenced by the image decoding device 31 in order to decode each picture in the target sequence. For example, a reference value (pic_init_qp_minus26) of a quantization range used in decoding of a picture and a flag (weighted_pred_flag) that indicates whether or not to apply weighted prediction are included. The PPS may exist in plural quantities. In that case, one of the plurality of PPSs is selected from each picture in the target sequence.

(Picture Layer)

The picture layer defines a set of data that is referenced by the image decoding device 31 in order to decode a processing target picture PICT (hereinafter, referred to as a target picture). The picture PICT, as illustrated in FIG. 2(b), includes slices S0 to SNS−1 (NS is the total number of slices included in the picture PICT).

Hereinafter, in a case where the slices S0 to SNS−1 are not required to be distinguished from each other, the suffixes of the reference signs thereof may be omitted. The same applies to other data that is data included in the coded stream Te described below and to which suffixes are appended.

(Slice Layer)

The slice layer defines a set of data that is referenced by the image decoding device 31 in order to decode a processing target slice S (referred to as a target slice). The slice S, as illustrated in FIG. 2(c), includes a slice header SH and slice data SDATA.

The slice header SH includes a coding parameter group that is referenced by the image decoding device 31 in order to determine a decoding method for the target slice. Slice type specification information (slice_type) that specifies a slice type is an example of the coding parameters included in the slice header SH.

Slice types that can be specified by the slice type specification information are exemplified by (1) an I slice for which only intra prediction is used upon coding, (2) a P slice for which either uni-directional prediction or intra prediction is used upon coding, (3) a B slice for which either uni-directional prediction, bi-directional prediction, or intra prediction is used upon coding, and the like.

The slice header SH may include a reference (pic_parameter_set_id) to the picture parameter set PPS that is included in the sequence layer.

(Slice Data Layer)

The slice data layer defines a set of data that is referenced by the image decoding device 31 in order to decode processing target slice data SDATA. The slice data SDATA, as illustrated in FIG. 2(d), includes coded tree blocks (CTBs). A CTB is a block of a fixed size (for example, 64×64) constituting a slice and may be referred to as a largest cording unit (LCU).

(Coding Tree Layer)

The coding tree layer, as illustrated in FIG. 2(e), defines a set of data that is referenced by the image decoding device 31 in order to decode a processing target coding tree block. A coding tree unit is split by recursive quadtree subdivision. Nodes of a tree structure obtained by the recursive quadtree subdivision are referred to as a coding tree. An intermediate node of the quadtree is a coded tree unit (CTU), and the coding tree block itself is also defined as the highest CTU. The CTU includes a split flag (split_flag) and is split into four coding tree units CTUs in a case where split_flag is equal to 1. In a case where split_flag is equal to 0, the coding tree unit CTU is split into four coded units (CUs). The coding unit CU is a terminal node of the coding tree layer and is not split anymore in this layer. The coding unit CU is the base unit of a coding process.

The size of the coding unit CU may be one of 64×64 pixels, 32×32 pixels, 16×16 pixels, and 8×8 pixels in a case where the size of the coding tree block CTB is 64×64 pixels.

(Coding Unit Layer)

The coding unit layer, as illustrated in FIG. 2(f), defines a set of data that is referenced by the image decoding device 31 in order to decode a processing target coding unit. Specifically, the coding unit is configured of a CU header CUH, a prediction tree, a transform tree, and a CU header CUF. The CU header CUH defines, for example, whether the coding unit is a unit for which intra prediction is used or a unit for which inter prediction is used. The CU header CUH includes a residual prediction index iv_res_pred_weight_idx that indicates a weight used in residual prediction (or indicates whether or not to perform residual prediction) and an illuminance compensation flag ic_flag that indicates whether or not to use illuminance-compensated prediction. The coding unit is the root of the prediction tree (PT) and the transform tree (TT). The CU header CUF is included between the prediction tree and the transform tree or after the transform tree.

In the prediction tree, a coding unit is split into one or a plurality of prediction blocks, and the position and the size of each prediction block are defined therein. In other words, a prediction block is one or a plurality of non-overlapping regions constituting the coding unit. The prediction tree includes one or a plurality of prediction blocks obtained by the above splitting.

A prediction process is performed for each prediction block. Hereinafter, the prediction block that is the unit of prediction will be referred to as a prediction unit (PU). More specifically, since prediction is performed in units of color components, hereinafter, a block for each color component such as a luma prediction block and a chroma prediction block will be referred to as a prediction block, and blocks of a plurality of color components (luma prediction block and chroma prediction block) will be collectively referred to as a prediction unit. A block of which an index cIdx (colour_component Idx) that indicates types of color components is equal to 0 represents a luma block (luma prediction block) (usually represented as L or Y), and blocks of which cIdx is equal to 1 and two respectively represent Cb and Cr chroma blocks (chroma prediction blocks).

Splitting in the prediction tree is broadly of two types, splitting in a case of intra prediction and splitting in a case of inter prediction. Intra prediction is prediction within the same picture, and inter prediction refers to a prediction process that is performed between different pictures (for example, between different display times or between different layer images).

In a case of intra prediction, types of splitting methods include 2N×2N (the same size as the coding unit) and N×N.

In a case of inter prediction, a splitting method is coded by a partition mode part_mode of the coded data. The partition mode specified by the partition mode part_mode has the following total eight types of patterns, given that the size of the target CU is 2N×2N pixels. That is, the patterns are four symmetric splittings of 2N×2N pixels, 2N×N pixels, N×2N pixels, and N×N pixels and four asymmetric motion partitions (AMPS) of 2N×nU pixels, 2N×nD pixels, nL×2N pixels, and nR×2N pixels. N is equal to $2^m$ (m is an arbitrary integer greater than or equal to 1). Hereinafter, a prediction block for which the partition mode is an asymmetric motion partition will be referred to as an AMP block. Since the number of splitting is either one, two, or four, one to four PUs are included in the CU. These PUs will be represented in order as PU0, PU1, PU2, and PU3.

FIGS. 9(a) to 9(h) specifically illustrate the position of boundaries of PU splitting in the CU for each partition mode.

Figure 9:
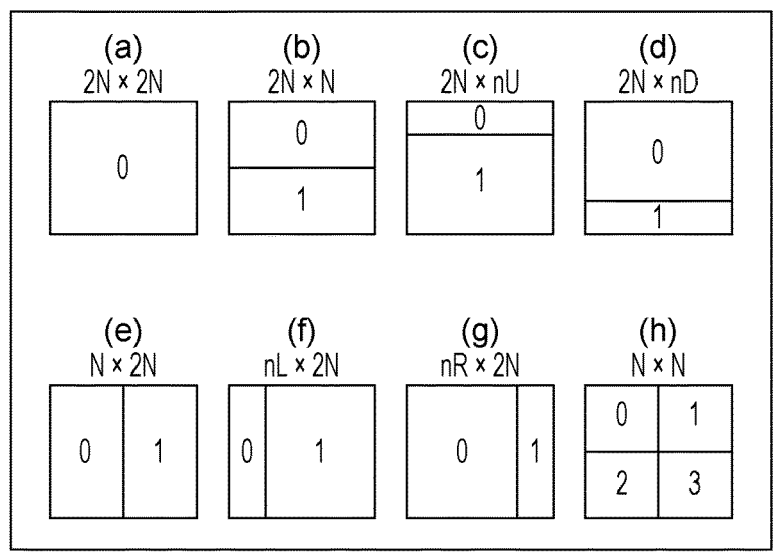
FIG. 9 is a diagram illustrating a pattern for a partition mode, and FIG. 9(a) to FIG. 9(h) respectively illustrate partitioning forms in a case where a partition mode is 2N×2N, 2N×N, 2N×nU, 2N×nD, N×2N, nL×2N, nR×2N, and N×N.

FIG. 9(a) illustrate the partition mode of 2N×2N in which the CU is not split. FIGS. 9(b) and 9(e) respectively illustrate partitioning forms in a case where the partition mode is 2N×N and N×2N. FIG. 9(h) illustrates a partitioning form in a case where the partition mode is N×N.

FIGS. 9(c), 9(d), 9(f), and 9(g) respectively illustrate partitioning forms in a case of 2N×nU, 2N×nD, nL×2N, and nR×2N which are asymmetric motion partitions (AMPs).

In FIGS. 9(a) to 9(h), numbers assigned to each region represent identification numbers of the regions, and processing is performed in the regions in order of this identification number. That is, the identification number represents the scan order of the regions.

Seven types of the eight types of partition modes other than N×N (FIG. 9(h)) are defined for prediction blocks in a case of inter prediction.

The specific value of N is defined by the size of the CU to which the PU belongs, and the specific values of nU, nD, nL, and nR are determined according to the value of N. For example, a CU of 32×32 pixels can be split into inter prediction blocks of 32×32 pixels, 32×16 pixels, 16×32 pixels, 32×16 pixels, 32×8 pixels, 32×24 pixels, 8×32 pixels, and 24×32 pixels.

In the transform tree, a coding unit is split into one or a plurality of transform blocks, and the position and the size of each transform block are defined therein. In other words, a transform block is one or a plurality of non-overlapping regions constituting the coding unit. The transform tree includes one or a plurality of transform blocks obtained by the above splitting.

Types of splitting in the transform tree include allocation a region of the same size as the coding unit as the transform block and recursive quadtree subdivision as in the above splitting of tree blocks.

A transform process is performed for each transform block. Hereinafter, the transform block that is the unit of transformation will be referred to as a transform unit (TU).

(Prediction Parameter)

A predicted image of the prediction unit is derived by prediction parameters pertaining to the prediction unit. Types of prediction parameters include prediction parameters for intra prediction and prediction parameters for inter prediction. Hereinafter, the prediction parameters for inter prediction (inter prediction parameters) will be described. The inter prediction parameters are configured of prediction list utilization flags predFlagL0 and predFlagL1, reference picture indexes refIdxL0 and refIdxL1, and vectors mvL0 and mvL1. The prediction list utilization flags predFlagL0 and predFlagL1 are flags that respectively indicate whether or not reference picture lists referred to as an L0 list and an L1 list are used, and the corresponding reference picture list is used in a case where the value thereof is equal to 1. In a case where the expression "flag that indicates whether or not XX" is used in the present specification, the number one will be regarded as indicating that XX is true, and the number zero will be regarded as indicating that XX is not true. In logical complements, logical products, and the like, the number one will be regarded as true, and the number zero will be regarded as false (the same applies hereinafter). However, in real-world devices and methods, other values can be used for true and false values. In a case of using the two reference picture lists, that is, in a case of (predFlagL0, predFlagL1)=(1, 1), this corresponds to bi-prediction. In a case of using one reference picture list, that is, in a case of either (predFlagL0, predFlagL1)=(1, 0) or (predFlagL0, predFlagL1)=(0, 1), this corresponds to uni-prediction. Information of the prediction list utilization flag can also be represented by an inter prediction flag inter_pred_idc described later. Usually, the prediction list utilization flag is used in a predicted image generation unit and a prediction parameter memory described later, and the inter prediction flag inter_pred_idc is used in a case of decoding information as to which reference picture list is used from the coded data.

Syntax elements for deriving the inter prediction parameters included in the coded data include, for example, the partition mode part_mode, a merge flag merge_flag, a merge index merge_idx, the inter prediction flag inter_pred_idc, a reference picture index refIdxLX, a predicted vector flag mvp_LX_flag, and a difference vector mvdLX.

(Example of Reference Picture List)

Figure 5:
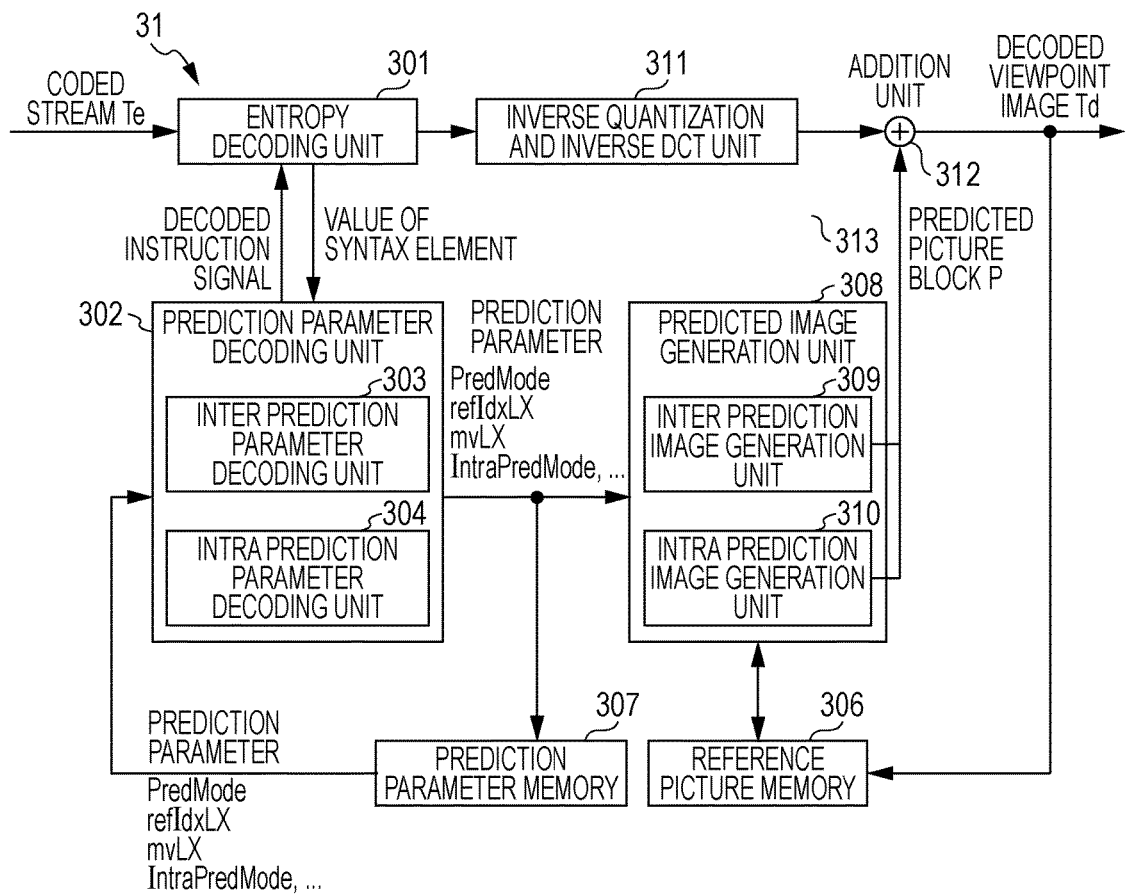
FIG. 5 is a schematic diagram illustrating a configuration of an image decoding device according to the present embodiment.

Next, an example of the reference picture list will be described. The reference picture list is an array that is configured of reference pictures stored in a reference picture memory 306 (FIG. 5). FIG. 3 is a conceptual diagram illustrating an example of a reference picture list RefPicListX. In the reference picture list RefPicListX, each of the five rectangles that are linearly arranged from left to right represents a reference picture. Reference signs P1, P2, Q0, P3, and P4 that are illustrated in this order from the left end to the right end are reference signs that represent each reference picture. P in P1 and the like indicates a viewpoint P, and Q in Q0 indicates a viewpoint Q that is different from the viewpoint P. The suffix after P and Q indicates a picture order count POC. A downward arrow immediately below refIdxLX indicates that the reference picture index refIdxLX is an index that references the reference picture Q0 in the reference picture memory 306.

(Example of Reference Picture)

Next, an example of the reference picture that is used upon deriving a vector will be described. FIG. 4 is a conceptual diagram illustrating an example of the reference picture. In FIG. 4, the horizontal axis represents a display time, and the vertical axis represents a viewpoint. Each of the rectangles in vertically two rows and horizontally three columns (total six) illustrated in FIG. 4 represents a picture. Of the six rectangles, the rectangle of the second column from left in the lower row represents a decoding target picture (target picture), and each of the remaining five rectangles represents a reference picture. The reference picture Q0 that is indicated by an upward arrow from the target picture is a picture at the same display time as but at a different viewpoint (view ID) from the target picture. The reference picture Q0 is used in disparity prediction that uses the target picture as a reference. The reference picture P1 that is indicated by a leftward arrow from the target picture is a picture in the past at the same viewpoint as the target picture. The reference picture P2 that is indicated by a rightward arrow from the target picture is a picture in the future at the same viewpoint as the target picture. Either the reference picture P1 or P2 is used in motion prediction that uses the target picture as a reference.

(Inter Prediction Flag and Prediction List Utilization Flag)

A relationship between the inter prediction flag inter_pred_idc and the prediction list utilization flags predFlagL0 and predFlagL1 is such that both can be converted into and from each other by using the following expressions.

$$\text{inter\_pred\_idc} = (\text{predFlag}L1 << 1) + \text{predFlag}L0$$

$$\text{predFlag}L0 = \text{inter\_pred\_idc} \& 1$$

$$\text{predFlag}L1 = \text{inter\_pred\_idc} >> 1$$

Here, $>>$ is a right shift, and $<<$ is a left shift. Thus, either the inter prediction flag inter_pred_idc or the prediction list utilization flags predFlagL0 and predFlagL1 may be used as the inter prediction parameters. Hereinafter, the prediction list utilization flags predFlagL0 and predFlagL1 used in a determination can be replaced by the inter prediction flag inter_pred_idc. Conversely, the inter prediction flag inter_pred_idc used in a determination can be replaced by the prediction list utilization flags predFlagL0 and predFlagL1.

(Merge Mode and AMVP Prediction)

Types of decoding (coding) methods for the prediction parameters include a merge mode and an adaptive motion vector prediction (AMVP) mode, and the merge flag merge_flag is a flag for identifying these modes. Either in the merge mode or in the AMVP mode, the prediction parameters of a previously processed block are used to derive the prediction parameters of the target PU. The merge mode is a mode that uses previously derived prediction parameters as is without including a prediction list utilization flag predFlagLX (inter prediction flag inter_pred_idc), the reference picture index refIdxLX, and a vector mvLX in the coded data, and the AMVP mode is a mode that includes the inter prediction flag inter_pred_idc, the reference picture index refIdxLX, and the vector mvLX in the coded data. The vector mvLX is coded as a difference vector (mvdLX) and the predicted vector flag mvp_LX_flag that indicates a predicted vector.

The inter prediction flag inter_pred_idc is data that indicates types and the number of reference pictures and has one of the values Pred_L0, Pred_L1, and Pred_BI. Pred_L0 and Pred_L1 indicate that reference pictures stored in the reference picture lists respectively referred to as the L0 list and the L1 list are used and indicate that one reference picture is used in common (uni-prediction). Prediction that uses the L0 list and prediction that uses the L1 list are respectively referred to as L0 prediction and L1 prediction. Pred_BI indicates that two reference pictures are used (bi-prediction) and indicates that two of the reference pictures stored in the L0 list and the L1 list are used. The predicted vector flag mvp_LX_flag is an index that indicates a predicted vector, and the reference picture index refIdxLX is an index that indicates a reference picture stored in the reference picture list. LX is one manner of description that is used in a case of not distinguishing the L0 prediction and the L1 prediction from each other. Replacing LX by L0 and L1 allows parameters for the L0 list and parameters for the L1 list to be distinguished from each other. For example, refIdxL0 is a reference picture index used in the L0 prediction, refIdxL1 is a reference picture index used in the L1 prediction, and refIdx (refIdxLX) is used in a case of not distinguishing refIdxL0 and refIdxL1 from each other.

The merge index merge_idx is an index that indicates which prediction parameter of prediction parameter candidates (merge candidates) derived from the completely processed block is used as a prediction parameter of the prediction unit (target block).

(Motion Vector and Disparity Vector)

Types of vectors mvLX include a motion vector and a disparity vector (parallax vector). The motion vector is a vector that indicates positional shifting between the position of a block in a picture of a certain layer at a certain display time and the position of the corresponding block in a picture of the same layer at a different display time (for example, a neighbouring discrete time). The disparity vector is a vector that indicates positional shifting between the position of a block in a picture of a certain layer at a certain display time and the position of the corresponding block in a picture of a different layer at the same display time. The picture of a different layer may be a picture of a different viewpoint or may be a picture of a different resolution. In particular, the disparity vector corresponding to the picture of a different viewpoint is referred to as a parallax vector. In the description provided below, the motion vector and the disparity vector will be simply referred to as the vector mvLX in a case of not distinguishing the motion vector and the disparity vector from each other. A predicted vector and a difference vector related to the vector mvLX are respectively referred to as a predicted vector mvpLX and the difference vector mvdLX. A determination of whether the vector mvLX and the difference vector mvdLX are motion vectors or disparity vectors is performed by using the reference picture index refIdxLX pertaining to the vectors.

(Configuration of Image Decoding Device)

Next, a configuration of the image decoding device 31 according to the present embodiment will be described. FIG. 5 is a schematic diagram illustrating a configuration of the image decoding device 31 according to the present embodiment. The image decoding device 31 is configured to include an entropy decoding unit 301, a prediction parameter decoding unit 302, the reference picture memory (reference image storage unit or frame memory) 306, a prediction parameter memory (prediction parameter storage unit or frame memory) 307, a predicted image generation unit 308, an inverse quantization and inverse DCT unit 311, an addition unit 312, and a depth DV derivation unit 351 not illustrated.

The prediction parameter decoding unit 302 is configured to include an inter prediction parameter decoding unit 303 and an intra prediction parameter decoding unit 304. The predicted image generation unit 308 is configured to include an inter prediction image generation unit 309 and an intra prediction image generation unit 310.

The entropy decoding unit 301 performs entropy decoding of the coded stream Te that is externally input to demultiplex and decode each individual code (syntax element). Types of demultiplexed codes include prediction information for generating a predicted image, residual information for generating a difference image, and the like.

The entropy decoding unit 301 outputs a part of the demultiplexed codes to the prediction parameter decoding unit 302. The part of the demultiplexed codes includes, for example, a prediction mode PredMode, the partition mode part_mode, the merge flag merge_flag, the merge index merge_idx, the inter prediction flag inter_pred_idc, the reference picture index refIdxLX, the predicted vector flag mvp_LX_flag, the difference vector mvdLX, the residual prediction index iv_res_pred_weight_idx, and the illuminance compensation flag ic_flag. A determination of which code is decoded is controlled on the basis of an instruction from the prediction parameter decoding unit 302. The entropy decoding unit 301 outputs a quantized coefficient to the inverse quantization and inverse DCT unit 311. This quantized coefficient is a coefficient that is obtained by performing discrete cosine transform (DCT) and quantization of a residual signal. The entropy decoding unit 301 outputs a depth DV conversion table DepthToDisparityB to the depth DV derivation unit 351. This depth DV conversion table DepthToDisparityB is a table for converting a pixel value of a depth image into a parallax that indicates a disparity between viewpoint images. An element DepthToDisparityB[d] of the depth DV conversion table DepthToDisparityB can be obtained by the following expressions using an inclination cp_scale, an offset cp_off, and an inclination precision cp_precision.

$$\log 2\ Div = BitDepth_Y - 1 + cp\_precision$$

$$offset = (cp\_off << BitDepth_Y) + ((1 << \log 2\ Div) >> 1)$$

$$scale = cp\_scale$$

$$DepthToDisparityB[d] = (scale * d + offset) >> \log 2\ Div$$

The parameters cp_scale, cp_off, and cp_precision are decoded from a parameter set in the coded data for each viewpoint referenced. $BitDepth_Y$ represents a bit depth of a pixel value corresponding to a luminance signal and has, for example, 8 as a value thereof.

The prediction parameter decoding unit 302 receives input of a part of codes from the entropy decoding unit 301. The prediction parameter decoding unit 302 decodes a prediction parameter that corresponds to the prediction mode indicated by the prediction mode PredMode which is a part of the codes. The prediction parameter decoding unit 302 outputs the prediction mode PredMode and the decoded prediction parameter to the prediction parameter memory 307 and the predicted image generation unit 308.

The inter prediction parameter decoding unit 303 references prediction parameters stored in the prediction parameter memory 307 to decode the inter prediction parameters on the basis of the codes input from the entropy decoding unit 301. The inter prediction parameter decoding unit 303 outputs the decoded inter prediction parameters to the predicted image generation unit 308 and stores the inter prediction parameters in the prediction parameter memory 307. Details of the inter prediction parameter decoding unit 303 will be described later.

The intra prediction parameter decoding unit 304 references prediction parameters stored in the prediction parameter memory 307 to decode intra prediction parameters on the basis of the codes input from the entropy decoding unit 301. The intra prediction parameters are parameters, for example, an intra prediction mode IntraPredMode, that are used in a process of predicting a picture block within one picture. The intra prediction parameter decoding unit 304 outputs the decoded intra prediction parameters to the predicted image generation unit 308 and stores the intra prediction parameters in the prediction parameter memory 307.

The reference picture memory 306 stores a decoded picture block recSamples generated by the addition unit 312 at the position of the decoded picture block.

The prediction parameter memory 307 stores prediction parameters at predetermined positions for each picture and each block of a decoding target. Specifically, the prediction parameter memory 307 stores the inter prediction parameters decoded by the inter prediction parameter decoding unit 303, the intra prediction parameters decoded by the intra prediction parameter decoding unit 304, and the prediction mode PredMode demultiplexed by the entropy decoding unit 301. The inter prediction parameters stored include, for example, the prediction list utilization flag predFlagLX, the reference picture index refIdxLX, and the vector mvLX.

The prediction mode PredMode and the corresponding prediction parameter are input from the prediction parameter decoding unit 302 into the predicted image generation unit 308. The predicted image generation unit 308 reads reference pictures from the reference picture memory 306. The predicted image generation unit 308 uses the input prediction parameter and the read reference pictures in the prediction mode indicated by the prediction mode PredMode to generate a predicted picture block predSamples (predicted image).

In a case where the prediction mode PredMode indicates an inter prediction mode, the inter prediction image generation unit 309 uses the inter prediction parameters input from the inter prediction parameter decoding unit 303 and the read reference pictures to generate the predicted picture block predSamples by inter prediction. The predicted picture block predSamples correspond to the prediction unit PU. As described above, a PU corresponds to a part of a picture that is the unit of a prediction process and is configured of a plurality of pixels, that is, corresponds to the target block for which a prediction process is performed at one time.

The inter prediction image generation unit 309 reads from the reference picture memory 306 a reference picture block that is present at a position indicated by the vector mvLX with the prediction unit as a reference from a reference picture RefPicListLX[refIdxLX] indicated by the reference picture index refIdxLX in the reference picture list (L0 list or L1 list) for which the prediction list utilization flag predFlagLX is equal to 1. The inter prediction image generation unit 309 performs motion compensation of the read reference picture block to generate a predicted picture block predSamplesLX. The inter prediction image generation unit 309 generates the predicted picture block predSamples from predicted picture blocks predSamplesL0 and predSamplesL1 and outputs the predicted picture block predSamples to the addition unit 312.

In a case where the prediction mode PredMode is the intra prediction mode, the intra prediction image generation unit 310 performs intra prediction using the intra prediction parameters input from the intra prediction parameter decoding unit 304 and the read reference pictures. Specifically, the intra prediction image generation unit 310 reads from the reference picture memory 306 a reference picture block of the previously processed blocks that is within a predetermined range from the prediction unit in the decoding target picture. The predetermined range is, for example, the range of left, upper left, upper, and upper right neighbouring blocks and is different according to the intra prediction mode.

The intra prediction image generation unit 310 performs prediction for the read reference picture block in the prediction mode indicated by the intra prediction mode IntraPredMode to generate the predicted picture block predSamples and outputs the predicted picture block predSamples to the addition unit 312.

The inverse quantization and inverse DCT unit 311 performs inverse quantization of the quantized coefficient input from the entropy decoding unit 301 to obtain a DCT coefficient. The inverse quantization and inverse DCT unit 311 performs inverse discrete cosine transform (inverse DCT) of the obtained DCT coefficient to calculate a decoded residual signal. The inverse quantization and inverse DCT unit 311 outputs the calculated decoded residual signal to the addition unit 312.

The addition unit 312 adds for each pixel the predicted picture block predSamples, which is input from the inter prediction image generation unit 309 and the intra prediction image generation unit 310, and a signal value resSamples of the decoded residual signal, which is input from the inverse quantization and inverse DCT unit 311, to generate the decoded picture block recSamples. The addition unit 312 outputs the generated decoded picture block recSamples to the reference picture memory 306. The decoded picture block is combined for each picture. Loop filters such as a deblocking filter and an adaptive offset filter are applied to the decoded picture. The decoded picture is output as a decoded layer image Td.

(Configuration of Inter Prediction Parameter Decoding Unit)

Figure 6:
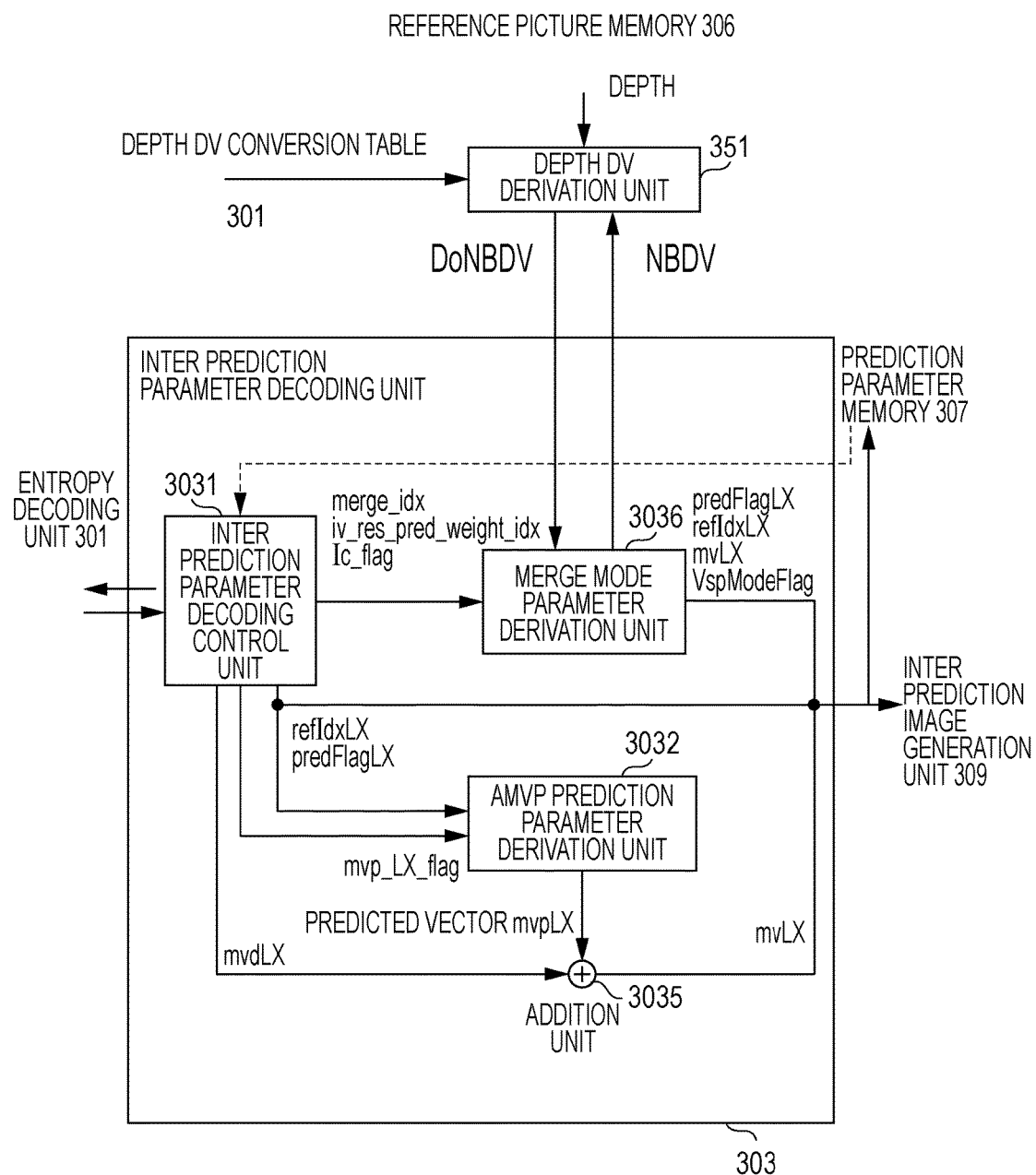
FIG. 6 is a schematic diagram illustrating a configuration of an inter prediction parameter decoding unit according to the present embodiment.

Next, a configuration of the inter prediction parameter decoding unit 303 will be described. FIG. 6 is a schematic diagram illustrating a configuration of the inter prediction parameter decoding unit 303 according to the present embodiment. The inter prediction parameter decoding unit 303 is configured to include an inter prediction parameter decoding control unit 3031, an AMVP prediction parameter derivation unit 3032, an addition unit 3035, a merge mode parameter derivation unit 3036, and a disparity derivation unit 30363.

The inter prediction parameter decoding control unit 3031 extracts codes related to inter prediction (codes (syntax elements) included in the coded data that instruct the entropy decoding unit 301 to decode syntax elements), such as the partition mode part_mode, the merge flag merge_flag, the merge index merge_idx, the inter prediction flag inter_pred_idc, the reference picture index refIdxLX, the predicted vector flag mvp_LX_flag, the difference vector mvdLX, the residual prediction index iv_res_pred_weight_idx, and the illuminance compensation flag ic_flag. In a case where the expression that the inter prediction parameter decoding control unit 3031 extracts a certain syntax element is used, this means that the entropy decoding unit 301 is instructed to decode a certain syntax element and that the syntax element is read from the coded data.

The inter prediction parameter decoding control unit 3031 extracts the merge index merge_idx from the coded data in a case where the merge flag merge_flag is equal to 1, that is, in a case where the merge mode is used for the prediction unit. The inter prediction parameter decoding control unit 3031 outputs the residual prediction index iv_res_pred_weight_idx, the illuminance compensation flag ic_flag, and the merge index merge_idx extracted to the merge mode parameter derivation unit 3036.

The inter prediction parameter decoding control unit 3031 extracts the inter prediction flag inter_pred_idc, the reference picture index refIdxLX, the predicted vector flag mvp_LX_flag, and the difference vector mvdLX from the coded data using the entropy decoding unit 301 in a case where the merge flag merge_flag is equal to 0, that is, in a case where the AMVP prediction mode is used for the prediction block. The inter prediction parameter decoding control unit 3031 outputs the prediction list utilization flag predFlagLX which is derived from the extracted inter prediction flag inter_pred_idc and the reference picture index refIdxLX to the AMVP prediction parameter derivation unit 3032 and the predicted image generation unit 308 (FIG. 5) and stored the prediction list utilization flag predFlagLX and the reference picture index refIdxLX in the prediction parameter memory 307 (FIG. 5). The inter prediction parameter decoding control unit 3031 outputs the extracted predicted vector flag mvp_LX_flag to the AMVP prediction parameter derivation unit 3032 and outputs the extracted difference vector mvdLX to the addition unit 3035.

The disparity vector derivation unit 30363 extracts the disparity vector (hereinafter, MvDisp[x][y] where (xP, yP) is coordinates; hereinafter, MvDisp may be described as mvDisp that indicates the same disparity vector) of a coding unit (target CU) to which the target PU belongs from blocks neighbouring spatially or temporally the coding unit. Specifically, a temporally neighbouring block Col, temporally neighbouring second block AltCol, a left spatially neighbouring block A1, and an upper spatially neighbouring block B1 with respect to the target CU are used as reference blocks. The prediction flag predFlagLX, the reference picture index refIdxLX, and the vector mvLX of the reference blocks are read in order, and a determination of whether a neighbouring block has a disparity vector is made from the reference picture index refIdxLX of the neighbouring block. In a case where the neighbouring block has a disparity vector, the disparity vector of the reference block is output. In a case where a disparity vector is not present in the prediction parameters of the neighbouring block, the prediction parameters of a subsequent neighbouring block are read, and a disparity vector is derived in the same manner. In a case where a disparity vector cannot be derived in all of the neighbouring blocks, a zero vector is output as a disparity vector. The disparity vector derivation unit 30363 outputs the reference picture index and the view ID (RefViewIdx[x][y] where (xP, yP) is coordinates) of a block in which a disparity vector is derived.

The disparity vector obtained above is referred to as a neighbour base disparity vector (NBDV). The disparity vector derivation unit 30363 outputs the obtained disparity vector NBDV to the depth DV derivation unit 351. The depth DV derivation unit 351 updates the input disparity vector using a depth-orientated disparity vector. The disparity vector updated is referred to as a depth-orientated neighbour base disparity vector (DoNBDV). The disparity vector derivation unit 30363 outputs the disparity vector (DoNBDV) to an inter-layer merge candidate derivation unit 3036121, a disparity merge candidate derivation unit, and a view synthesis prediction merge candidate derivation unit. The disparity vector (NBDV) obtained is also output to the inter prediction image generation unit 309.

The inter prediction parameter decoding control unit 3031 outputs to the inter prediction image generation unit 309 the disparity vector (NBDV) derived upon deriving the inter prediction parameters and a VSP mode flag VspModeFlag that is a flag indicating whether or not to perform view synthesis prediction.

Figure 7:
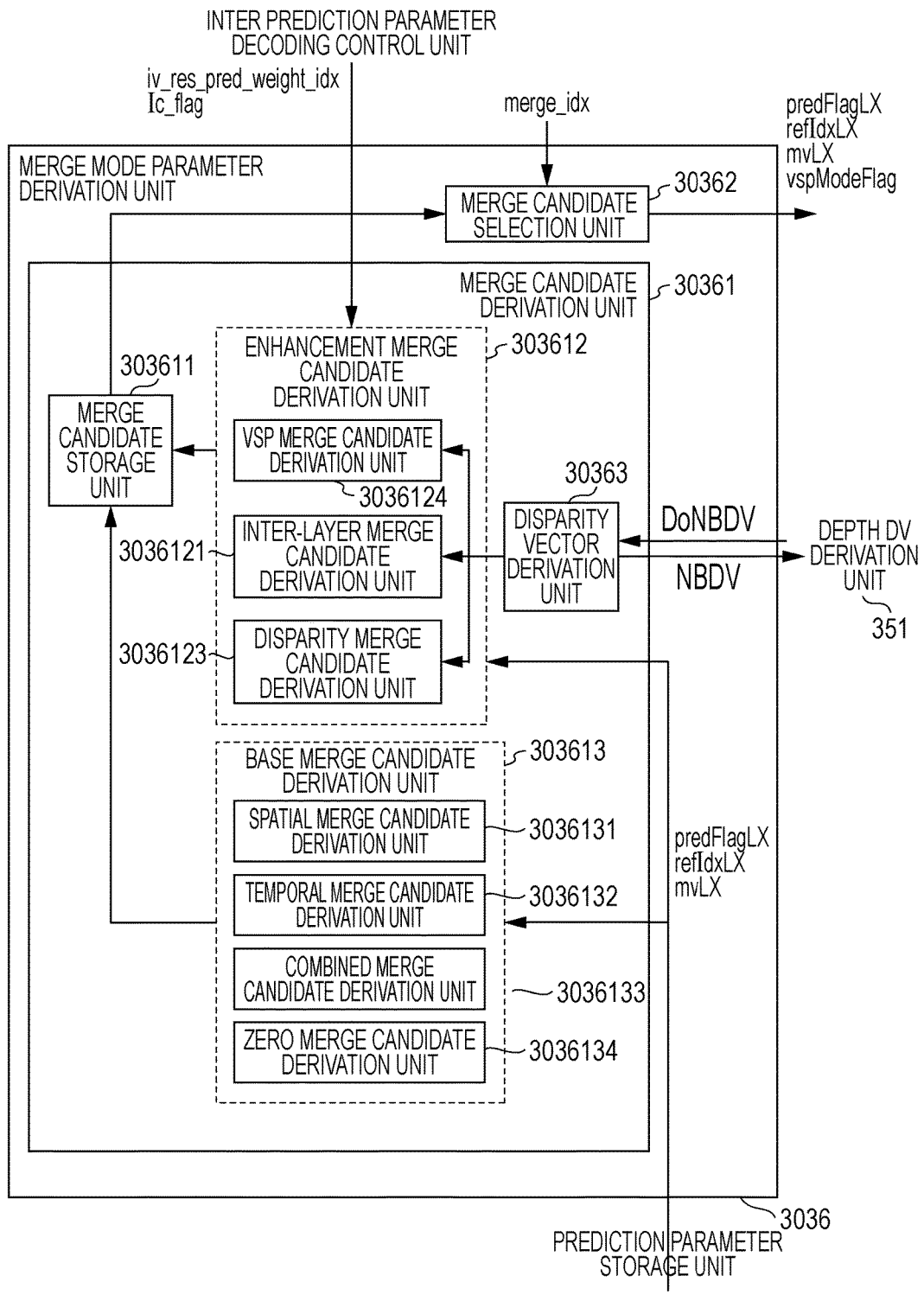
FIG. 7 is a schematic diagram illustrating a configuration of a marge mode parameter derivation unit according to the present embodiment.

FIG. 7 is a schematic diagram illustrating a configuration of the merge mode parameter derivation unit 3036 according to the present embodiment. The merge mode parameter derivation unit 3036 includes a merge candidate derivation unit 30361 and a merge candidate selection unit 30362. The merge candidate derivation unit 30361 is configured to include a merge candidate storage unit 303611, an enhancement merge candidate derivation unit 303612, and a base merge candidate derivation unit 303613.

The merge candidate storage unit 303611 stores merge candidates that are input from the enhancement merge candidate derivation unit 303612 and the base merge candidate derivation unit 303613 in a merge candidate list mergeCandList. A merge candidate is configured to include the prediction list utilization flag predFlagLX, the vector mvLX, the reference picture index refIdxLX, the VSP mode flag VspModeFlag, the disparity vector MvDisp, and a layer ID RefViewIdx. In the merge candidate storage unit 303611, indexes are assigned to the merge candidates stored in the merge candidate list mergeCandList in accordance with a predetermined rule.

FIG. 17 illustrates an example of the merge candidate list mergeCandList derived by the merge candidate storage unit 303611. FIG. 17(*a*) illustrates merge candidates derived by the merge candidate storage unit 303611 in the base layer (nal_unit_layer=0). The merge candidates are, in order of merge index, a spatial merge candidate (A1), a spatial merge candidate (B1), a spatial merge candidate (B0), a spatial merge candidate (A0), and a spatial merge candidate (B2), excluding a process of reducing the number of merge candidates (pruning process) in a case where two merge candidates are the same prediction parameter. Reference signs in the parentheses are nicknames of the merge candidates and, in a case of spatial merge candidates, correspond to the positions of reference blocks used in derivation. In addition, a combined merge candidate and a zero merge candidate are present after the merge candidates, though not illustrated in FIG. 17. These merge candidates, that is, a spatial merge candidate, a temporal merge candidate, a combined merge candidate, and a zero merge candidate, are derived by the base merge candidate derivation unit 303613. FIG. 17(*b*) illustrates merge candidates derived by the merge candidate storage unit 303611 in an enhancement layer (nal_unit_layer !=0) which is a layer other than the base layer (nal_unit_layer=0). The merge candidates are, in order of merge index, the texture merge candidate (T), the inter-view merge candidate (IvMC), the spatial merge candidate (A1), the spatial merge candidate (B1), the spatial merge candidate (B0), the disparity merge candidate (IvDC), the VSP merge candidate (VSP), the spatial merge candidate (A0), the spatial merge candidate (B2), the shifted motion merge candidate (IvMCShift), the shifted disparity merge candidate (IvDCShift), and a temporal merge candidate (Col). Reference signs in the parentheses are nicknames of the merge candidates. In addition, a combined merge candidate and a zero merge candidate are present after the merge candidates, though not illustrated in FIG. 17. The texture merge candidate (T), the inter-view merge candidate (IvMC), the disparity merge candidate (IvDC), the VSP merge candidate (VSP), the shifted motion merge candidate (IvMCShift), and the shifted disparity merge candidate (IvDCShift) are derived in the enhancement merge candidate derivation unit 303612.

FIG. 18 is a diagram illustrating the positions of the neighbouring blocks referenced by a spatial merge candidate. A0, A1, B0, B1, and B2 respectively correspond to the positions illustrated in FIG. 18, and the coordinates thereof are described below. In a case where the upper left coordinates of the prediction unit is xPb and yPb and the weight and the height of the prediction unit are nPbW and nPbH, the positions of the neighbouring blocks are described as follows.

A0: (xPb−1, yPb+nPbH)
A1: (xPb−1, yPb+nPbH−1)
B0: (xPb−nPbW, yPb−1)
B1: (xPb+nPbW−1, yPb 1)
B2: (xPb−1, yPb−1)

The enhancement merge candidate derivation unit 303612 is configured to include the disparity vector derivation unit 30363, the inter-layer merge candidate derivation unit 3036121, a disparity merge candidate derivation unit 3036123, and a VSP merge candidate derivation unit 3036124. An enhancement merge candidate is a merge candidate that is different from a base merge candidate described later and includes at least one of a texture merge candidate (T), an inter-view merge candidate (IvMC), a disparity merge candidate (IvDC), a VSP merge candidate (VSP), a shifted motion merge candidate (IvMCShift), and a shifted disparity merge candidate (IvDCShift).

(Texture Merge Candidate)

The inter-layer merge candidate derivation unit 3036121 derives the texture merge candidate (T), the inter-view merge candidate (IvMC), and the shifted motion merge candidate (IvMCShift). These merge candidates are derived by selecting a block corresponding to the prediction unit from the reference picture having the same POC as but in a different layer (for example, the base layer or the base view) from the target picture and by reading a prediction parameter corresponding to the motion vector included in the block from the prediction parameter memory 307.

The texture merge candidate (T) is derived in the inter-layer merge candidate derivation unit 3036121 in a case where the target picture is a depth picture. The texture merge candidate (T) is derived by specifying a reference block from a depth picture having the same view ID as the target picture and by reading the motion vector of the reference block.

Coordinates (xRef, yRef) of the reference block are derived from the following expressions in a case where the upper left coordinates of the prediction unit are xPb and yPb and the width and the height of the prediction unit are nPbW and nPbH.

$x\text{RefFull}=xPb+((nPbW-1)>>1)$ $y\text{RefFull}=yPb+((nPbH-1)>>1)$ $x\text{Ref}=\text{Clip3}(0,\text{PicWidthInSamples}L-1,(x\text{RefFull}-3)<<3)$ $y\text{Ref}=\text{Clip3}(0,\text{PicHeightInSamples}L-1,(y\text{RefFull}-3)<<3)$ PicWidthInSamplesL and PicHeightInSamplesL respectively represent the width and the height of an image, and a function Clip3(x, y, z) is a function that limits z to greater than or equal to x and less than or equal to y (clipping) and returns the result of limiting z.

Given that the motion vector of the reference block is textMvLX, a motion vector mvLXT of the texture merge candidate is derived by the following expressions.

$mvLXT[0]=(\text{text}MvLX[x\text{Ref}][y\text{Ref}][0]+2)>>2$ $MvLXT[1]=(\text{text}MvLX[x\text{Ref}][y\text{Ref}][1]+2)>>2$ The texture merge candidate may be assigned prediction parameters in units of sub-blocks into which the prediction unit is further split.

(Inter-View Merge Candidate)

The inter-view merge candidate is derived in the inter-layer merge candidate derivation unit 3036121 by reading prediction parameters such as a motion vector from a reference block of a reference picture ivRefPic that has the same POC as but has a different view ID (refViewIdx) from the target picture specified by the disparity vector derivation unit 30363. This process is referred to as a temporal inter-view motion candidate derivation process. The inter-layer merge candidate derivation unit 3036121, as the temporal inter-view motion candidate derivation process, first derives the reference coordinates (xRef, yRef) from the following expressions in a case where the upper left coordinates of the block are (xPb, yPb), the width and the height of the block are nPbW and nPbH, and the disparity vector derived from the disparity vector derivation unit 30363 is (mvDisp [0], mvDisp[1]).

$x\text{RefFull}=xPb+(nPbW>>1)+(mv\text{Disp}[0]+2)>>2)$ $y\text{RefFull}=yPb+(nPbH>>1)+((mv\text{Disp}[1]+2)>>2)$ $x\text{Ref}=\text{Clip3}(0,\text{PicWidthInSamples}L-1,(x\text{RefFull}>>3)<<3)$ $y\text{Ref}=\text{Clip3}(0,\text{PicHeightInSamples}L-1,(y\text{RefFull}>>3)<<3)$ Next, the inter-layer merge candidate derivation unit 3036121 performs the temporal inter-view motion candidate derivation process in a temporal inter-view motion candidate derivation unit 30361211 not illustrated.

The temporal inter-view motion candidate derivation unit 30361211 derives the reference block position (xRef, yRef) using the above process from the coordinates (xPb, yPb) of the block, the width nPbW and nPbH of the block, and the disparity vector mvDisp of the block, further references the vector of the prediction unit positioned at the reference block position (xRef, yRef) on the reference picture ivRef-Pic, and derives the vector of a temporal inter-view motion candidate. First, let (xIvRefPb, yIvRefPb) be the upper left coordinates of the prediction unit (luma prediction block) on the reference picture ivRefPic that includes the coordinates indicated by the reference block position (xRef, yRef) and refPicListLYIvRef, predFlagLYIvRef [x][y], mvLYIvRef [x][y], and refIdxLYIvRef[x][y] respectively be a reference picture list, a prediction list flag, a vector, and a reference picture index included in the prediction unit on the reference picture ivRefPic.

The temporal inter-view motion candidate derivation unit 30361211, in a case where the prediction list flag predFlagLYIvRef[xIvRefPb][yIvRefPb] is equal to 1, determines whether or not, for an index i from zero to the number of elements in the reference picture list−1 (num_ref_idx_ lX_active_minus1), PicOrderCnt(refPicListLYIvRef[refIdxLYIvRef[xIvRefPb][yIvRef Pb]]) that is the POC of the prediction unit on the reference picture ivRefPic is equal to PicOrderCnt(RefPicListLX[i]) that is the POC of the reference picture of the target prediction unit and, in a case where PicOrderCnt(refPicListLYIvRef[refIdxLYIvRef[xIvRefPb] [yIvRef Pb]]) is equal to PicOrderCnt(RefPicListLX[i]) (that is, in a case where mvLYIvRef[xIvRefPb][yIvRefPb] is a disparity vector), derives a prediction availability flag availableFlagLXInterView, a vector mvLXInterView, and the reference picture index refIdxLX using the following expressions.

availableFlag*LX*InterView=1

$mvLX\text{InterView}=mvLYIvRef[xIvRefPb][yIvRefPb]$ refIdx*LX*=i

That is, the temporal inter-view motion candidate derivation unit 30361211, in a case where the reference picture referenced by the target prediction unit is the same as the reference picture referenced by the prediction unit on the reference picture ivRefPic, derives the vector mvLXInter-View and the reference picture index refIdxLX using the prediction parameters of the prediction unit on the reference picture ivRefPic. The inter-view merge candidate may be assigned prediction parameters in units of sub-blocks into which the prediction unit is further split. For example, in a case where the width and the height of the prediction unit are nPbW and nPbH and the minimum size of a sub-block is SubPbSize, a width nSbW and a height nSbH of a sub-block are derived by the following expressions.

$$nSbWz=nPbW/\text{Sub}Pb\text{Size}<=1?nPbW:\text{Sub}Pb\text{Size}n$$

$$nSbH=nPbH/\text{Sub}Pb\text{Size}<=1?nPbH:\text{Sub}Pb\text{Size}$$

Next, the temporal inter-view motion candidate derivation unit 30361211 derives a vector spMvLX[xBlk][yBlk], a reference picture index spRefIdxLX[xBlk][yBlk], and a prediction list utilization flag spPredFlagLX[xBlk][yBlk] for each sub-block.

(xBlk, yBlk) is relative coordinates (coordinates with the upper left coordinates of the prediction unit as a reference) within the prediction unit of a sub-block, and the coordinates respectively have integer values ranging from zero to (nPbW/nSbW−1) and from zero to (nPbH/nSbH−1). Given that the coordinates of the prediction unit are (xPb, yPb) and that the relative coordinates of the sub-block within the prediction unit are (xBlk, yBlk), the coordinates of the sub-block within the picture are represented by (xPb+xBlk*nSbW, yPb+yBlk*nSbH).

The temporal inter-view motion candidate derivation process is performed in units of sub-blocks by using the coordinates (xPb+xBlk*nSbW, yPb+yBlk*nSbH) of the sub-block within the picture and the width nSbW and the height nSbH of the sub-block as input (xPb, yPb), nPbW, and nPbH of the temporal inter-view motion candidate derivation unit 30361211. In the above process, the temporal inter-view motion candidate derivation unit 30361211, for a sub-block for which the prediction availability flag availableFlagLXInterView is equal to 0, derives a vector spMvLX, a reference picture index spRefIdxLX, and a prediction list utilization flag spPredFlagLX corresponding to the sub-block from the vector mvLXInterView, a reference picture index refIdxLXInterView, and the prediction list utilization flag availableFlagLXInterView of the inter-view merge candidate using the following expressions.

$$sp\text{Mv}LX[x\text{Blk}][y\text{Blk}]=mvLX\text{InterView}$$

$$sp\text{RefIdx}LX[x\text{Blk}][y\text{Blk}]=\text{refIdx}LX\text{InterView}$$

$$sp\text{PredFlag}LX[x\text{Blk}][y\text{Blk}]=\text{availableFlag}LX\text{InterView}$$

xBlk and yBlk are sub-block addresses and respectively have values ranging from zero to (nPbW/nSbW−1) and from zero to (nPbH/nSbH−1). The vector mvLXInterView, the reference picture index refIdxLXInterView, and the prediction list utilization flag availableFlagLXInterView of the inter-view merge candidate are derived by performing the temporal inter-view motion candidate derivation process using (xPb+(nPbW/nSbW/2)*nSbW, yPb+(nPbH/nSbH/2)*nSbH) as reference block coordinates.

(Shifted Motion Merge Candidate)

The shifted motion merge candidate is derived in the same manner in the inter-layer merge candidate derivation unit 3036121 by reading prediction parameters such as a motion vector from a reference block of a picture that has the same POC as but has a different view ID from the target picture specified by the disparity vector derivation unit 30363. The shifted motion merge candidate is derived from the following expressions in a case where the coordinates of the reference block are (xRef, yRef), the upper left coordinates of the prediction unit are xPb and yPb, the width and the height of the prediction unit are nPbW and nPbH, and the disparity vector derived from the disparity vector derivation unit 30363 is mvDisp[0] and mvDisp[1].

$$x\text{RefFull}=xPb+(nPbW>>1)+((mv\text{Disp}[0]+nPbW*2+4+2)>>2)$$

$$y\text{RefFull}=yPb+(nPbH>>1)+((mv\text{Disp}[1]+nPbH*2+4+2)>>2)$$

$$x\text{Ref}=\text{Clip3}(0,\text{PicWidthInSamples}L-1,(x\text{RefFull}>>3)<<3)$$

$$y\text{Ref}=\text{Clip3}(0,\text{PicHeightInSamples}L-1,(y\text{RefFull}>>3)<<3)$$

(Disparity Merge Candidate)

The disparity merge candidate derivation unit 3036123 derives the disparity merge candidate (IvDC) and the shifted disparity merge candidate (IvDcShift) from the disparity vector input from the disparity vector derivation unit 30363. The disparity merge candidate derivation unit 3036123 generates a vector of which the horizontal component is the horizontal component mvDisp[0] of the input disparity vector (mvDisp[0], mvDisp[1]) and of which the vertical component is zero as the disparity merge candidate (IvDC) using the following expressions.

$$mvL0IvDC[0]=\text{DepthFlag}?(mv\text{Disp}[0]+2)>>2:mv\text{Disp}[0]$$

$$mvL0IvDC[1]=0$$

DepthFlag is a variable that is equal to 1 in a case of a depth picture.

The disparity merge candidate derivation unit 3036123 outputs the generated vector and the reference picture index refIdxLX of a layer image at a location indicated by the disparity vector (for example, the index of the base layer image having the same POC as the decoding target picture) as a merge candidate to the merge candidate storage unit 303611.

The disparity merge candidate derivation unit 3036123 derives a merge candidate having a vector horizontally shifted from the disparity merge candidate as the shifted disparity merge candidate (IvDC) using the following expressions.

$$mvLXIvDC\text{Shift}[0]=mvL0IvDC[0]+4$$

$$mvLXIvDC\text{Shift}[1]=mvL0IvDC[1]$$

(VSP Merge Candidate)

The VSP merge candidate derivation unit 3036124 derives the view synthesis prediction (VSP) merge candidate. The VSP merge candidate is a merge candidate that is used in a predicted image generation process performed by a view synthesis prediction unit 3094 using view synthesis prediction. The VSP merge candidate derivation unit 3036124 derives prediction parameters by setting the disparity vector mvDisp input from the disparity vector derivation unit 30363 to the vector mvLX, the reference picture index and the view ID of the reference picture specified by the disparity vector derivation unit 30363 to the reference picture index refIdxLX and the view ID RefViewIdx, and the VSP mode flag VspModeFlag to 1 and derives the VSP merge candidate. The VSP merge candidate derivation unit 3036124 outputs the derived VSP merge candidate to the merge candidate storage unit 303611.

The VSP merge candidate derivation unit 3036124 receives input of the residual prediction index iv_res_pred_weight_idx and the illuminance compensation flag ic_flag from the inter prediction parameter decoding control unit. The VSP merge candidate derivation unit 3036124 performs a derivation process of the VSP merge candidate only in a case where the residual prediction index iv_res_pred- _weight_idx is equal to 0 and the illuminance compensation flag ic_flag is equal to 0. That is, the VSP merge candidate is added to the elements of the merge candidate list mergeCandList only in a case where the residual prediction index iv_res_pred_weight_idx is equal to 0 and the illuminance compensation flag ic_flag is equal to 0. Conversely, in a case where the residual prediction index iv_res_pred_weight_idx is equal to other than zero or the illuminance compensation flag ic_flag is equal to other than zero, the VSP merge candidate derivation unit 3036124 does not add the VSP merge candidate to the elements of the merge candidate list mergeCandList.

The base merge candidate derivation unit 303613 is configured to include a spatial merge candidate derivation unit 3036131, a temporal merge candidate derivation unit 3036132, a combined merge candidate derivation unit 3036133, and a zero merge candidate derivation unit 3036134. A base merge candidate is a merge candidate that is used in the base layer, that is, a merge candidate that is used in HEVC (for example, the HEVC main profile) and not in scalable coding, and includes at least one of a spatial merge candidate and a temporal merge candidate.

The spatial merge candidate derivation unit 3036131, in accordance with a predetermined rule, reads prediction parameters (prediction list utilization flag predFlagLX, vector mvLX, and reference picture index refIdxLX) stored in the prediction parameter memory 307 and derives the read prediction parameters as a spatial merge candidate. The read prediction parameters are prediction parameters related to each of the neighbouring blocks that are blocks within a predetermined range from the prediction unit (for example, all or a part of blocks respectively in contact with the lower left end, the upper left end, and the upper right end of the prediction unit). The derived spatial merge candidate is stored in the merge candidate storage unit 303611.

In the spatial merge candidate derivation unit 3036131, a VSP mode flag mergeCandIsVspFlag of the derived merge candidate is set by inheriting the VSP mode flag VspModeFlag of a neighbouring block. That is, in a case where the VSP mode flag VspModeFlag of a neighbouring block is equal to 1, the VSP mode flag mergeCandIsVspFlag of the corresponding spatial merge candidate is set to 1. Otherwise, the VSP mode flag mergeCandIsVspFlag is set to 0.

Hereinafter, the VSP merge flag VspModeFlag will be set to 0 in the merge candidates derived by the temporal merge candidate derivation unit 3036132, the combined merge candidate derivation unit 3036133, and the zero merge candidate derivation unit 3036134.

The temporal merge candidate derivation unit 3036132 reads the prediction parameters of a block in the reference image that includes the lower right coordinates of the prediction unit from the prediction parameter memory 307 and sets the prediction parameters as a merge candidate. A specification method for the reference image is such that the reference picture index refIdxLX that is specified by RefPicListX[col_ref_idx] specified from a collocated picture col_ref_idx specified in the slice header and from the reference picture list RefPicListX may be used. The derived merge candidate is stored in the merge candidate storage unit 303611.

The combined merge candidate derivation unit 3036133 derives a combined merge candidate by combining the vectors of two derived merge candidates that are previously derived and stored in the merge candidate storage unit 303611 with the reference picture indexes thereof respectively as L0 and L1 vectors. The derived merge candidate is stored in the merge candidate storage unit 303611.

The zero merge candidate derivation unit 3036134 derives a merge candidate of which the reference picture index refIdxLX is i and of which both of the X component and the Y component of the vector mvLX are equal to 0 until the number of merge candidates derived reaches a maximum number. The value of i that indicates the reference picture index refIdxLX is assigned in order from zero. The derived merge candidate is stored in the merge candidate storage unit 303611.

The merge candidate selection unit 30362 selects a merge candidate to which the index corresponding to the merge index merge_idx input from the inter prediction parameter decoding control unit 3031 is assigned from the merge candidates stored in the merge candidate storage unit 303611 as the inter prediction parameters of the target PU. That is, given that the merge candidate list is mergeCandList, the prediction parameters indicated by mergeCandList[merge_idx] are selected. In a case where the merge candidate selected is an inter-view merge candidate, the merge candidate selection unit 30362 sets a sub-block motion compensation flag subPbMotionFlag to 1. The merge candidate selection unit 30362 may set the sub-block motion compensation flag subPbMotionFlag to 1 also in a case where the VSP mode flag vspModeFlag of the merge candidate is equal to 1. Otherwise, the sub-block motion compensation flag subPbMotionFlag is set to 0. The merge candidate selection unit 30362 stores the selected merge candidate in the prediction parameter memory 307 (FIG. 5) and outputs the merge candidate to the predicted image generation unit 308 (FIG. 5).

$$predSamplesLX'[x][y]=predSamplesLX[x][y]$$

Figure 8:
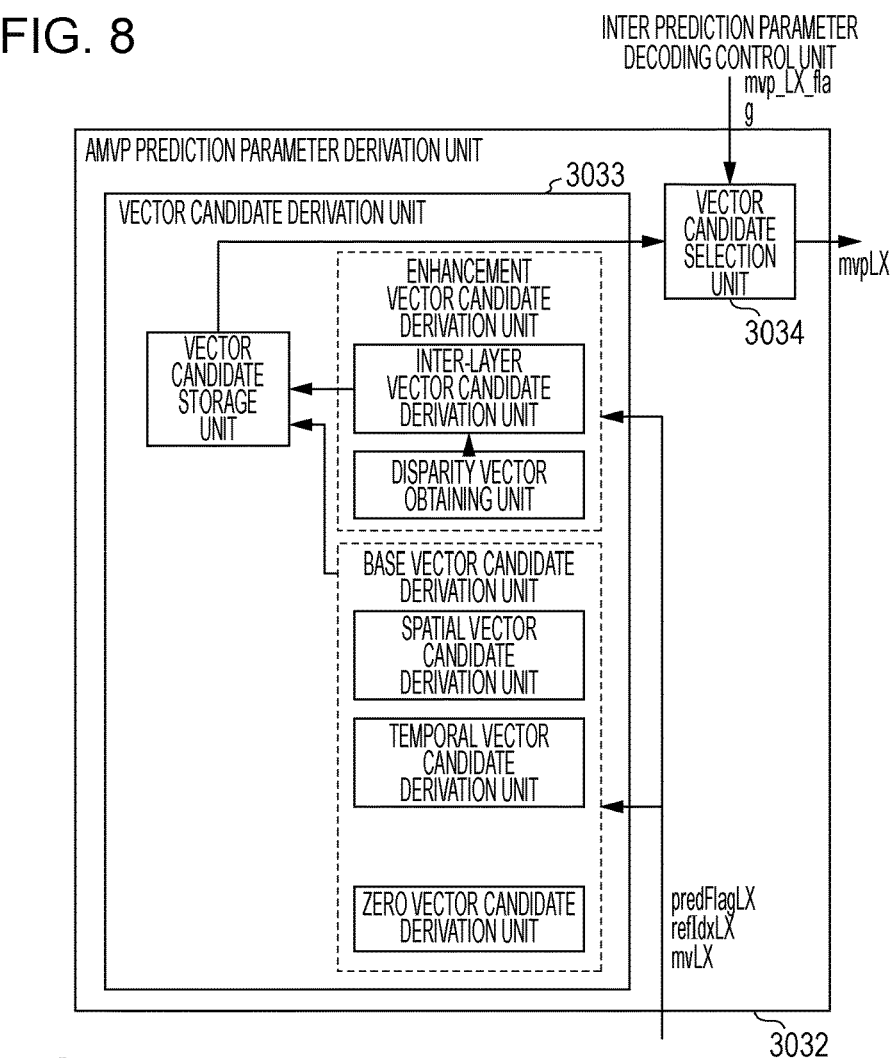
FIG. 8 is a schematic diagram illustrating a configuration of an AMVP prediction parameter derivation unit according to the present embodiment.

FIG. 8 is a schematic diagram illustrating a configuration of the AMVP prediction parameter derivation unit 3032 according to the present embodiment. The AMVP prediction parameter derivation unit 3032 includes a vector candidate derivation unit 3033 and a predicted vector selection unit 3034. The vector candidate derivation unit 3033 reads a vector stored in the prediction parameter memory 307 (FIG. 5) on the basis of the reference picture index refIdx and generates a vector candidate list mvpListLX. Reference blocks are blocks that are present at predetermined positions with the position of the prediction unit as a reference (for example, blocks that temporally neighbour the lower left end and the upper right end of the prediction unit).

The predicted vector selection unit 3034 selects, from the vector candidate mvpListLX derived by the vector candidate derivation unit 3033, a vector mvpListLX[mvp_lX_flag] that is indicated by the predicted vector flag mvp_LX_flag input from the inter prediction parameter decoding control unit 3031 as the predicted vector mvpLX. The predicted vector selection unit 3034 outputs the selected predicted vector mvpLX to the addition unit 3035.

The addition unit 3035 adds the predicted vector mvpLX input from the predicted vector selection unit 3034 and the difference vector mvdLX input from the inter prediction parameter decoding control unit to calculate the vector mvLX. The addition unit 3035 outputs the calculated vector mvLX to the predicted image generation unit 308 (FIG. 5).

Figure 10:
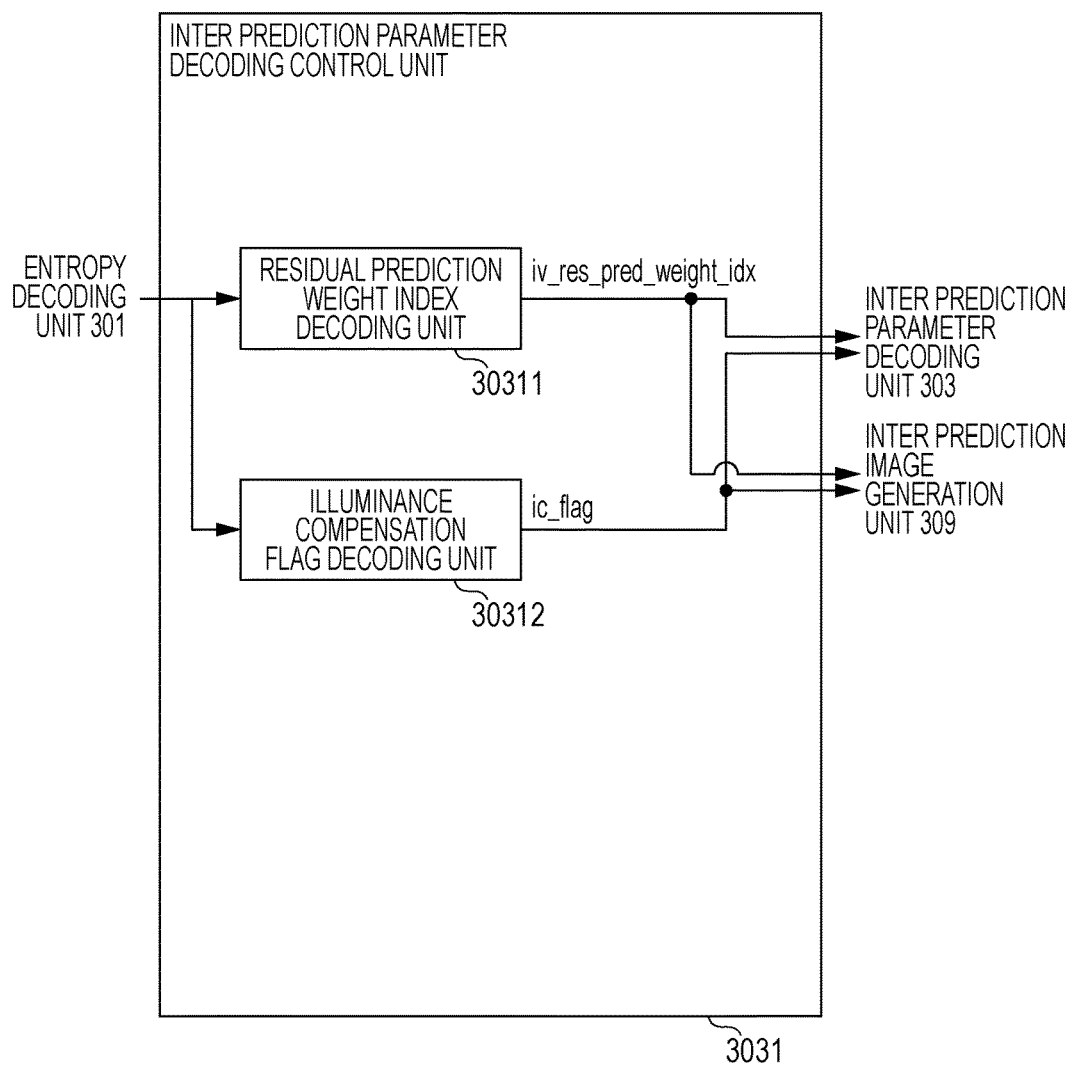
FIG. 10 is a schematic diagram illustrating a configuration of an inter prediction parameter decoding control decoding unit according to the present embodiment.

FIG. 10 is a block diagram illustrating a configuration of the inter prediction parameter decoding control unit 3031 of the first embodiment. As illustrated in FIG. 10, the inter prediction parameter decoding control unit 3031 is configured to include a residual prediction index decoding unit 30311 and an illuminance compensation flag decoding unit 30312 and, not illustrated, a partition mode decoding unit, a merge flag decoding unit, a merge index decoding unit, an inter prediction flag decoding unit, a reference picture index decoding unit, a vector candidate index decoding unit, and a vector difference decoding unit. The partition mode decoding unit, the merge flag decoding unit, the merge index decoding unit, the inter prediction flag decoding unit, the reference picture index decoding unit, the vector candidate index decoding unit, and the vector difference decoding unit respectively decode the partition mode part_mode, the merge flag merge_flag, the merge index merge_idx, the inter prediction flag inter_pred_idc, the reference picture index refIdxLX, the predicted vector flag mvp_LX_flag, and the difference vector mvdLX.

The residual prediction index decoding unit 30311 (residual prediction flag decoding unit) uses the entropy decoding unit 301 to decode the residual prediction index iv_res_pred_weight_idx from the coded data in a case where a partition mode PartMode(part_mode) of the coding unit CU is 2N×2N. Otherwise, the residual prediction index decoding unit 30311 sets iv_res_pred_weight_idx to 0 (infers iv_res_pred_weight_idx to be equal to 0). The residual prediction index decoding unit 30311 outputs the decoded residual prediction index iv_res_pred_weight_idx to the merge mode parameter derivation unit 3036 and the inter prediction image generation unit 309. The residual prediction index is a parameter for changing operation of residual prediction. In the present embodiment, the residual prediction index is an index that indicates the weight of residual prediction and has the values 0, 1, and 2. Residual prediction is not performed in a case where iv_res_pred_weight_idx is equal to 0. A vector used in residual prediction may be changed instead of changing the weight of residual prediction according to the index. A flag (residual prediction flag) that indicates whether or not to perform residual prediction may be used instead of the residual prediction index.

The illuminance compensation flag decoding unit 30312 uses the entropy decoding unit 301 to decode the illuminance compensation flag ic_flag from the coded data in a case where the partition mode PartMode is 2N×2N. Otherwise, the illuminance compensation flag decoding unit 30312 sets ic_flag to 0 (infers ic_flag to be zero). The illuminance compensation flag decoding unit 30312 outputs the decoded illuminance compensation flag ic_flag to the merge mode parameter derivation unit 3036 and the inter prediction image generation unit 309.

(Inter Prediction Image Generation Unit 309)

Figure 11:
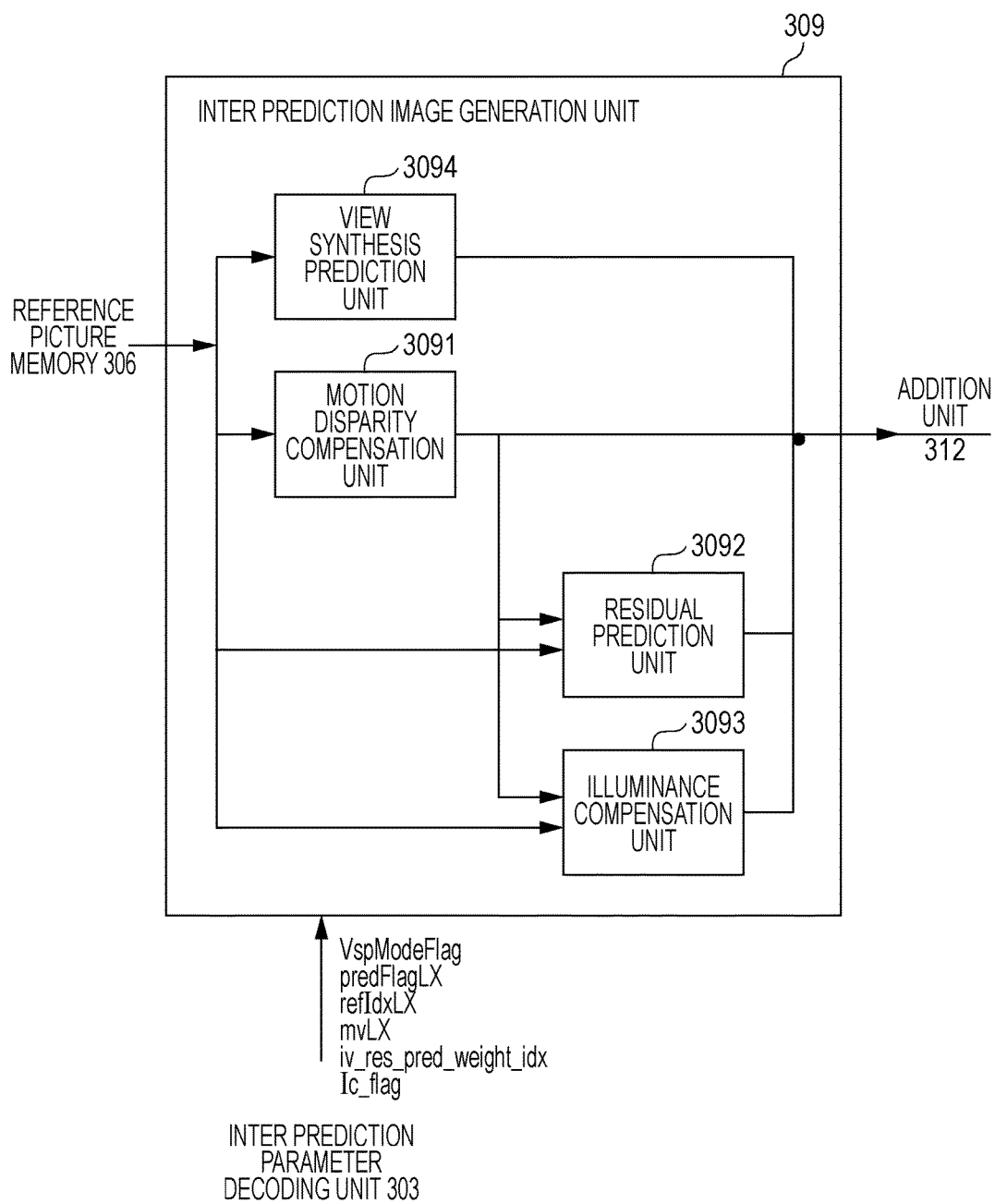
FIG. 11 is a schematic diagram illustrating a configuration of an inter prediction image generation unit according to the present embodiment.

FIG. 11 is a schematic diagram illustrating a configuration of the inter prediction image generation unit 309 according to the present embodiment. The inter prediction image generation unit 309 is configured to include a motion disparity compensation unit 3091, a residual prediction unit 3092, an illuminance compensation unit 3093, and the view synthesis prediction unit 3094.

The inter prediction image generation unit 309 receives input of the VSP mode flag VspModeFlag and prediction parameters from the inter prediction parameter decoding unit 303. The inter prediction image generation unit 309, in a case where the VSP mode flag VspModeFlag is equal to 1, outputs the prediction parameters to the view synthesis prediction unit 3094 and derives the predicted image predSamples. In a case where the VSP mode flag VspModeFlag is equal to 0, the inter prediction image generation unit 309 derives the predicted image predSamples using the motion disparity compensation unit 3091 with the prediction parameters. The inter prediction image generation unit 309, in a case where the residual prediction index iv_res_pred_weight_idx is not equal to 0, sets a residual prediction execution flag resPredFlag to 1 that indicates that residual prediction is performed and outputs the residual prediction execution flag resPredFlag to the motion disparity compensation unit 3091 and the residual prediction unit 3092. Meanwhile, in a case where the residual prediction index iv_res_pred_weight_idx is equal to 0, the residual prediction execution flag resPredFlag is set to 0 and is output to the motion disparity compensation unit 3091 and the residual prediction unit 3092.

(Motion Disparity Compensation)

The motion disparity compensation unit 3091 generates a motion predicted image (predicted image) on the basis of the prediction list utilization flag predFlagLX, the reference picture index refIdxLX, and the vector mvLX (motion vector or disparity vector). The motion disparity compensation unit 3091 generates the predicted image by reading from the reference picture memory 306 blocks that are present at positions shifted by the vector mvLX from the position of the prediction unit of the reference picture specified by the reference picture index refIdxLX as a starting point and by performing interpolation. In a case where the vector mvLX is not an integer vector, the predicted image is generated by applying a filter referred to as a motion compensation filter (or disparity compensation filter) for generating pixels at fractional positions. Generally, the above process is referred to as motion compensation in a case where the vector mvLX is a motion vector and is referred to as disparity compensation in a case where the vector mvLX is a disparity vector. Motion compensation and disparity compensation will be collectively represented as motion disparity compensation. Hereinafter, a predicted image from the L0 prediction will be referred to as predSamplesL0, and a predicted image from the L1 prediction will be referred to as predSamplesL1. In a case of not distinguishing both from each other, both will be referred to as predSamplesLX. Hereinafter, an example in which residual prediction and illuminance compensation are further performed of the predicted image predSamplesLX obtained in the motion disparity compensation unit 3091 will be described, and output images of the residual prediction and the illuminance compensation will also be referred to as the predicted image predSamplesLX. In the residual prediction and the illuminance compensation described below, input images will be represented as predSamplesLX, and output images will be represented as predSamplesLX in a case of distinguishing the input images and output images from each other.

The motion disparity compensation unit 3091, in a case where the residual prediction execution flag resPredFlag is equal to 0, generates the motion-compensated image predSamplesLX using a motion compensation filter having eight taps for luma components and four taps for chroma components. In a case where the residual prediction execution flag resPredFlag is equal to 1, the motion-compensated image predSamplesLX is generated by using a motion compensation filter having two taps for luma components and two taps for chroma components.

The motion disparity compensation unit 3091 performs motion compensation in units of sub-blocks in a case where the sub-block motion compensation flag subPbMotionFlag is equal to 1. Specifically, a vector, a reference picture index, and a reference list utilization flag of a sub-block at the coordinates (xCb, yCb) are derived from the following expressions.

$$MvL0[xCb+x][yCb+y]=subPbMotionFlag?SubPbMvL0[xCb+x][yCb+y]:mvL0$$

$$MvL1[xCb+x][yCb+y]=\text{sub}PbMotionFlag?SubPb\text{-}MvL1[xCb+x][yCb+y]:mvL1$$

$$\text{RefIdx}L0[xCb+x][yCb+y]=\text{sub}PbMotionFlag?SubP\text{-}bRefIdxL0[xCb+x][yCb+y]:\text{refIdx}L0$$

$$\text{RefIdx}L1[xCb+x][yCb+y]=\text{sub}PbMotionFlag?SubP\text{-}bRefIdxL1[xCb+x][yCb+y]:\text{refIdx}L1$$

$$\text{PredFlag}L0[xCb+x][yCb+y]=\text{sub}PbMotionFlag?Sub\text{-}PbPredFlagL0[xCb+x][yCb+y]:\text{predFlag}L0$$

$$\text{PredFlag}L1[xCb+x][yCb+y]=\text{sub}PbMotionFlag?Sub\text{-}PbPredFlagL1[xCb+x][yCb+y]:\text{predFlag}L1$$

SubPbMvLX, SubPbRefIdxLX, and SubPbPredFlagLX (X is zero or one) correspond to subPbMvLX, subPbRefIdxLX, and subPbPredFlagLX described with the inter-view merge candidate derivation unit.

(Residual Prediction)

The residual prediction unit 3092 performs residual prediction in a case where the residual prediction execution flag resPredFlag is equal to 1. The residual prediction unit 3092 outputs the input predicted image predSamplesLX as is in a case where the residual prediction execution flag resPredFlag is equal to 0. refResSamples residual prediction is performed by estimating a residual of the motion-compensated image predSampleLX generated by motion prediction or disparity prediction and adding the residual to the predicted image predSamplesLX of the target layer. Specifically, in a case where motion prediction is performed for the prediction unit, a residual of a reference layer that is previously derived is used as an estimated value of a residual of the target layer, assuming that the same residual as the reference layer also occurs in the target layer. In a case where disparity prediction is performed for the prediction unit, a residual of a picture of a reference layer at a different time (POC) from the target picture and a residual of a picture of the target layer are used as an estimated value of a residual of the target layer.

The residual prediction unit 3092 performs residual prediction in units of sub-blocks in the same manner as the motion disparity compensation unit 3091 in a case where the sub-block motion compensation flag subPbMotionFlag is equal to 1.

Figure 13:
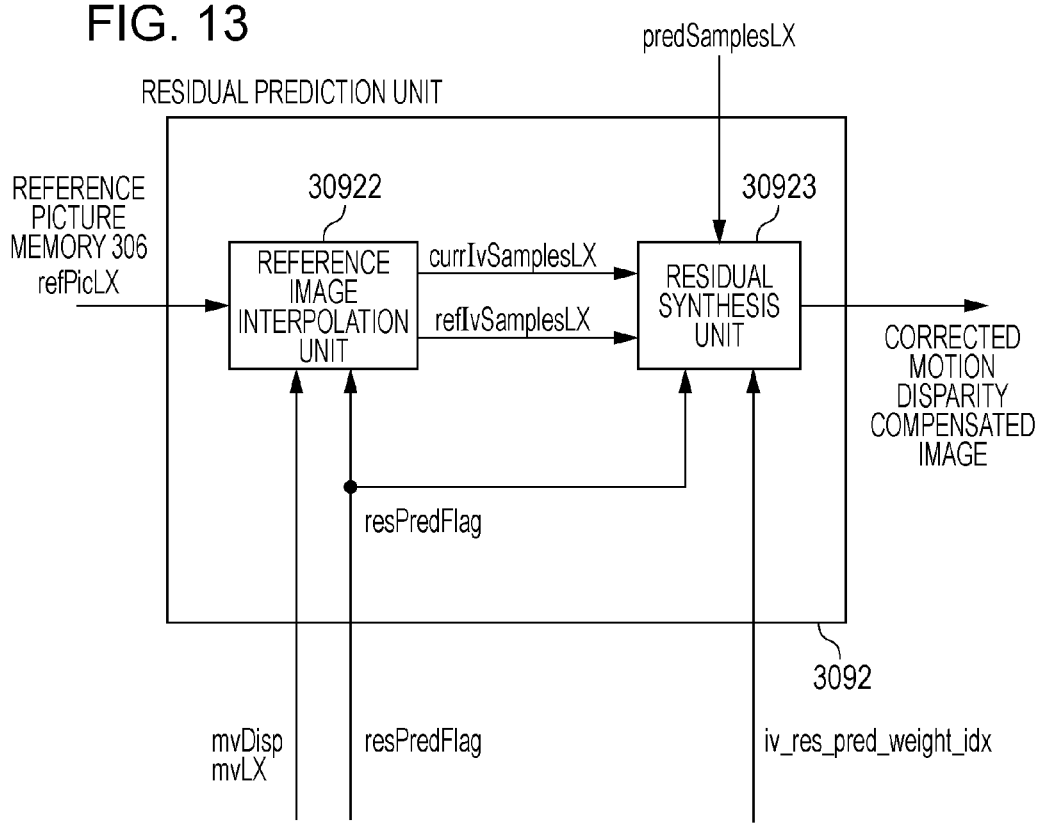
FIG. 13 is a diagram illustrating a splitting method for a sub-block in the view synthesis unit.

FIG. 13 is a block diagram illustrating a configuration of the residual prediction unit 3092. The residual prediction unit 3092 is configured of a reference image interpolation unit 30922 and a residual synthesis unit 30923.

The reference image interpolation unit 30922, in a case where the residual prediction execution flag resPredFlag is equal to 1, generates two residual prediction motion-compensated images (corresponding block currIvSamplesLX and reference block refIvSamplesLX) using the vector mvLX and the residual prediction disparity vector mvDisp input from the inter prediction parameter decoding unit 303 and a reference picture stored in the reference picture memory 306. currIvSamplesLX and refIvSamplesLX are respectively represented as rpSamplesLX and rpRefSamplesLX.

The residual prediction unit 3092 derives an inter-view prediction flag ivRefFlag that is a flag indicating whether motion prediction or disparity prediction is performed for the target block using the expression (DiffPicOrderCnt(currPic, RefPicListX[refIdxLX])==0). DiffPicOrderCnt(X, Y) indicates the difference between the POC of a picture X and the POC of a picture Y (the same applies hereinafter). Therefore, in a case where the POC of the target picture currPic and the POC of the reference picture RefPicListX [refIdxLX] represented by the reference picture index refIdxLX and the reference picture list RefPicListX are equal to 0, disparity prediction is considered to be performed for the target block, and ivRefFlag is set to 1. Otherwise, motion prediction is considered to be performed for the target block, and ivRefFlag is set to 0.

Figure 14:
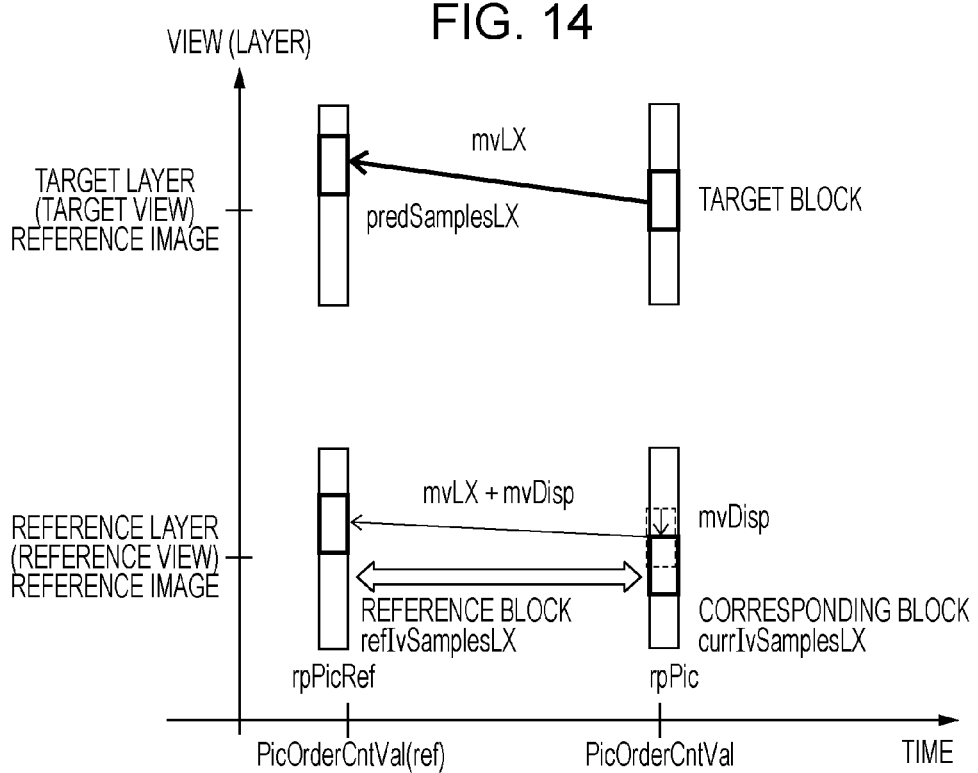
FIG. 14 is a conceptual diagram (1) of residual prediction according to the present embodiment.

FIG. 14 is a diagram illustrating the corresponding block currIvSamplesLV and the reference block refIvSamplesLX in a case where the vector mvLX is a motion vector (in a case where the inter-view prediction flag ivRefFlag is equal to 0). As illustrated in FIG. 14, the corresponding block that corresponds to the prediction unit on the target layer is positioned at a block that is present at a position shifted by the disparity vector mvDisp which is a vector indicating a positional relationship between the reference layer and the target layer from the position of the prediction unit of an image on the reference layer as a starting point. Thus, a vector mvC of the corresponding block currIvSamplesLX is derived by the following expressions using the disparity vector mvDisp.

$$mvC[0]=mv\text{Disp}[0]$$

$$mvC[1]=mv\text{Disp}[1]$$

The reference block refIvSamplesLX that corresponds to the corresponding block on the reference layer is positioned at a block that is present at a position shifted by the motion vector mvLX of the prediction unit from the position of the corresponding block of the reference image on the reference layer as a starting point. Thus, a vector mvR of the reference block refIvSamplesLX is derived by the following expressions using the disparity vector mvDisp.

$$mvR[0]=mvLX[0]+mv\text{Disp}[0]$$

$$mvR[1]=mvLX[1]+mv\text{Disp}[1]$$

Figure 15:
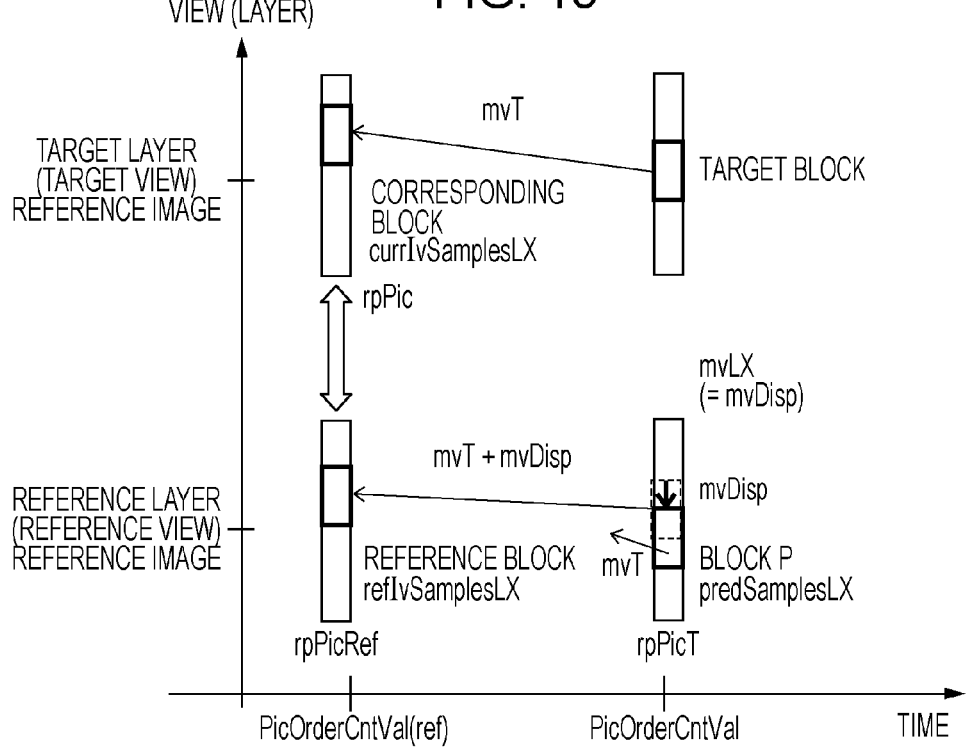
FIG. 15 is a conceptual diagram (2) of residual prediction according to the present embodiment.

FIG. 15 is a diagram illustrating the corresponding block currIvSamplesLV and the reference block refIvSamplesLX in a case where the vector mvLX is a disparity vector (in a case where the inter-view prediction flag ivRefFlag is equal to 1). As illustrated in FIG. 15, the corresponding block currIvSamplesLX is a block on a reference picture rpPic that has the same view ID as the target picture but is present at a different time from the target picture. The residual prediction unit 3092 derives mvT that is a vector of the prediction unit on a picture mvPicT at a location indicated by the vector mvLX (=disparity vector mvDisp) of the target block. The corresponding block currIvSamplesLX is positioned at a block that is present at a position shifted by the vector mvT from the position of the prediction unit (target block) as a starting point. Thus, the vector mvC of the corresponding block currIvSamplesLX is derived by the following expressions.

$$mvC[0]=mvT[0]$$

$$mvC[1]=mvT[1]$$

As illustrated in FIG. 15, the reference block refIvSamplesLX is a block on a reference picture rpPicRef that has a different view ID from the target picture and is present at a different time from the target picture. In a case where the inter-view prediction flag ivRefFlag is equal to 1, given that the disparity vector of the target prediction unit is mvDisp and that the motion vector of the prediction unit of a picture rpPicT at a location indicated by the disparity vector mvDisp of the target block is mvT, the reference block refIvSamplesLX is positioned at a block that is present at a position shifted by the vector mvDisp+mvT from the position of the prediction unit (target block) as a starting point. Thus, the vector mvR of the reference block refIvSamplesLX is derived by the following expressions using the disparity vector mvDisp.

$$mvR[0]=mvT[0]+mvDisp[0]$$

$$mvR[1]=mvT[1]+mvDisp[1]$$

The motion vector mvT uses a vector of a picture on the reference layer at the same time as the target picture (block P that corresponds to predSamplesLX in FIG. 15). For example, in a case where the upper left coordinates of the block are (xP, yP) and the disparity vector thereof is mvLX[ ], the motion vector at the corresponding position (xRef, yRef) is referenced.

$$xRef=Clip3(0,PicWidthInSamples_L-1,xP+ (nPSW>>1)+((mvLX[0]+2)>>2))$$

$$yRef=Clip3(0,PicHeightInSamples_L-1,yP+ (nPSH>>1)+((mvLX[1]+2)>>2))$$

The reference image interpolation unit 30922 generates an interpolated image of the reference block currIvSamplesLX by setting the vector mvLX to the vector mvC. A pixel at a position shifted by the vector mvLX of the prediction unit from coordinates (x, y) of a pixel of the interpolated image is derived by linear interpolation (bilinear interpolation). Considering that the disparity vector LX has a fractional precision of ¼ pel, the reference image interpolation unit 30922 derives an X coordinate xInt and a Y coordinate yInt of a pixel R0 of an integer precision corresponding to a case where the coordinates of a pixel of the prediction unit are (xP, yP) and an X component fractional part xFrac and a Y component fractional part yFrac of the disparity vector mvDisp using the following expressions.

$$xInt=xPb+(mvLX[0]>>2)$$

$$yInt=yPb+(mvLX[1]>>2)$$

$$xFrac=mvLX[0]\&3$$

$$yFrac=mvLX[1]\&3$$

X & 3 is a mathematical expression that obtains only lower two bits of X.

Next, the reference image interpolation unit 30922 generates an interpolated image predPartLX[x][y] considering that the vector mvLX has a fractional precision of ¼ pel. First, the coordinates of integer pixels A (xA, yB), B (xB, yB), C (xC, yC), and D(xD, yD) are derived by the following expressions.

$$xA=Clip3(0,picWidthInSamples-1,xInt)$$

$$xB=Clip3(0,picWidthInSamples-1,xInt+1)$$

$$xC=Clip3(0,picWidthInSamples-1,xInt)$$

$$xD=Clip3(0,picWidthInSamples-1,xInt+1)$$

$$yA=Clip3(0,picHeightInSamples-1,yInt)$$

$$yB=Clip3(0,picHeightInSamples-1,yInt)$$

$$yC=Clip3(0,picHeightInSamples-1,yInt+1)$$

$$yD=Clip3(0,picHeightInSamples-1,yInt+1)$$

The integer pixel A is a pixel that corresponds to the pixel R0, and the integer pixels B, C, and D are respectively right, lower, and lower right neighbouring pixels of an integer precision with respect to the integer pixel A. The reference image interpolation unit 30922 reads reference pixels refPicLX[xA][yA], refPicLX[xB][yB], refPicLX[xC][yC], and refPicLX[xD][yD] that respectively correspond to the integer pixels A, B, C, and D from the reference picture memory 306.

The reference image interpolation unit 30922 uses the reference pixels refPicLX[xA][yA], refPicLX[xB][yB], refPicLX[xC][yC], and refPicLX[xD][yD] and the X component fractional part xFrac and the Y component fractional part yFrac of the vector mvLX to derive using linear interpolation (bilinear interpolation) an interpolated pixel predPartLX[x][y] that is a pixel at a position shifted by the fractional part of the vector mvLX from the pixel R0. Specifically, the derivation uses the following expression.

$$predPartLX[x][y]=(refPicLX[xA][yA](8-xFrac)*(8-yFrac)+refPicLX[xB][yB]*(8-yFrac)*xFrac+refPicLX[xC][yC]*(8-xFrac)*yFrac+refPicLX[xD][yD]*xFrac*yFrac)>>6$$

While the above derivation is performed by one step of bilinear interpolation using four points of pixels around the target pixel, the residual prediction interpolated image may be generated by two steps of linear interpolation by separating horizontal linear interpolation and vertical linear interpolation from each other.

The reference image interpolation unit 30922 performs the interpolated pixel derivation process for each pixel within the prediction unit and sets the set of interpolated pixels as an interpolated block predPartLX. The reference image interpolation unit 30922 outputs the derived interpolated block predPartLX as the corresponding block currIvSamplesLX to the residual synthesis unit 30923.

The reference image interpolation unit 30922 derives the reference block refIvSamplesLX by performing the same process as the process of deriving the corresponding block currIvSamplesLX except for the point that the disparity vector mvLX is replaced by the vector mvR. The reference image interpolation unit 30922 outputs the reference block refIvSamplesLX to the residual synthesis unit 30923.

(Derivation of Reference Picture for Residual Prediction)

The above operation is more generally described as follows. The residual prediction unit 3092 derives the reference pictures rpPic and rpPicRef, which are reference pictures referenced in the derivation of the residual prediction motion-compensated images (currIvSamplesLX/rpSamplesLX and refIvSamplesLX/rpRefSamplesLX), and vectors mvRp and mvRpRef that indicate the positions of the reference blocks (relative coordinates of the reference blocks with the coordinates of the target block as a reference).

The residual prediction unit 3092 sets rpPic to be a picture that is at the same display time (POC) or has the same view ID as the target picture to which the target block belongs.

Specifically, the residual prediction unit 3092, in a case where motion prediction is performed for the target block (in a case where the inter-view prediction flag ivRefFlag is equal to 0), derives the reference picture rpPic using the condition that the POC of the reference picture rpPic is equal to PicOrderCntVal that is the POC of the target picture and that the view ID of the reference picture rpPic is equal to a reference view ID RefViewIdx[xP][yP] (different from the view ID of the target picture) of the prediction unit. Furthermore, the residual prediction unit 3092 sets the vector mvRp of rpPic to the disparity vector MvDisp.

The residual prediction unit 3092, in a case where disparity prediction is performed for the target block (in a case where the inter-view prediction flag ivRefFlag is equal to 1), sets rpPic to be a reference picture that is used in the generation of the predicted image of the target block. That is, in a case where the reference index of the target block is RpRefIdxLY and the reference picture list is RefPicListY, the reference picture rpPic is derived from the expression RefPicListY[RpRefIdxLY]. Furthermore, a residual prediction vector derivation unit 30924 (described later), not illustrated, that is included in the residual prediction unit 3092 derives mvT, which is the vector of the prediction unit on a picture at a location indicated by the vector mvLX (equal to the disparity vector MvDisp) of the target block and having the same POC as but having a different view ID from the target picture, and sets the vector mvRp of rpPic to the motion vector mvT.

Next, the residual prediction unit 3092 sets rpPicRef to be a reference picture that is at a different display time (POC) and has a different view ID from the target picture.

Specifically, the residual prediction unit 3092, in a case where motion prediction is performed for the target block (in a case where the inter-view prediction flag ivRefFlag is equal to 0), derives the reference picture rpPicRef using the condition that the POC of the reference picture rpPicRef is equal to the POC of the reference picture RefPicListY[RpRefIdxLY] of the target block and that the view ID of the reference picture rpPicRef is equal to the view ID RefViewIdx[xP][yP] of the reference picture of the disparity vector MvDisp. Furthermore, the residual prediction unit 3092 sets the vector mvRpRef of rpPicRef to (mvRp+mvLX) which is the sum of the vector mvRp and the vector mvLX into which the motion vector of the prediction block is scaled.

The residual prediction unit 3092, in a case where disparity prediction is performed for the target prediction unit (in a case where the inter-view prediction flag ivRefFlag is equal to 1), derives the reference picture rpPicRef using the condition that the POC of the reference picture rpPicRef is equal to the POC of the reference picture rpPic and that the view ID of the reference picture rpPicRef is equal to the view ID RefViewIdx[xP][yP] of the prediction unit. Furthermore, the residual prediction unit 3092 sets the vector mvRpRef of rpPicRef to (mvRp+mvLX) which is the sum of the vector mvRp and the motion vector mvLX of the prediction block.

That is, mvRp and mvRpRef are derived in the residual prediction unit 3092 as follows.

In a case where the inter-view prediction flag ivRefFlag is equal to 0

$mvRp = MvDisp$      Expression (B-1)

$mvRpRef = mvRp + mvLX(=mvLX + MvDisp)$      Expression (B-2)

In a case where the inter-view prediction flag ivRefFlag is equal to 1

$mvRp = mvT$      Expression (B-3)

$mvRpRef = mvRp + mvLX(=mvLX + mvT)$      Expression (B-4)

(Residual Prediction Vector Derivation Unit 30924)

The residual prediction vector derivation unit 30924 derives the vector mvT of the prediction unit on a picture different from the target picture. The residual prediction vector derivation unit 30924 derives the vector mvT and the view ID from motion compensation parameters (vector, reference picture index, and view ID) of the prediction unit on the reference picture using the reference picture, the target block coordinates (xP, yP), the target block sizes nPSW and nPSH, and the vector mvLX as input. The residual prediction vector derivation unit 30924 uses the following expressions to derive the reference coordinates (xRef, yRef) as center coordinates of a block that is present at a position shifted by the vector mvLX from the target block on the reference picture indicated as input.

$xRef = Clip3(0, PicWidthInSamples_L - 1, xP + (nPSW >> 1) + ((mvDisp[0] + 2) >> 2))$ $yRef = Clip3(0, PicHeightInSamples_L - 1, yP + (nPSH >> 1) + ((mvDisp[1] + 2) >> 2))$ The residual prediction vector derivation unit 30924 derives the vector mvLX and the reference picture index refPicLX of refPU that is the prediction unit including the reference block coordinates (xRef, yRef).

In a case where disparity prediction is performed for the target prediction unit (DiffPicOrderCnt(currPic, refPic) is equal to 0) and motion prediction is performed for the reference prediction unit refPU (DiffPicOrderCnt(refPic, refPicListRefX[refIdxLX]) is equal to other than zero), the vector of refPU is set to mvT, and a reference availability flag availFlagT is set to 1. By the above process, the vector of a block that uses a picture having the same POC as but having a different view ID from the target picture as a reference picture can be derived as mvT.

The residual prediction vector derivation unit 30924 derives the vector of the prediction unit on a picture different from the target picture. The residual prediction vector derivation unit 30924 derives the following reference block coordinates (xRef, yRef) using the target block coordinates (xP, yP), the target block sizes nPbW and nPbH, and the disparity vector mvDisp as input.

$xRef = Clip3(0, PicWidthInSamples_L - 1, xP + (nPSW >> 1) + ((mvDisp[0] + 2) >> 2))$ $yRef = Clip3(0, PicHeightInSamples_L - 1, yP + (nPSH >> 1) + ((mvDisp[1] + 2) >> 2))$ The residual prediction vector derivation unit 30924 derives the vector mvLX and the reference picture index refPicLX of refPU that is the prediction unit including the reference block coordinates (xRef, yRef).

In a case where motion prediction is performed for the target prediction unit (DiffPicOrderCnt(currPic, refPic) is equal to other than zero) and disparity prediction is performed for the reference prediction unit refPU (DiffPicOrderCnt(refPic, refPicListRefX[refIdxLX]) is equal to 0), the reference availability flag availFlagT is set to 1. Accordingly, the vector of a block that uses a picture having the same POC as but having a different view ID from the target picture as a reference picture can be derived as mvT.

(Derivation and Addition of Residual)

The residual synthesis unit 30923, in a case where the residual prediction execution flag resPredFlag is equal to 1, derives a residual from the difference between two residual prediction motion-compensated images (currIvSamplesLX and refIvSamplesLX) and derives a predicted image by adding this residual to a motion-compensated image. Specifically, the residual synthesis unit 30923 derives a corrected predicted image predSamplesLX' from the predicted image predSamplesLX, the corresponding block currIvSamplesLX, the reference block refIvSamplesLX, and the residual prediction index iv_res_pred_weight_idx. The corrected predicted image predSamplesLX' is obtained by using the following expression.

$predSamplesLX'[x][y] = predSamplesLX[x][y] + ((currIvSamplesLX[x][y] - refIvSamplesLX[x][y]) >> (iv\_res\_pred\_weight\_idx - 1))$ x ranges from zero to the prediction block width−1, and y ranges from zero to the prediction block height−1. The residual synthesis unit 30923 outputs the predicted image predSamplesLX as is as in the following expression in a case where the residual prediction execution flag resPredFlag is equal to 0.

predSamples*LX'*[x][y]=predSamples*LX*[x][y]

Figure 21:
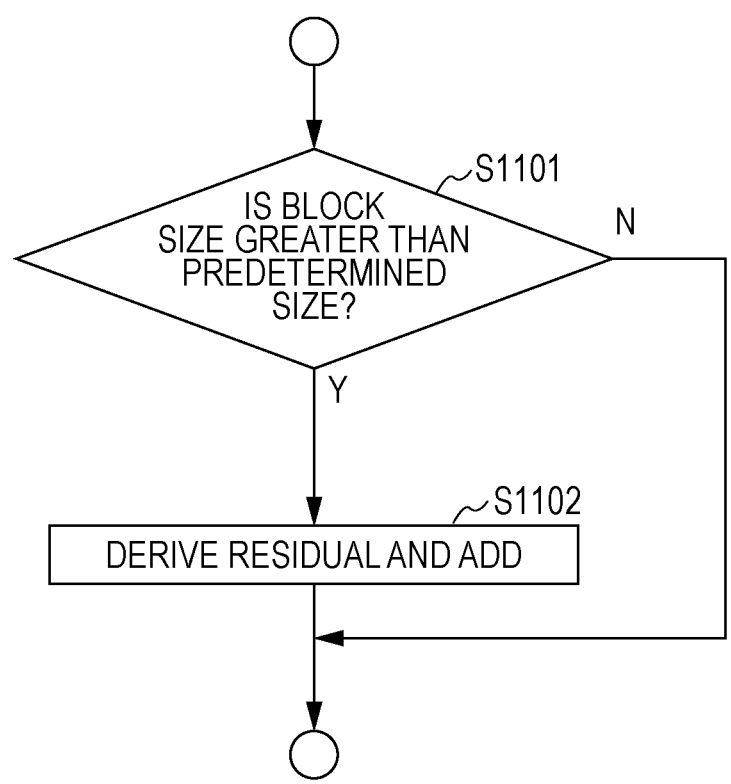
FIG. 21 is a flowchart illustrating operation of a residual synthesis unit 30923 of the present embodiment.

FIG. 21 is a flowchart illustrating operation of the residual synthesis unit 30923 of the present embodiment. Blocks targeted by the residual synthesis unit 30923 are a luma block and two chroma blocks. In a case where the sub-block motion compensation flag subPbMotionFlag is equal to 0, the width and the height of the luma block are equal to a width PbW and a height PbH of the prediction unit, and the width and the height of the chroma blocks are PbW/2 and PbH/2. In a case where the sub-block motion compensation flag subPbMotionFlag is equal to 1, the width and the height of the luma block are equal to a width nSubBlkW and a height nSubBlkH of a sub-block, and the width and the height of the chroma block are nSubBlkW/2 and nSubBlkH/2.

(Step S1101) A determination of whether or not the block size of the target block is greater than a predetermined size is performed. In a case where the block size is greater than a predetermined size, the operation transitions to Step S1102. In a case where the block size is less than a predetermined size, the operation is ended. The block size is determined to be greater than a predetermined size in a case, for example, where the width of the block is greater than four (greater than or equal to 8). The block size may be determined to be greater than a predetermined size in a case where the sum of the width and the height of the block is greater than 12.

(Step S1102) In a case where the block size of the target block is greater than a predetermined size, residual prediction is performed by deriving the difference between the two residual prediction motion-compensated images currIvSampleLX and refIvSampleLX as a residual and adding the residual to the motion-compensated image predSamplesLX. For example, in a case where the block is a luma block, a corrected predicted image predSamplesLX_L' is derived from a predicted image predSamplesLX_L, a corresponding block currIvSamplesLX_L, a reference block refIvSamplesLX_L, and the residual prediction index iv_res_pred_weight_idx.

predSamples*LX_L'*[x][y]=predSamples*LX_L*[x][y]+((curr*Iv*Samples*LX_L*[x][y]−ref*Iv*Samples*LX_L*[x][y])>>(iv_res_pred_weight_idx−1))   Expression (A-1)

x is an integer greater than or equal to 0 and less than or equal to PbW−1, and y is an integer greater than or equal to 0 and less than or equal to PbH−1.

For example, in a case where the block is a chroma block, the residual synthesis unit 30923 derives a corrected predicted image predSamplesLX_Cb' from a predicted image predSamplesLX_Cb, a corresponding block currIvSamplesLX_Cb, a reference block refIvSamplesLX_Cb, and the residual prediction index iv_res_pred_weight_idx.

predSamples*LX_Cb'*[x][y]=predSamples*LX_Cb*[x][y]+((curr*Iv*Samples*LX_Cb*[x][y]−ref*Iv*Samples*LX_Cb*[x][y])>>(iv_res_pred_weight_idx−1))   Expression (A-2)

The residual synthesis unit 30923 derives a corrected predicted image predSamplesLX_Cr' from a predicted image predSamplesLX_Cr, a corresponding block currIvSamplesLX_Cr, a reference block refIvSamplesLX_Cr, and the residual prediction index iv_res_pred_weight_idx.

predSamples*LX_Cr'*[x][y]=predSamples*LX_Cr*[x][y]+((curr*Iv*Samples*LX_Cr*[x][y]−ref*Iv*Samples*LX_Cr*[x][y])>>(iv_res_pred_weight_idx−1))   Expression (A-3)

x is an integer greater than or equal to 0 and less than or equal to PbW/2−1, and y is an integer greater than or equal to 0 and less than or equal to PbH/2−1.

According to the residual synthesis unit 30923 configured as above, the effect of reducing the amount of processing is achieved by not performing residual prediction in a case where the block size of the target block is less than a predetermined size. In a case of not performing residual prediction, not only addition of the residual is not required, but also derivation of two residual prediction motion-compensated images (currIvSamplesLX and refIvSamplesLX) used in derivation of the difference is not required. Thus, transmission and interpolation processes are not required to be performed for a reference image for deriving these residual prediction motion compensation. In particular, in a case where the block size is small, the amount of processing of residual prediction is increased because overhead for interpolation of a processed area (per pixel) and transmission of the reference image is increased. Therefore, the effect of reducing the worst-case amount of processing that acts as a bottleneck in a residual prediction process is achieved by turning residual prediction OFF in a case where the block size is small.

Figure 22:
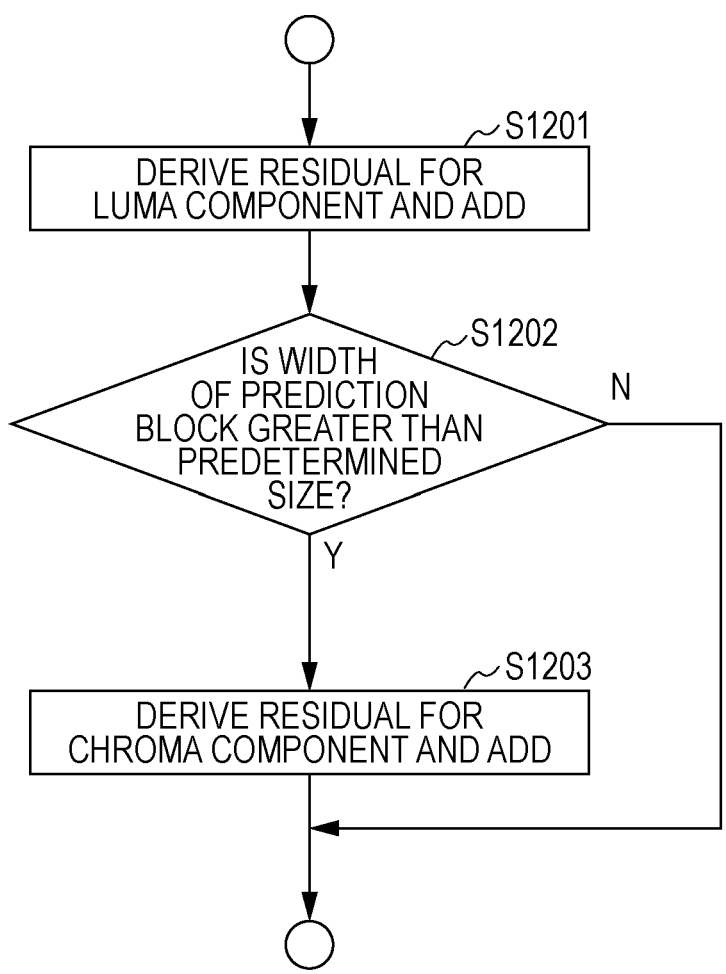
FIG. 22 is a flowchart illustrating operation of the residual synthesis unit 30923 of the present embodiment.

FIG. 22 is a flowchart illustrating operation of the residual synthesis unit 30923 of the present embodiment. In a case where the partition mode PredMode of the coding unit CU is 2N×2N, the residual prediction index iv_res_pred_weight_idx is decoded in the residual prediction index decoding unit 30311. Otherwise, the operation of FIG. 22 is applied in a case where the residual prediction index iv_res_pred_weight_idx is equal to 0. In a case where the partition mode PredMode is 2N×2N, the width and the height of the prediction block have the same value, and the minimum size of the prediction block is 8×8. At this point, the minimum size of a luma block is 8×8, and the minimum size of a chroma block is 4×4.

(Step S1200) For luma components, residual prediction is performed by deriving the difference between the two residual prediction motion-compensated images currIvSampleLX_L and refIvSampleLX_L as a residual and adding the residual to the motion-compensated image predSamplesLX_L. Specifically, the derivation is performed by Expression (A-1).

(Step S1101) A determination of whether or not the width (width of a luma block) of the prediction block (target block or prediction unit) is greater than a predetermined size is performed. In a case where the width is greater than a predetermined size, the operation transitions to Step S1102. The block width is determined to be greater than a predetermined size in a case where the width of the prediction block is greater than 8.

(Step S1102) In a case where the width of the prediction block (target block or prediction unit) is greater than a predetermined size, for chroma components, residual prediction is performed by deriving the difference between two residual prediction motion-compensated images currIvSampleLX_C and refIvSampleLX_C as a residual and adding the residual to a motion-compensated image predSamplesLX_C. C corresponds to Cb and Cr. Specifically, the derivation is performed by Expression (A-2) and Expression (A-3).

In a case where the prediction unit is an inter-view merge candidate and the sub-block motion compensation flag subPbMotionFlag is equal to 1, the target block itself of the residual prediction unit 3092 is one of a plurality of sub-blocks into which the prediction unit is previously split. The process of omitting a residual prediction process for a chroma block in a case where the size of the chroma block is 4×4 can also be such that determination and processing are performed as follows if the properties of the prediction unit are also taken into consideration. A residual prediction process for chrominance is omitted in a case where the size of the prediction unit is 8×8 (luma width of the prediction is 8) or the prediction unit is an inter-view merge candidate. That is, a residual prediction process for chrominance is performed in a case where the luma width of the prediction unit is greater than 8 or the prediction unit is not an inter-view merge candidate.

The above process can be performed as follows in a case where the prediction unit is an inter-view merge candidate and the sub-block motion compensation flag subPbMotionFlag is set to 1. A residual prediction process for chrominance is omitted if the size of the prediction unit is 8×8 (luma width of the prediction unit is 8) or if the sub-block motion compensation flag subPbMotionFlag is one. That is, a residual prediction process for chrominance is performed in a case where the luma width of the prediction unit is greater than 8 or the sub-block motion compensation flag subPbMotionFlag of the prediction unit is equal to 0.

A determination of whether or not the sub-block size is 4×4 (width of the sub-block is four) may be added to the above determination. In this case, a residual prediction process for chrominance is omitted in a case where the size of the prediction unit is 8×8 (luma width of the prediction unit is 8) or in a case where the prediction unit is an inter-view merge candidate (sub-block motion compensation flag subPbMotionFlag is equal to 1) and the sub-block size is four. That is, a residual prediction process for chrominance is performed in a case where the luma width of the prediction unit is greater than 8, the prediction unit is not an inter-view merge candidate, or the width of the sub-block is not four. According to the image decoding device that includes the residual prediction index decoding unit 30311 and the residual synthesis unit 30923 configured as above, the effect of reducing the amount of processing is achieved by not performing residual prediction for chroma components in the prediction unit (8×8) that is the minimum unit for applying residual prediction. The effect achieved in a case of not performing residual prediction is as described above. In particular, in a case where the size of the prediction unit in which the amount of processing is the greatest is 8×8, the effect of reducing, in particular, the worst-case amount of processing is achieved.

While the sum of the width and the height of the target block is used as the size of the target block in the present embodiment, either the width or the height of the target block or the minimum values of the width and the height or the product of the width and the height may be used. For example, it is preferable that the size of the prediction block is determined to be greater than a predetermined size in a case where both the width and the height of the prediction block are greater than or equal to 8 and, in that case, residual prediction is performed for chroma blocks as well and that the size of the prediction block is determined to be less than a predetermined size in a case where either the width or the height is less than 8 and, in that case, residual prediction is not performed for chroma blocks (the same applies hereinafter).

(Another Configuration of Residual Prediction Unit)

Hereinafter, a residual prediction unit 3092B will be described as another configuration of the residual prediction unit. Basic operation of the residual prediction unit 3092B is the same as that of the residual prediction unit 3092. That is, the residual prediction unit 3092B, in the same manner as the residual prediction unit 3092, generates two residual prediction motion-compensated images from linear interpolation using the reference image interpolation unit 30922. In addition, the residual prediction unit 3092B, in the same manner as the residual prediction unit 3092, performs residual prediction by adding a residual derived from the two residual prediction motion-compensated images to a motion-compensated image in the synthesis unit 30923 in a case where the prediction block size (prediction unit size or sub-block size) is greater than a predetermined size.

In the residual prediction unit 3092B, a vector that indicates the position of the residual prediction motion-compensated image with respect to the reference picture rpPic in a case where motion prediction is performed for the target prediction unit (in a case where the inter-view prediction flag ivRefFlag is equal to 0) is different from that in the residual prediction unit 3092.

FIG. 23 is a conceptual diagram illustrating operation of the residual prediction unit 3092B. FIG. 23 illustrates the residual prediction motion-compensated images rpPic and rpPicRef and the vectors mvRp and mvRpRef thereof in a case where disparity prediction is not performed for the target block (in a case where ivRefFlag is equal to 0). As illustrated in FIG. 23, in a case where disparity prediction is not performed for the target block (in a case where ivRefFlag is equal to 0), the residual prediction unit 3092B derives, as the residual prediction vector mvRP, mvT which is the vector of the prediction unit on a picture at a location indicated by the vector mvLX of the target block. The residual prediction unit 3092B performs an operation briefly described as follows.

In a case where the inter-view prediction flag ivRefFlag is equal to 0

$mvRp = \text{availFlag}T\,?\,mvT:MvDisp$             Expression (B-1')

$mvRpRef = mvRp+mvLX(=mvLX+mvT \text{ or } mvLX+MvDisp)$             Expression (B-2)

The process in this case is expanded from the operation of the residual prediction unit 3092.

In a case where the inter-view prediction flag ivRefFlag is equal to 1

$mvRp = mvT$             Expression (B-3)

$mvRpRef = mvRp+mvLX(=mvLX+mvT)$             Expression (B-4)

The process in this case is the same as the operation of the residual prediction unit 3092.

Specifically, the residual prediction unit 3092B, in a case where the inter-view prediction flag ivRefFlag is equal to 0, derives the disparity vector mvT, the availability flag availFlagT, and the view index refViewIdx from rpPicT which is the reference picture RefPicListX[refIdxLX] of the prediction unit, the target block coordinates (xP, yP), the target block sizes nPbW and nPbH, and the disparity vector mvDisp of the target prediction unit using a residual prediction vector derivation unit 30924B not illustrated.

The residual prediction vector derivation unit 30924B additionally performs the following process as the final step after the process performed by the residual prediction vector derivation unit 30924.

The residual prediction vector derivation unit 30924B derives the vector mvLX and the reference picture index refPicLX of refPU that is the prediction unit including the reference block coordinates (xRef, yRef). In a case where motion prediction is performed for the target block (DiffPicOrderCnt(currPic, refPic) is equal to other than zero) and disparity prediction is performed for the reference prediction unit refPU (DiffPicOrderCnt(refPic, refPicListRefX[refIdxLX]) is equal to 0), the reference availability flag availFlagT is set to 1. That is, while the residual prediction vector derivation unit 30924 derives mvT which is a motion vector by targeting a case where disparity prediction is performed for the target block (inter-view prediction flag ivRefFlag is equal to 1), the residual prediction vector derivation unit 30924B also derives mvT which is a disparity vector by further targeting a case where motion prediction is performed for the target block (inter-view prediction flag ivRefFlag is equal to 0).

The residual prediction unit 3092B, in a case where the inter-view prediction flag ivRefFlag is equal to 0, derives the vector mvRP of the corresponding block currIvSamplesLX (FIG. 14) using the following expression and mvT if mvT which is a disparity vector is available (availFlagT is equal to 1) and MvDisp[xP][yP] if mvT is not available.

$$mvRP = availFlagT ? mvT : MvDisp[xP][yP] \quad \text{Expression (B-1')}$$

That is, the residual prediction unit 3092B, in a case where the reference availability flag availFlagT is equal to 1 (in a case where mvT which is the vector of the prediction unit on a picture (rpPicT in FIG. 23) at a location indicated by the vector mvLX of the target block exists as a disparity vector), uses the disparity vector mvT derived by the residual prediction vector derivation unit 30924B instead of the disparity vector MvDisp of the target prediction block. The difference between the disparity vector MvDisp and the disparity vector mvT is that the disparity vector MvDisp is derived from a picture (or a block around the target prediction block) that is positioned at the same coordinates as but is temporally different from the target prediction block (prediction block to which the target block belongs), while the disparity vector mvT is derived from a picture that is positioned at the coordinates obtained by adding the motion vector mvLX to the target block and is temporally different from the target block. Mostly, mvT has higher accuracy since motion is taken into consideration by adding the motion vector mvLX.

The residual prediction unit 3092B, in a case where motion prediction is performed for the target block (in a case where the inter-view prediction flag ivRefFlag is equal to 0), derives the reference picture rpPic using the condition that the POC of the reference picture rpPic is equal to PicOrderCntVal which is the POC of the target picture and that the view ID of the reference picture rpPic is equal to availFlagT?refVIdx: RefViewIdx[xP][yP]. That is, in a case where mvT which is a disparity vector is available (availFlagT is equal to 1), a reference picture (the view ID thereof is not RefViewIdx[xP][yP]) that corresponds to the disparity vector MvDisp[xP][yP]) and a reference picture (the view ID thereof is refVidx) that corresponds to the disparity vector mvT are used.

The residual prediction unit 3092B, in a case where motion prediction is performed for the target block (in a case where the inter-view prediction flag ivRefFlag is equal to 0), derives the reference picture rpPicRef using the condition that the POC of the reference picture rpPicRef is equal to the POC of the reference picture RefPicListY[RpRefIdxLY] of the target block and that the view ID of the reference picture rpPicRef is equal to availFlagT?refVIdx:RefViewIdx[xP][yP]. Furthermore, the residual prediction unit 3092 sets the vector mvRpRef of rpPicRef to (mvRp+mvLX) which is the sum of the vector mvRp and the vector mvLX into which the motion vector of the prediction block is scaled. mvPicRef has the same view ID as the reference picture indicated by the disparity vector mvT.

That is, in a case where disparity prediction is not performed for the target block (in a case where ivRefFlag is equal to 0), the residual prediction unit 3092B derives, as the residual prediction vector mvRP, mvT which is the vector of the prediction unit on a picture at a location indicated by the vector mvLX of the target block. In addition, as described above, in a case where disparity prediction is not performed for the target block (in a case where ivRefFlag is equal to 0), it is further preferable that the residual prediction unit 3092B derives, as the residual prediction vector mvRP, mvT if mvT which is the vector of the prediction unit on a picture at a location indicated by the vector mvLX of the target block exists as a disparity vector and the disparity vector mvDisp of the target block if mvT does not exist as a disparity vector.

The residual prediction unit 3092B, in a case where disparity prediction is performed for the target block (in a case where the inter-view prediction flag ivRefFlag is equal to 1), derives the reference picture rpPicRef and the vector mvRpRef of rpPicRef in the same manner as the residual prediction unit 3092.

The reference image interpolation unit 30922 of the residual prediction unit 3092B, in the same manner as in the residual prediction unit 3092, derives the corresponding block currIvSamplesLX (rpPic) corresponding to the block at a location indicated by the vector mvR from the reference picture rpPic by performing the interpolated pixel derivation process using linear interpolation (bilinear prediction) and outputs the corresponding block currIvSamplesLX to the residual synthesis unit 30923.

The reference image interpolation unit 30922 of the residual prediction unit 3092B, in the same manner as the residual prediction unit 3092, derives the vector reference block refIvSamplesLX (rpPicRef) corresponding to the block at a location indicated by the vector mvRPRef, which is the sum of the disparity vector mvDisp and the vector mvRP, from the reference picture rpPicRef by performing the interpolated pixel derivation process using linear interpolation (bilinear prediction) and outputs the vector reference block refIvSamplesLX to the residual synthesis unit 30923.

The residual synthesis unit of the residual prediction unit 3092B is the same as the residual synthesis unit 30923 described previously. That is, in a case where the block size of the target block is greater than a predetermined size, the residual synthesis unit derives a residual from two residual prediction motion-compensated images and generates a predicted image by adding the residual to a motion-compensated image. Conversely, in a case where the block size of the target block is less than or equal to a predetermined size, a residual is not derived, and the motion-compensated image itself is set as a predicted image.

According to the residual prediction unit 3092B described above, the effect of reducing the amount of processing is achieved because a residual is not derived in a small block (in particular, a chroma block in a case where the luma block size is less than or equal to 8). Furthermore, according to the residual prediction unit 3092B, performance degradation accompanied by not deriving a residual in a small block is complemented by using mvT which is the vector of the prediction unit on a picture at a location indicated by the vector mvLX of the target block as the disparity vector of the target block in a case where motion prediction is performed for the target prediction unit (in a case where the inter-view prediction flag ivRefFlag is equal to 0). The inventor implements a process of not performing residual prediction in a small block in a case where the block is a chroma block and a process of changing the disparity vector using the disparity vector mvT in units of target blocks instead of MvDisp which is a disparity vector in units of prediction units (or in units of coding units) in a case where motion prediction is performed for the target block (in a case where the inter-view prediction flag ivRefFlag is equal to 0). By experiment, it is confirmed that overall coding efficiency is not decreased by performing the disparity vector changing process even if the process of not performing residual prediction for small chroma blocks is applied.

The residual prediction unit 3092B may derive the disparity vector mvT, the availability flag availFlagT, and the view index refViewIdx from rpPicT which is the reference picture RefPicListX[refIdxLX] of the prediction unit, the target block coordinates (xP, yP), the target block sizes nPbW and nPbH, and the disparity vector mvDisp of the target prediction unit using the residual prediction vector derivation unit 30924B in a case where the inter-view prediction flag ivRefFlag is equal to 0 and the sub-block motion compensation flag subPbMotionFlag is equal to 1. In this case, the residual prediction unit 3092B performs a process represented by Expression (B-1") instead of Expression (B-1). There is no change in the process represented by Expression (B-2).

$$mvRp = availFlagT \&\& subPbMotionFlag == 1 ? mvT : MvDisp \quad \text{Expression (B-1")}$$

As such by limiting a case of setting the vector mvRp of the corresponding block to mvT which is the vector of the prediction unit on a picture at a location indicated by the vector mvLX of the target block to a case where the sub-block motion compensation flag subPbMotionFlag is equal to 1, that is, to a case where the prediction unit is split into sub-blocks, the effect of improving coding efficiency is achieved. That is, by using mvT which is the vector of the prediction unit on a picture at a location indicated by the vector mvLX of the target block in a case of splitting the prediction block into sub-blocks and by using the parallax vector mvDisp of the target block in a case of not splitting the prediction block into sub-blocks, predicted imaged derived in the two cases can be rendered different from each other. The effect of improving coding efficiency is achieved because different use is made of the coding device in the two cases. The method that uses mvT which is the vector of the prediction unit on a picture at a location indicated by the vector mvLX of the target block as the vector mvRp of the corresponding block can be applied to the residual prediction unit 3092 described later.

(Still Another Configuration of Residual Prediction Unit)

Hereinafter, a residual prediction unit 3092C will be described as still another configuration of the residual prediction unit. The residual prediction unit 3092C is characterized by further splitting the target block into sub-blocks in a case where the target block which is the target of the residual prediction unit 3092C is a luma component and by performing a residual prediction process in units of sub-blocks. The residual prediction unit 3092C may not further split the target block in a case where the prediction unit is previously split into sub-blocks (in a case of subPbMotionFlag=1).

In a case where the prediction unit is an inter-view merge candidate and the sub-block motion compensation flag subPbMotionFlag is equal to 1, the target block itself is one of a plurality of sub-blocks into which the prediction unit is previously split. Thus, the residual prediction unit 3092C operates in units of sub-blocks. The residual prediction unit 3092C applies the process performed by the residual prediction unit 3092B in units of sub-blocks by regarding a sub-block as a target block.

Figure 25:
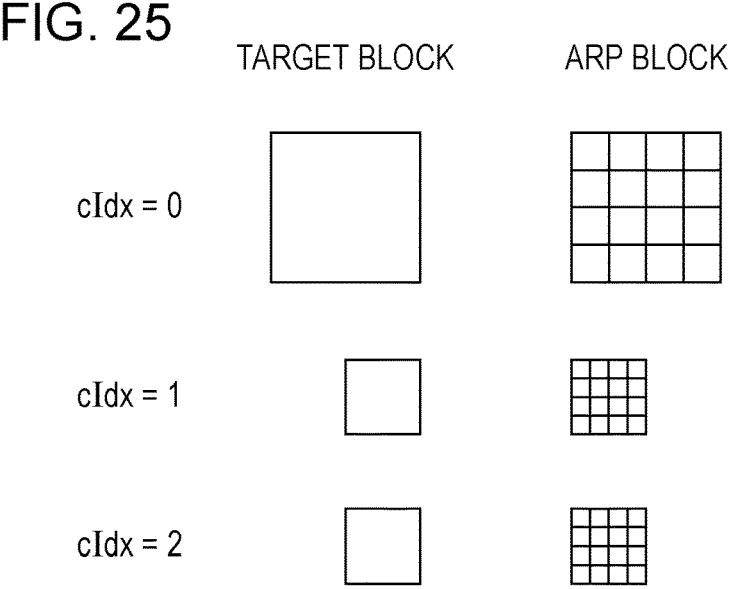
FIG. 25 is a diagram illustrating operation of a residual prediction unit of a comparative example of the residual prediction unit 3092C.

FIG. 25 is a diagram illustrating operation of a residual prediction unit of a comparative example of the residual prediction unit 3092C. The residual prediction unit of the comparative example splits the target block into sub-blocks of a predetermined size and performs a residual prediction process for each split unit. A predetermined sub-block size of a chroma component (cIdx=1 or 2) is ½ of the sub-block size of a luma component (cIdx=0). For example, in a case where the sub-block size of a luma component is 8×8, the sub-block size of the corresponding chroma component is 4×4. As such, since the chroma component is split into small sub-blocks by sub-block splitting in the comparative example, use of the comparative example with a configuration in which a residual prediction process is omitted for chroma components in a case where the block size is small poses the problem that residual prediction is not performed for chroma components (residual prediction is not performed for chroma components if the process of splitting the chroma block into 4×4 sub-blocks is used with the process of not performing residual prediction for 4×4 chroma sub-blocks). Thus, the effect of improving coding efficiency achieved by finely assigning motion vectors in sub-block splitting is counterbalanced by a decrease in coding efficiency due to not performing residual prediction for chroma components of small blocks, and the effect of improving overall coding efficiency cannot be achieved.

FIG. 24 is a diagram illustrating operation of the residual prediction unit 3092C of the present embodiment. The residual prediction unit 3092C splits the target block having a luma component into sub-blocks of a predetermined size and performs a residual prediction process for each sub-block. For chroma components, the target block is not split into sub-blocks, and a residual prediction process is performed with the original size of the target block. That is, a residual prediction process is performed by splitting a luma component into, for example, M×N sub-blocks (horizontally M and vertically N), and for chroma components, a residual prediction process is performed without splitting. While the residual prediction unit 3092C of the present embodiment includes a configuration that omits a residual prediction process for chroma components in a case where the block size is small, the problem that residual prediction is not performed for chroma components does not occur in this case unlike the comparative example. Therefore, even in a case of omitting a residual prediction process for chroma components according to the block size, the effect of improving coding efficiency is achieved by finely assigning motion vectors in sub-block splitting. In addition, at the same time, the effect of reducing the amount of processing is achieved by performing a residual prediction process for chroma components according to the block size. Furthermore, since processing in a chroma component is not performed in units of sub-blocks in the residual prediction unit, an increase in the amount of processing accompanied by processing in units of sub-blocks can be suppressed to the minimum extent. Hereinafter, a sub-block that is split in the residual prediction unit 3092C will be referred to as an ARP block.

(Configuration Example 1 of Residual Prediction Unit 3092C)

Figure 26:
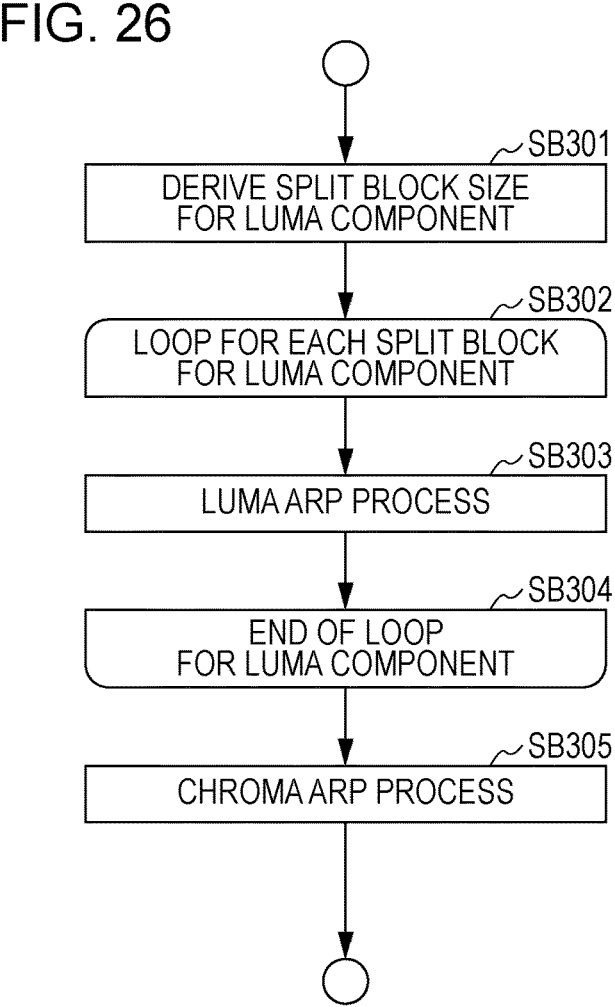
FIG. 26 is a flowchart illustrating detailed operation of the residual prediction unit 3092C.

FIG. 26 is a flowchart illustrating detailed operation of the residual prediction unit 3092C.

(SB301) The residual prediction unit 3092C determines a size arpSize of an ARP block for luma components (cIdx=0). For example, as in the expression described below, the ARP block size arpSize is set to the target block size (sub-block size) nPbW in a case where the sub-block motion compensation flag subPbMotionFlag is equal to 1 and otherwise is set to 8.

arpSize=(subPbMotionFlag?nPbW:8)

arpSize=8 means that the ARP block is 8×8 blocks.

(SB302) For luma components (cIdx=0), the residual prediction unit 3092C performs a loop process in units corresponding to the ARP block size. For example, in a case where the two-dimensional indexes of the ARP block (sub-block) are blkX and blkY, a loop process is performed for the step illustrated in SB303 for blkY ranging from 0 to nPbH/arpSize−1 and blkX ranging from 0 to nPbW/arpSize−1.

(SB303) For luma components, a residual prediction process of the residual prediction unit 3092B is performed by targeting an ARP block (sub-block) having the coordinates (xP+blkX*arpSize, yP+blkY*arpSize) and a block size of the width arpSize and the height arpSize. (xP, yP) is the upper left coordinates of the prediction unit in a case of subPbMotionFlag=0 and is the upper left coordinates of the sub-block in a case of subPbMotionFlag=1.

(SB304) SB304 is the end of the loop for luma components. By performing a residual prediction process for luma components in units of sub-blocks, a predicted image of the entire target block is generated.

(SB305) For chroma components, a residual prediction process described with the residual prediction unit 3092B is performed for a chroma block having the coordinates (xP/2, yP/2) and the width nPbW/2 and the height nPbH/2 which are half the target block size. As previously described with the residual prediction unit 3092B, a residual prediction process is performed only in a case where the target block size is greater than a predetermined size (either the luma block size is greater than 8 or the chroma block size is greater than four), and otherwise, a motion-compensated image itself is set as a predicted image without performing a residual prediction process.

(Configuration Example 2 of Residual Prediction Unit 3092C)

Figure 27:
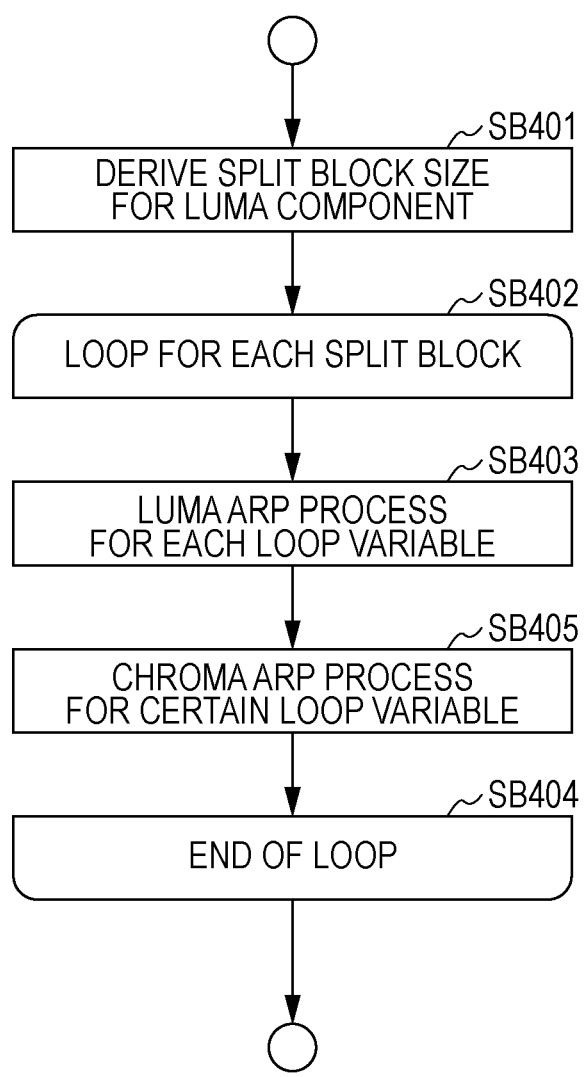
FIG. 27 is a flowchart illustrating another detailed operation of the residual prediction unit 3092C.

FIG. 27 is a flowchart illustrating another detailed operation of the residual prediction unit 3092C. In the same manner as in FIG. 26, for luminance, a residual prediction process is performed after splitting into sub-blocks in a case of performing residual prediction, and for chrominance, a residual prediction process is performed without splitting into sub-blocks for residual prediction. While chrominance is also performed by using a loop in units of sub-blocks in FIG. 27 unlike in FIG. 26, the chroma components of the entire target block are processed in specific sub-blocks (for example, the head sub-block) of chroma blocks, and processing for chroma blocks is not performed in the other sub-blocks. Accordingly, substantially the same process as FIG. 26 (produces the same processing result) is performed.

(SB401) The residual prediction unit 3092C determines the ARP block size arpSize according to the target block size. For example, as in the expression described below, the ARP block size arpSize is set to the target block size (sub-block size) nPbW in a case where the sub-block motion compensation flag subPbMotionFlag is equal to 1 and otherwise is set to 8.

arpSize=(subPbMotionFlag?nPbW:8)

arpSize=8 means that the ARP block is 8×8 blocks.

(SB402) The residual prediction unit 3092C performs a loop process in units corresponding to the ARP block size. For example, in a case where the indexes of the ARP block are blkX and blkY, a loop process is performed for the step of (SB405) for blkY ranging from 0 to nPbH/arpSize−1 and blkX ranging from 0 to nPbW/arpSize−1.

(SB403) For luma components, a residual prediction process is performed for each loop variable (blkX and blkY). Specifically, the process described with the residual prediction unit 3092B is performed for a block having the coordinates (xP+blkX*arpSize, yP+blkY*arpSize) represented with the two-dimensional indexes blkX and blkY and a block size of the width arpSize and the height arpSize, and a predicted image is generated by the residual prediction process.

(SB404) For chroma components, a residual prediction process is performed with the target block size in a case where the indexes blkX and blkY which are loop variables have a certain value. For example, in a case where the indexes are such that blkX=0 and blkY=0, the process described with the residual prediction unit 3092B is performed for a chroma block having the coordinates (xP/2, yP/2) and a block size of the width nPbW/2 and the height nPbH/2, and a predicted image is performed by the residual prediction process. As described with the residual prediction unit 3092B, the residual prediction unit 3092C performs a residual prediction process only in a case where the block size is greater than a predetermined size (either the luma block size is greater than 8 or the chroma block size is greater than four) and otherwise sets a motion-compensated image itself as a predicted image without performing a residual prediction process.

(SB405) SB405 is the end of the loop.

(Configuration Example 3 of Residual Prediction Unit 3092C)

While only the head sub-block of a chroma block is processed in Configuration Example 2 of the residual prediction unit 3092C in FIG. 27, a chroma block is also processed in units of sub-blocks in Configuration Example 3. In Configuration Example 3, a residual prediction process is performed for a chroma block by using the same vector and the same reference picture for all sub-blocks thereof. The flowchart of the residual prediction unit 3092C is basically the same as above SB401 to SB405 except that (SB404) is replaced by (SB404') described below.

(SB404') For chroma components, a residual prediction process is performed for each loop variable (blkX and blkY). Specifically, for a block having the coordinates (xP/2+blkX*arpSize/2, yP/2+blkY*arpSize/2) represented with the two-dimensional indexes blkX and blkY and a block size of the width arpSize/2 and the height arpSize/2, the corresponding block currIvSamplesLX/rpSamplesLX$_L$ is derived in units of sub-blocks, and the reference blocks refIvSamplesLX/rpSamplesRefLX$_L$ are derived by using the vectors mvRP and mvRPRef derived in a specific sub-block and the reference pictures rpPic and rpPicRef. Furthermore, a residual prediction process is performed by using a residual derived from the corresponding block and the reference block. In a case where the chroma block size is 4×4, it is preferable that a residual prediction process is omitted for chroma blocks in the same manner as the configuration examples of the residual prediction unit 3092C described thus far.

(Residual Synthesis Unit 30923C)

A residual synthesis unit 30923C included in the residual prediction unit 3092C, for luma components, derives a residual from the difference between two residual prediction motion-compensated images (rpSamplesLX$_L$ and rpSamplesRefLX$_L$) in units of sub-blocks in a case of performing residual prediction and derives a predicted image by adding the residual to a motion-compensated image. Specifically, the residual synthesis unit 30923 updates the motion-compensated image predSamplesLX$_L$ from the predicted image predSamplesLX, the corresponding block rpSamplesLX$_L$, the reference block rpSamplesRefLX$_L$, and the residual prediction index iv_res_pred_weight_idx using the following expression.

predSamples*LX$_L$*[x][y]=predSamples*LX$_L$*[x][y]+
((*rp*Samples*LX$_L$*[x][y]−*rp*RefSamples*LX$_L$*[x][y])>>shiftVal)

x is an index ranging from 0 to arpSize−1, and y is an index ranging from 0 to arpSize−1.

The residual synthesis unit 30923C, for chroma components, derives a residual from two residual prediction motion-compensated images (rpSamplesLX$_L$ and rpSamplesRefLX$_L$) in units of target blocks even in a case of performing residual prediction and derives a predicted image by adding the residual to a motion-compensated image in a case where the luma block size (nPbW) is greater than a predetermined size. Specifically, the residual synthesis unit 30923 updates a motion-compensated image predSamplesLX$_{Cb}$ from a predicted image predSamplesLX$_{Cb}$, a corresponding block rpSamplesLX$_{Cb}$, a reference block rpSamplesRefLX$_{Cb}$, and the residual prediction index iv_res_pred_weight_idx using the following expression.

predSamples*LX$_{Cb}$*[x][y]=predSamples*LX$_{Cb}$*[x][y]+
((*rp*Samples*LX$_{Cb}$*[x][y]−*rp*RefSamples*LX$_{Cb}$*[x][y])>>shiftVal)

x is an index ranging from zero to the block size nPbW/2−1, and y is an index ranging from 0 to nPbH/2−1.

While described above is a case where the chroma component is Cb, the same applies in a case where the chroma component is Cr, and a predicted image is derived by adding a residual to a motion-compensated image in a case where the luma block size (nPbW) is greater than a predetermined size. Specifically, the residual synthesis unit 30923 updates a motion-compensated image predSamplesLX$_{Cr}$ from a predicted image predSamplesLX$_{Cr}$, a corresponding block rpSamplesLX$_{Cb}$, a reference block rpSamplesRefLX$_{Cr}$, and the residual prediction index iv_res_pred_weight_idx using the following expression.

predSamples*LX$_{Cr}$*[x][y]=predSamples*LX$_{Cr}$*[x][y]+
((*rp*Samples*LX$_{Cr}$*[x][y]−*rp*RefSamples*LX$_{Cr}$*[x][y])>>shiftVal)

x is an index ranging from zero to the block size nPbW/2−1, and y is an index ranging from 0 to nPbH/2−1.

According to the residual synthesis unit 30923C configured as above, the effect of reducing the amount of processing is achieved because the residual addition process is performed in units of target blocks without performing sub-block splitting for chroma components.

In a case where the prediction unit is an inter-view merge candidate and the sub-block motion compensation flag sub-PbMotionFlag is equal to 1, the target block itself is one of a plurality of sub-blocks into which the prediction unit is previously split. Thus, the residual synthesis unit 309230 performs a residual synthesis process for chroma components in units of sub-blocks.

(Reference Image Interpolation Unit 30922C)

A reference image interpolation unit 30922C included in the residual prediction unit 3092C performs residual prediction for luma components to derive the corresponding block currIvSamplesLX/rpSamplesLX$_L$ from the reference picture rpPic and the vector mvRP in units of sub-blocks and to derive the reference block refIvSamplesLX/rpSamplesRefLX$_L$ from the reference picture rpPicRef and the vector mvRPRef. That is, a reference image interpolation process for residual prediction is performed for each sub-block (blkX, blkY) by using the sub-block sizes arpSize and arpSize as input of the block sizes nPbW and nPbH.

The reference image interpolation unit 30922C, for chroma components, derives the corresponding block currIvSamplesLX/rpSamplesLX$_{Cb/Cr}$ from the reference picture rpPic and the vector mvRP in units of target blocks and derives the reference block refIvSamplesLX/rpSamplesRefLXCb/Cr from the reference picture rpPicRef and the vector mvRPRef. That is, processing is performed by using the target block sizes nPbW and nPbH as input of the block sizes nPbW and nPbH. Only in a case where the sub-block (blkX, blkY) address is equal to a predetermined value, for example, only in a case of blkX=0 and blkY=0, two residual prediction motion-compensated images (rpSamplesLX$_{Cb}$ and rpSamplesRefLX$_{Cb}$) with respect to the chroma component Cb are derived, and two residual prediction motion-compensated images (rpSamplesLX$_{Cr}$ and rpSamplesRefLX$_{Cr}$) with respect to the chroma component Cr are derived.

According to the residual synthesis unit 30923C configured as above, the effect of reducing the amount of processing is achieved because the reference image interpolation process is performed in units of target blocks without performing sub-block splitting for chroma components.

A process of omitting a residual prediction motion-compensated image with respect to a small block may be performed in the reference image interpolation unit 30922C. In this case, the reference image interpolation process for residual prediction is performed only in a case where the target block size is greater than a predetermined size. In particular, the reference image interpolation process for residual prediction is performed in a case where the chroma block size is greater than or equal to 8×8, and it is appropriate that the reference image interpolation process is not performed in a case where the chroma block size is 4×4.

In a case where the prediction unit is an inter-view merge candidate and the sub-block motion compensation flag sub-PbMotionFlag is equal to 1, the target block itself is one of a plurality of sub-blocks into which the prediction unit is previously split. Thus, the reference image interpolation unit 30922C performs the reference image interpolation process for residual prediction in units of sub-blocks.

(Derivation of Sub-Block Motion Compensation Flag by Combining Inter-View Merge Candidate with Residual Prediction)

The target block of the residual prediction unit 3092C is split in units of sub-blocks in a case where the target block is an inter-view merge candidate, and the residual prediction unit 3092C additionally performs processing in units of sub-blocks in a case where residual prediction is turned ON (residual prediction index iv_res_pred_weight_idx is greater than zero) and does not apply the additional processing in units of sub-blocks for chrominance even if residual prediction is turned ON. Therefore, in overall view, a configuration that may be used is such that the processing in units of sub-block is turned ON for luminance in a case where the target block is an inter-view merge candidate or residual prediction is turned ON (residual prediction index iv_res_pred_weight_idx is greater than zero) and that the processing in units of sub-blocks is turned ON for chrominance in a case where the target block is an inter-view merge candidate. That is, such a configuration is as follows.

sub-block motion compensation flag subPbMotionFlag for luminance=inter-view merge candidate or residual prediction is turned ON (residual prediction index iv_res_pred_weight_idx is greater than zero)

sub-block motion compensation flag subPbMotionFlag for chrominance=inter-view merge candidate (illuminance compensation)

The illuminance compensation unit 3093 performs illuminance compensation of the input predicted image predSamplesLX in a case where the illuminance compensation flag ic_flag is equal to 1. In a case where the illuminance compensation flag ic_flag is equal to 0, the input predicted image predSamplesLX is output as is.

(View Synthesis Prediction)

The view synthesis prediction unit 3094 derives the predicted image predSampleLX using view synthesis prediction in a case where the VSP mode flag VspModeFlag is equal to 1. View synthesis prediction is a process that generates the predicted image predSamples by splitting the prediction unit into sub-blocks, reading from the reference picture memory 306 a block at a position shifted by the distance corresponding to a parallax array disparitySampleArray in units of sub-blocks, and interpolating the block.

Figure 16:
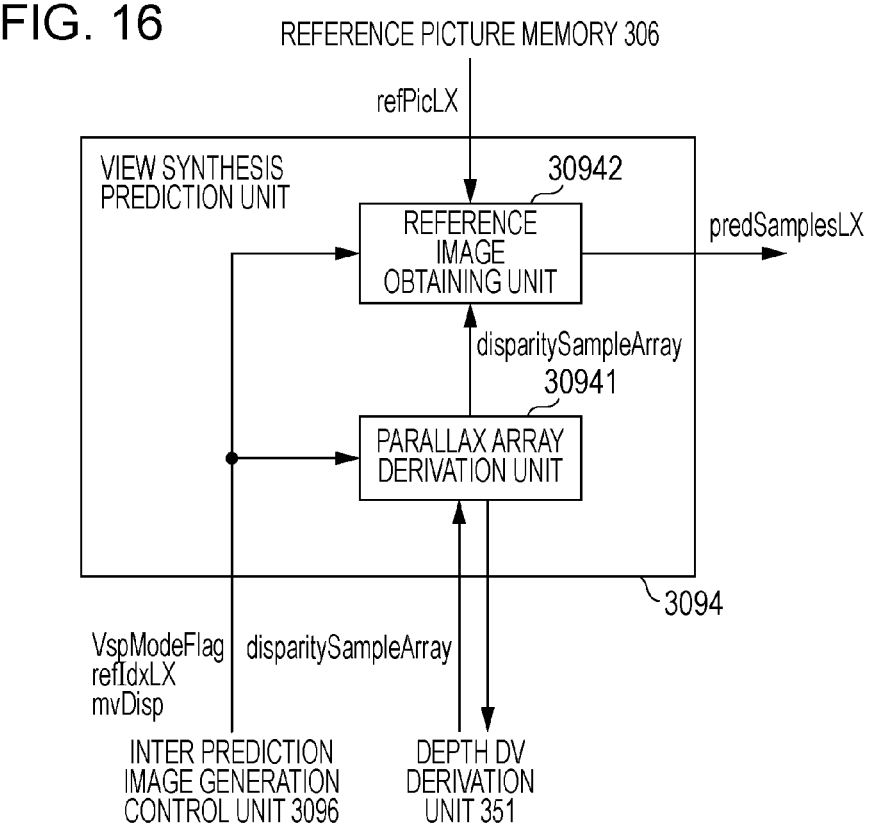
FIG. 16 is a schematic diagram illustrating a configuration of a view synthesis prediction unit according to the present embodiment.

FIG. 16 is a block diagram illustrating a configuration of the view synthesis prediction unit 3094. The view synthesis prediction unit 3094 is configured of a parallax array derivation unit 30941 and a reference image interpolation unit 30942.

The parallax array derivation unit 30941 derives the parallax array disparitySampleArray in units of sub-blocks in a case where the VSP mode flag VspModeFlag is equal to 1.

Specifically, first, the parallax array derivation unit 30941 reads from the reference picture memory 306 a depth image refDepPels that has the same POC as the decoding target picture and has the same view ID as the view ID (RefViewIdx) of a picture indicated by the disparity vector.

Next, the parallax array derivation unit 30941 uses the following expressions to derive the coordinates (xTL, yTL) that are shifted by the disparity vector MvDisp from the upper left coordinates (xP, yP) of the prediction unit.

$$xTL=xP+((mvDisp[0]+2)>>2)$$

$$yTL=yP+((mvDisp[1]+2)>>2)$$

mvDisp[0] and mvDisp[1] are respectively the X component and the Y component of the disparity vector MvDisp. The derived coordinates (xTL, yTL) indicate the coordinates of a block corresponding to the prediction unit on the depth image refDepPels.

The view synthesis prediction unit 3094 performs sub-block splitting according to the size (width nPSW×height nPSH) of the target block (prediction unit).

FIG. 12 is a diagram illustrating sub-block splitting of the prediction unit. The prediction unit is split into 8×4 or 4×8 sub-blocks. As illustrated in FIG. 12(*a*), 8×4 sub-blocks are used in a case where the height nPSH (height in FIG. 12(*a*)) of the prediction unit satisfies nPSH % 8 !=0. As illustrated in FIG. 12(*b*), 4×8 sub-blocks are used in a case where the width nPSW (width in FIG. 12(*b*)) of the prediction unit satisfies nPSW % 8 !=0. As illustrated in FIG. 12(*c*), otherwise, either 8×4 or 4×8 sub-blocks are used according to the value of the depth of a depth block corresponding to the prediction unit.

The parallax array derivation unit 30941 sets a flag minSubBlkSizeFlag to 1 using the following expression in a case where either the width nPSW or the height nPSH of the prediction unit is other than a multiple of 8.

$$\text{minSubBlkSizeFlag}=(nPSW\% \ 8!=0)\|(nPSH\% \ 8!=0)$$

The parallax array derivation unit 30941, in a case where the flag minSubBlkSizeFlag is equal to 1, sets horSplitFlag to one in a case where the height of the prediction unit is other than a multiple of 8 (in a case where nPSH % 8 is true) and to zero otherwise using the following expression.

$$\text{horSplitFlag}=(nPSH\% \ 8!=0)$$

That is, horSplitFlag is set to 1 in a case where the height of the prediction unit is other than a multiple of 8 (in a case where nPSH % 8 is true), and horSplitFlag is set to 0 in a case where the width of the prediction unit is other than a multiple of 8 (in a case where nPSW % 8 is true).

The parallax array derivation unit 30941 derives the sub-block size from the depth value. The sub-block size is derived by comparing the four corner points (TL, TR, BL, and BR) of the prediction block. In a case where the flag minSubBlkSizeFlag is equal to 0, given that the pixel value of the upper light (TL) coordinates of the prediction unit is refDepPelsP0, the upper right (TR) pixel value is refDepPelsP1, the lower left (BL) pixel value is refDepPelsP2, and the lower right (BR) pixel value is refDepPelsP3, a determination of whether or not the following conditional expression is established is performed.

$$\begin{aligned}(\text{horSplitFlag})\text{horSplitFlag}&=\\(\text{refDepPels}P0>\text{refDepPels}P3)&==\\(\text{refDepPels}P1>\text{refDepPels}P2)\end{aligned}$$

Derivation of horSplitFlag may also use the following expression by changing the signs.

$$\begin{aligned}\text{horSplitFlag}&=(\text{refDepPels}P0<\text{refDepPels}P3)==\\&\phantom{=}(\text{refDepPels}P1<\text{refDepPels}P2)\end{aligned}$$

Next, the parallax array derivation unit 30941 sets the width nSubBlkW and the height nSubBlkH of a sub-block using the following expressions.

$$n\text{SubBlk}W=\text{horSplitFlag}?8:4$$

$$n\text{SubBlk}H=\text{horSplitFlag}?4:8$$

The above operation of the parallax array derivation unit 30941 is equivalent to the following description. In a case where the height nPSH of the prediction unit is other than a multiple of 8 (in a case where nPSH % 8 is true), the width nSubBlkW of a sub-block is set to 8, and the width nSubBlkH of a sub-block is set to four as in the following expressions.

$$n\text{SubBlk}W=8$$

$$n\text{SubBlk}H=4$$

Otherwise, in a case where the width nPSW of the prediction is other than a multiple of 8 (in a case where nPSW % 8 is true), the width nSubBlkW of a sub-block is set to four, and the width nSubBlkW of a sub-block is set to 8 as in the following expressions.

$$n\text{SubBlk}W=4$$

$$n\text{SubBlk}H=8$$

Otherwise (in a case where both the height and the width of the prediction unit are multiples of 8), the parallax array derivation unit 30941 sets the width and the height of a sub-block using the above conditional expression and the pixel values of the depth image.

Next, the parallax array derivation unit 30941, for each sub-block in the prediction unit, outputs the width nSub-BlkW and the height nSubBlkH of a sub-block in a case where the upper left pixel of the block is set as the origin, a split flag splitFlag, the depth image refDepPels, the coordinates (xTL, yTL) of the corresponding block, and the view ID refViewIdx of a layer to which the reference picture indicated by the reference picture index refIdxLX belongs to the depth DV derivation unit 351 to obtain the parallax array disparitySampleArray from the depth DV derivation unit 351. The parallax array derivation unit 30941 outputs the derived parallax array disparitySampleArray to the reference image interpolation unit 30922.

(Depth DV Derivation Unit 351)

The depth DV derivation unit 351 derives a parallax array disparity Samples that is the horizontal component of a depth-orientated disparity vector by performing the following process using the depth DV conversion table Depth-ToDisparityB, the width nSubBlkW and the height nSubBlkH of a sub-block, the split flag splitFlag, the depth image refDepPels, the coordinates (xTL, yTL) of the corresponding block on the depth image refDepPels, and the view ID refViewIdx as input.

The depth DV derivation unit 351 derives a representative value maxDep of the depth for each sub-block constituting the prediction unit.

The depth DV derivation unit 351, in a case where the upper left relative coordinates of a sub-block from the prediction block (xTL, yTL) are (xSubB, ySubB), sets a left X coordinate xP0 of the sub-block, a right X coordinate xP1, an upper Y coordinate yP0, and a lower Y coordinate yP1 using the following expressions.

$xP0 = \text{Clip3}(0, \text{pic\_width\_in\_luma\_samples} - 1, xTL + xSubB)$ $yP0 = \text{Clip3}(0, \text{pic\_height\_in\_luma\_samples} - 1, yTL + ySubB)$ $xP1 = \text{Clip3}(0, \text{pic\_width\_in\_luma\_samples} - 1, xTL + xSubB + n\text{SubBlk}W - 1)$ $yP1 = \text{Clip3}(0, \text{pic\_height\_in\_luma\_samples} - 1, yTL + ySubB + n\text{SubBlk}H - 1)$ pic_width_in_luma_samples and pic_height_in_luma_samples respectively represent the width and the height of the image.

Next, the depth DV derivation unit 351 derives the representative value maxDep of the depth of the sub-block. Specifically, the representative depth value maxDep that is the maximum value of the pixel values refDepPels[xP0][yP0], refDepPels [xP0][yP1], refDepPels [xP1][yP0], and refDepPels[xP1][yP1] of four points at a corner of the sub-block and nearby is derived by the following expressions.

maxDep=0 maxDep=Max(maxDep,refDepPels[xP0][yP0])

maxDep=Max(maxDep,refDepPels[xP0][yP1])

maxDep=Max(maxDep,refDepPels[xP1][yP0])

maxDep=Max(maxDep,refDepPels[xP1][yP1])

The function Max(x, y) is a function that returns x if the first parameter x is greater than or equal to the second parameter y and returns y otherwise.

The depth DV derivation unit 351 uses the representative depth value maxDep, the depth DV conversion table Depth-ToDisparityB, and the view ID refViewIdx of a layer indicated by the disparity vector (NBDV) to derive the parallax array disparitySamples which is the horizontal component of a depth-orientated disparity vector for each pixel (x, y) (x has a value ranging from 0 to nSubBlkW−1, and y has a value ranging from 0 to nSubBlkH−1) in the sub-block using the following expression.

disparitySamples[x][y]=DepthToDisparityB [refViewIdx][maxDep]  (Expression A)

The depth DV derivation unit 351 outputs the derived parallax array disparitySamples as DoNBDV to the disparity vector derivation unit 30363. The depth DV derivation unit 351, in addition, outputs the parallax array disparitySamples as the disparity vector of the sub-block to the reference image interpolation unit 30942.

The reference image interpolation unit 30942 derives the prediction block predSamples from the parallax array disparitySampleArray input from the parallax array derivation unit 30941 and the reference picture index refIdxLX input from the inter prediction parameter decoding unit 303.

The reference image interpolation unit 30942, for each pixel in the prediction unit, extracts a pixel at a position obtained by shifting the X coordinate by the value of the corresponding parallax array disparitySampleArray from the coordinates of each pixel, from the reference picture refPic specified by the reference picture index refIdxLX. Considering that the parallax array disparitySampleArray has a fractional precision of ¼ pel, the reference image interpolation unit 30942, in a case where the coordinates of the upper left pixel of the prediction unit are (xP, yP) and the coordinates of each pixel in the prediction unit are (xL, yL) (xL has a value ranging from 0 to nPbW−1, and yL has a value ranging from 0 to nPbH−1), derives the integer system coordinates (xInt, yInt) of the pixel extracted from the reference picture refPic and the fractional parts xFrac and yFrac of the parallax array disparitySampleArray[xL][yL] corresponding to the pixel (xL, yL) using the following expressions.

$x\text{Int}L = xP + xL + \text{disparitySamples}[xL][yL]$ $y\text{Int}L = yP + yL$ $x\text{Frac}L = \text{disparitySamples}[xL][yL]\&3$ $x\text{Frac}L = 0$ Next, the reference image interpolation unit 30942 performs the same interpolated pixel derivation process as the motion disparity compensation unit 3091 for each sub-block of the prediction unit and sets the set of interpolated pixels as the interpolated block predPartLX. The reference image interpolation unit 30942 outputs the derived interpolated block predPartLX as the prediction block predSamplesLX to the addition unit 312.

(Configuration of Image Coding Device)

Figure 19:
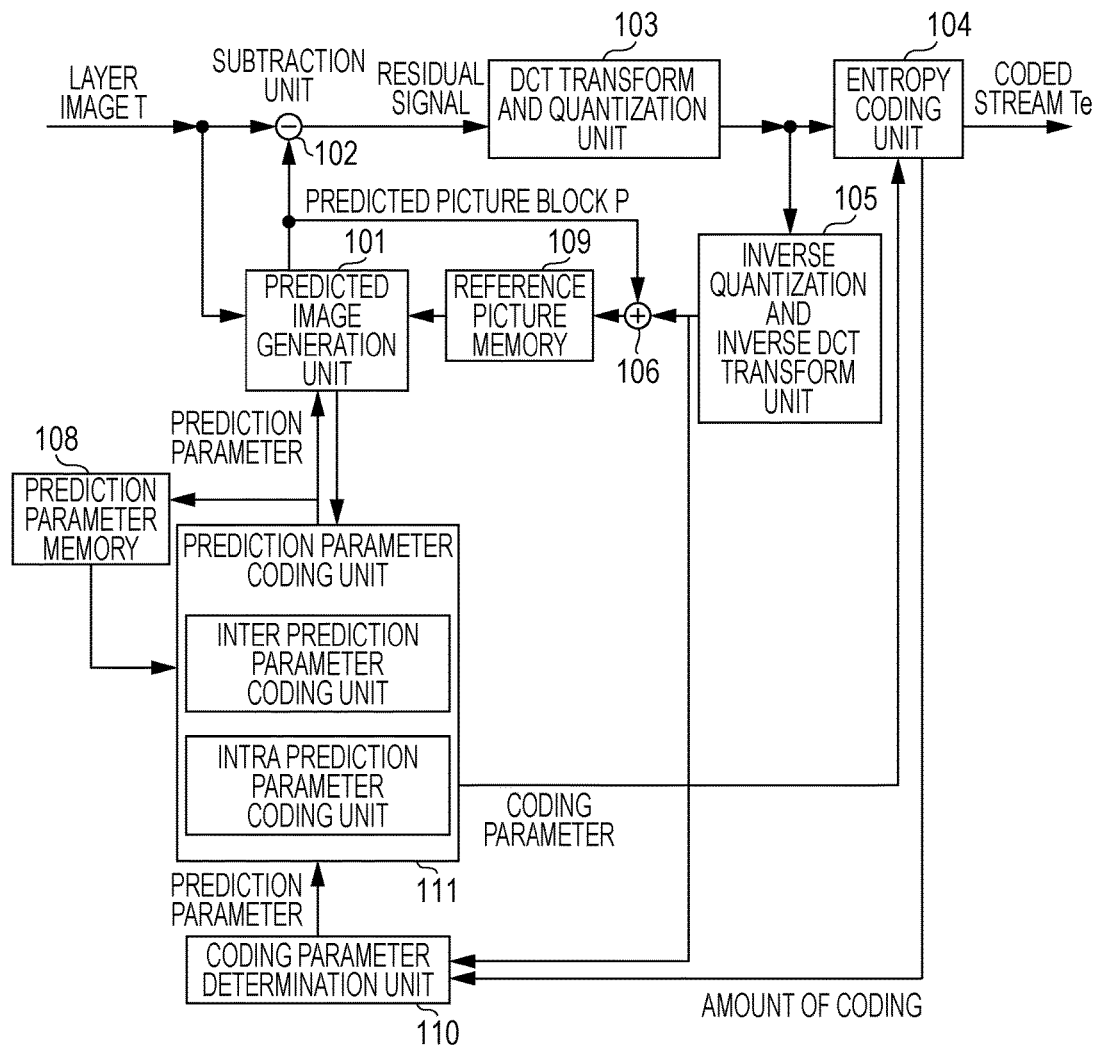
FIG. 19 is a block diagram illustrating a configuration of an image coding device according to the present embodiment.

Next, a configuration of the image coding device 11 according to the present embodiment will be described. FIG. 19 is a block diagram illustrating a configuration of the image coding device 11 according to the present embodiment. The image coding device 11 is configured to include a predicted image generation unit 101, a subtraction unit 102, a DCT and quantization unit 103, an entropy coding unit 104, an inverse quantization and inverse DCT unit 105, an addition unit 106, a prediction parameter memory (prediction parameter storage unit or frame memory) 108, a reference picture memory (reference image storage unit or frame memory) 109, a coding parameter determination unit 110, and a prediction parameter coding unit 111. The prediction parameter coding unit 111 is configured to include an inter prediction parameter coding unit 112 and an intra prediction parameter coding unit 113.

The predicted image generation unit 101, for each picture for each viewpoint of a layer image T that is externally input, generates the predicted picture block predSamples for each block that is a region split from the picture. The predicted image generation unit 101 reads a reference picture block from the reference picture memory 109 on the basis of a prediction parameter input from the prediction parameter coding unit 111. The prediction parameter input from the prediction parameter coding unit 111 is, for example, a motion vector or a disparity vector. The predicted image generation unit 101 reads a reference picture block of a block that is present at a position indicated by the predicted motion vector or the disparity vector from the coded prediction unit as a starting point. The predicted image generation unit 101 uses one prediction scheme of a plurality of prediction schemes for the read reference picture block to generate the predicted picture block predSamples. The predicted image generation unit 101 outputs the generated predicted picture block predSamples to the subtraction unit 102 and the addition unit 106. The predicted image generation unit 101 operates in the same manner as the predicted image generation unit 308 described previously, and thus, details of generation of the predicted picture block predSamples will be omitted.

The predicted image generation unit 101, in order to select a prediction scheme, for example, selects a prediction scheme that minimizes an error value that is based on the difference between the signal value for each pixel of the blocks included in the layer image and the signal value for each pixel corresponding to the predicted picture block predSamples. A method for selecting a prediction scheme is not limited thereto.

In a case where a picture of a coding target is a picture of the base view, the plurality of prediction schemes include intra prediction, motion prediction, and the merge mode. Motion prediction is a type of inter prediction described above that is performed between display times. The merge mode is prediction that uses the same reference picture block and prediction parameters as a block which is previously coded and is present within a predetermined range from the prediction unit. In a case where a picture of the coding target is a picture of other than the base view, the plurality of prediction schemes include intra prediction, motion prediction, the merge mode (includes view synthesis prediction), and disparity prediction. Disparity prediction (parallax prediction) is a type of inter prediction described above that is performed between different layer images (different viewpoint images). Types of disparity prediction (parallax prediction) include prediction in a case of performing additional prediction (residual prediction and illuminance compensation) and prediction in a case of not performing additional prediction.

The predicted image generation unit 101, in a case where intra prediction is selected, outputs the prediction mode PredMode which indicates the intra prediction mode used upon generating the predicted picture block predSamples to the prediction parameter coding unit 111.

The predicted image generation unit 101, in a case where motion prediction is selected, stores the motion vector mvLX which is used upon generating the predicted picture block predSamples in the prediction parameter memory 108 and outputs the motion vector mvLX to the inter prediction parameter coding unit 112. The motion vector mvLX represents a vector from the position of the coded prediction unit to the position of the reference picture block upon generating the predicted picture block predSamples. Information that indicates the motion vector mvLX may include information indicating a reference picture (for example, the reference picture index refIdxLX and the picture order count POC) and may represent prediction parameters. The predicted image generation unit 101 also outputs the prediction mode PredMode which indicates the inter prediction mode to the prediction parameter coding unit 111.

The predicted image generation unit 101, in a case where disparity prediction is selected, stores a disparity vector that is used upon generating the predicted picture block predSamples in the prediction parameter memory 108 and outputs the disparity vector to the inter prediction parameter coding unit 112. A disparity vector dvLX represents a vector from the position of the coded prediction unit to the position of the reference picture block upon generating the predicted picture block predSamples. Information that indicates the disparity vector dvLX may include information indicating a reference picture (for example, the reference picture index refIdxLX and a view ID view_id) and may represent prediction parameters. The predicted image generation unit 101 also outputs the prediction mode PredMode which indicates the inter prediction mode to the prediction parameter coding unit 111.

The predicted image generation unit 101, in a case where the merge mode is selected, outputs the merge index merge_idx which indicates a selected reference picture block to the inter prediction parameter coding unit 112. In addition, the predicted image generation unit 101 outputs the prediction mode PredMode which indicates the merge mode to the prediction parameter coding unit 111.

In the merge mode, the predicted image generation unit 101, in a case where the VSP mode flag VspModeFlag indicates that view synthesis prediction is performed, performs view synthesis prediction in the view synthesis prediction unit 3094 included in the predicted image generation unit 101 as described previously. In motion prediction, disparity prediction, and the merge mode, the predicted image generation unit 101, in a case where the residual prediction execution flag resPredFlag indicates that residual prediction is performed, performs residual prediction in the residual prediction unit 3092 included in the predicted image generation unit 101 as described previously.

The subtraction unit 102 subtracts the signal value of the predicted picture block predSamples input from the predicted image generation unit 101 from the signal value of the corresponding block of the externally input layer image T for each pixel to generate a residual signal. The subtraction unit 102 outputs the generated residual signal to the DCT and quantization unit 103 and the coding parameter determination unit 110.

The DCT and quantization unit 103 performs DCT of the residual signal input from the subtraction unit 102 and calculates the DCT coefficient. The DCT and quantization unit 103 obtains the quantized coefficient by quantizing the calculated DCT coefficient. The DCT and quantization unit 103 outputs the obtained quantized coefficient to the entropy coding unit 104 and the inverse quantization and inverse DCT unit 105.

The entropy coding unit 104 receives input of the quantized coefficient from the DCT and quantization unit 103 and coding parameters from the coding parameter determination unit 110. The input coding parameters include codes such as the reference picture index refIdxLX, the predicted vector flag mvp_LX_flag, the difference vector mvdLX, the prediction mode PredMode, the merge index merge_idx, the residual prediction index iv_res_pred_weight_idx, and the illuminance compensation flag ic_flag.

The entropy coding unit 104 performs entropy coding of the input quantized coefficient and the coding parameters to generate the coded stream Te and outputs the generated coded stream Te.

The inverse quantization and inverse DCT unit 105 performs inverse quantization of the quantized coefficient input from the DCT and quantization unit 103 and obtains the DCT coefficient. The inverse quantization and inverse DCT unit 105 performs inverse DCT of the obtained DCT coefficient and calculates a decoded residual signal. The inverse quantization and inverse DCT unit 105 outputs the calculated decoded residual signal to the addition unit 106 and the coding parameter determination unit 110.

The addition unit 106 adds the signal value of the predicted picture block predSamples input from the predicted image generation unit 101 and the signal value of the decoded residual signal input from the inverse quantization and inverse DCT unit 105 for each pixel to generate a reference picture block. The addition unit 106 stores the generated reference picture block in the reference picture memory 109.

The prediction parameter memory 108 stores prediction parameters generated by the prediction parameter coding unit 111 at predetermined positions for each picture and each block of the coding target.

The reference picture memory 109 stores the reference picture block generated by the addition unit 106 at a predetermined position for each picture and each block of the coding target.

The coding parameter determination unit 110 selects one set from a plurality of sets of coding parameters. Coding parameters are prediction parameters described above and parameters that are coding targets generated in relation to the prediction parameters. The predicted image generation unit 101 generates the predicted picture block predSamples using each set of the coding parameters.

The coding parameter determination unit 110 calculates a cost value that indicates the magnitude of the amount of information and a coding error for each of the plurality of sets. The cost value is, for example, the sum of a code amount and the value obtained by multiplying a squared error by a coefficient λ. The code amount is the amount of information of the coded stream Te that is obtained by performing entropy coding of a quantization error and the coding parameters. The squared error is the total sum of the squared value of the residual value of the residual signal calculated in the subtraction unit 102 between pixels. The coefficient λ is a real number greater than zero that is set in advance. The coding parameter determination unit 110 selects a set of coding parameters for which the calculated cost value is the minimum. Accordingly, the entropy coding unit 104 outputs the selected set of coding parameters as the coded stream Te and does not output the other sets of coding parameters that are not selected.

The prediction parameter coding unit 111 derives prediction parameters used upon generating the predicted picture on the basis of parameters input from the predicted image generation unit 101 and codes the derived prediction parameters to generate sets of coding parameters. The prediction parameter coding unit 111 outputs the generated sets of coding parameters to the entropy coding unit 104.

The prediction parameter coding unit 111 stores prediction parameters corresponding to those selected by the coding parameter determination unit 110 from the generated sets of coding parameters in the prediction parameter memory 108.

The prediction parameter coding unit 111 operates the inter prediction parameter coding unit 112 in a case where the prediction mode PredMode input from the predicted image generation unit 101 indicates the inter prediction mode. The prediction parameter coding unit 111 operates the intra prediction parameter coding unit 113 in a case where the prediction mode PredMode indicates the intra prediction mode.

The inter prediction parameter coding unit 112 derives the inter prediction parameters on the basis of the prediction parameters input from the coding parameter determination unit 110. The inter prediction parameter coding unit 112, as a configuration that derives the inter prediction parameters, includes the same configuration as the configuration that the inter prediction parameter decoding unit 303 (refer to FIG. 5 and the like) includes to derive the inter prediction parameters. A configuration of the inter prediction parameter coding unit 112 will be described later.

The intra prediction parameter coding unit 113 determines the intra prediction mode IntraPredMode indicated by the prediction mode PredMode input from the coding parameter determination unit 110 as a set of inter prediction parameters.

(Configuration of Inter Prediction Parameter Coding Unit)

Figure 20:
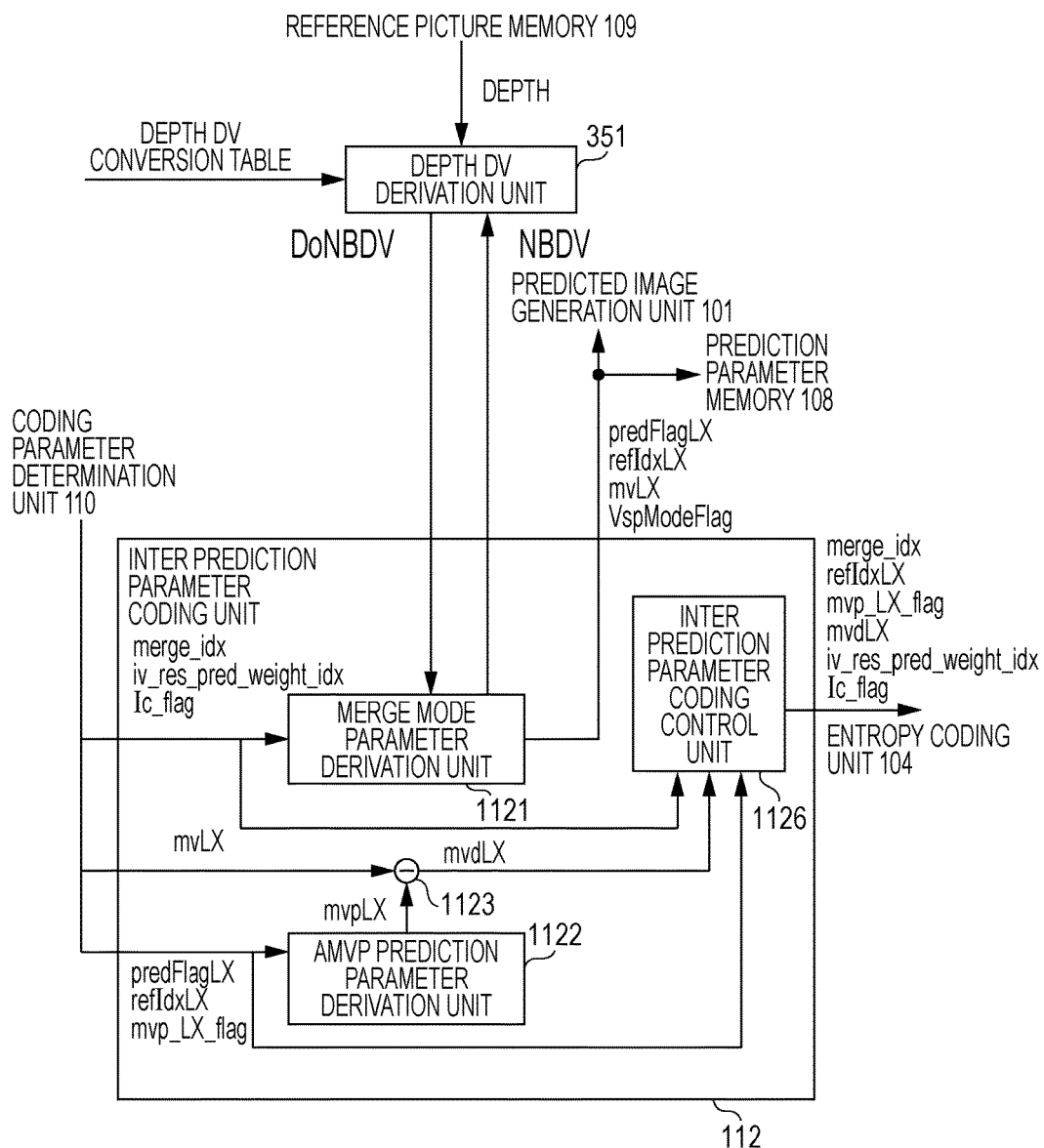
FIG. 20 is a schematic diagram illustrating a configuration of an inter prediction parameter coding unit according to the present embodiment.

Next, a configuration of the inter prediction parameter coding unit 112 will be described. The inter prediction parameter coding unit 112 is means that corresponds to the inter prediction parameter decoding unit 303. FIG. 20 is a schematic diagram illustrating a configuration of the inter prediction parameter coding unit 112 according to the present embodiment. The inter prediction parameter coding unit 112 is configured to include a merge mode parameter derivation unit 1121, an AMVP prediction parameter derivation unit 1122, a subtraction unit 1123, and an inter prediction parameter coding control unit 1126.

The merge mode parameter derivation unit 1121 has the same configuration as the merge mode parameter derivation unit 3036 (refer to FIG. 7) described above.

The AMVP prediction parameter derivation unit 1122 has the same configuration as the AMVP prediction parameter derivation unit 3032 (refer to FIG. 8) described above.

The subtraction unit 1123 subtracts the predicted vector mvpLX input from the AMVP prediction parameter derivation unit 1122 from the vector mvLX input from the coding parameter determination unit 110 to generate the difference vector mvdLX. The difference vector mvdLX is output to the inter prediction parameter coding control unit 1126.

The inter prediction parameter coding control unit 1126 instructs the entropy coding unit 104 to decode codes (syntax elements) related to inter prediction and codes the codes (syntax elements) included in the coded data, such as the partition mode part_mode, the merge flag merge_flag, the merge index merge_idx, the inter prediction flag inter_pred_idc, the reference picture index refIdxLX, the predicted vector flag mvp_LX_flag, and the difference vector mvdLX.

The inter prediction parameter coding control unit 1126 is configured to include a residual prediction index coding unit

10311, an illuminance compensation flag coding unit 10312, a merge index coding unit, a vector candidate index coding unit, a partition mode coding unit, a merge flag coding unit, an inter prediction flag coding unit, a reference picture index coding unit, and a vector difference coding unit. The partition mode coding unit, the merge flag coding unit, the merge index coding unit, the inter prediction flag coding unit, the reference picture index coding unit, the vector candidate index coding unit, and the vector difference coding unit respectively code the partition mode part_mode, the merge flag merge_flag, the merge index merge_idx, the inter prediction flag inter_pred_idc, the reference picture index refIdxLX, the predicted vector flag mvp_LX_flag, and the difference vector mvdLX.

The residual prediction index coding unit 10311 codes the residual prediction index iv_res_pred_weight_idx in order to indicate whether or not residual prediction is performed.

The illuminance compensation flag coding unit 10312 codes the illuminance compensation flag ic_flag in order to indicate whether or not illuminance compensation is performed.

The inter prediction parameter coding control unit 1126, in a case where the prediction mode PredMode input from the predicted image generation unit 101 indicates the merge mode, outputs the merge index merge_idx input from the coding parameter determination unit 110 to the entropy coding unit 104, and the merge index merge_idx is coded.

The inter prediction parameter coding control unit 1126 performs the following process in a case where the prediction mode PredMode input from the predicted image generation unit 101 indicates the inter prediction mode.

The inter prediction parameter coding control unit 1126 combines the reference picture index refIdxLX and the predicted vector flag mvp_LX_flag input from the coding parameter determination unit 110 with the difference vector mvdLX input from the subtraction unit 1123. The inter prediction parameter coding control unit 1126 outputs the combined codes to the entropy coding unit 104, and the combined codes are coded.

The predicted image generation unit 101 is means that corresponds to the predicted image generation unit 308 described above and performs the same process of generating a predicted image from prediction parameters.

In the present embodiment, the predicted image generation unit 101, in the same manner as the predicted image generation unit 308, includes the residual synthesis unit 30923 described above. That is, residual prediction is not performed in a case where the size of the target block (prediction block) is less than or equal to a predetermined size. The predicted image generation unit 101 of the present embodiment performs residual prediction only in a case where the partition mode part_mode of the coding unit CU is 2N×2N. That is, processing is performed with the residual prediction index iv_res_pred_weight_idx set to 0. In the residual prediction index coding unit 10311 of the present embodiment, the residual prediction index iv_res_pred_weight_idx is coded only in a case where the partition mode part_mode of the coding unit CU is 2N×2N.

That is, according to the image coding device that includes the residual prediction index coding unit 10311 and the residual synthesis unit 30923, the effect of reducing the amount of processing is achieved by not performing residual prediction for chroma components in the prediction unit (8×8) that is the minimum unit for applying residual prediction.

In another aspect of the present embodiment, the predicted image generation unit 308 may include the residual prediction unit 3092B. According to the image coding device that includes the residual prediction unit 3092B, the effect of reducing the amount of processing is achieved because a residual is not derived in a small block (in particular, a chroma block in a case where the luma block size is less than or equal to 8). Furthermore, according to the residual prediction unit 3092B, performance degradation accompanied by not deriving a residual in a small block is complemented by improving the accuracy of the disparity vector of the target block using mvT which is the vector of the prediction unit on a picture at a location indicated by the vector mvLX of the target block in a case where motion prediction is performed for the target prediction unit (in a case where the inter-view prediction flag ivRefFlag is equal to 0).

In still another aspect of the present embodiment, the predicted image generation unit 308 may include the residual prediction unit 3092C. As described previously, the residual prediction unit 3092C, for the target block having a luma component, splits the target block into sub-blocks of a predetermined size and performs a residual prediction process for each sub-block and, for chroma components, performs a residual prediction process with the original size of the target block without splitting the target block into sub-blocks. Accordingly, even in a case of omitting a residual prediction process for chroma components according to the block size, the effect of improving coding efficiency is achieved by finely assigning motion vectors in sub-block splitting. In addition, the effect of reducing the amount of processing is achieved by performing a residual prediction process for chroma components according to the block size. Furthermore, since processing in a chroma component is not performed in units of sub-blocks in the residual prediction unit, an increase in the amount of processing accompanied by processing in units of sub-blocks can be suppressed to the minimum extent.

The image coding device that includes the residual prediction unit 3092, the residual prediction unit 3092B, and the residual prediction unit 3092C codes the residual prediction index in a case where the partition mode of the coding unit including the target target block is 2N×2N in the image coding device that includes the residual prediction index coding unit which codes the residual prediction index and otherwise does not code the residual prediction index and performs residual prediction in a case where the residual prediction index is equal to other than zero.

A part of the image coding device 11 and the image decoding device 31 in the above embodiment, for example, the entropy decoding unit 301, the prediction parameter decoding unit 302, the predicted image generation unit 101, the DCT and quantization unit 103, the entropy coding unit 104, the inverse quantization and inverse DCT unit 105, the coding parameter determination unit 110, the prediction parameter coding unit 111, the entropy decoding unit 301, the prediction parameter decoding unit 302, the predicted image generation unit 308, and the inverse quantization and inverse DCT unit 311, may be realized by a computer. In that case, the part may be realized by recording a program for realizing a control function for the part in a computer-readable recording medium, reading the program recorded in the recording medium into a computer system, and executing the program. The term "computer system" referred hereto is a computer system that is incorporated into any of the image coding device 11 and the image decoding device 31 and includes an OS and hardware such as a peripheral device. The term "computer-readable recording medium" refers to a portable medium such as a flexible disk, a magneto-optical disc, a ROM, or a CD-ROM or a storage device such as a hard disk that is incorporated into the computer system. The term "computer-readable recording medium" may further include a type that dynamically retains a program for a short amount of time, such as a communication line in a case of transmitting a program through a network such as the Internet or through a communication line such as a telephone line, and a type that retains a program for a certain amount of time, such as a volatile memory in the computer system that serves as a server or a client in that case. The program may be a program for realizing a part of the above function or may be a program capable of realizing the above function in combination with a program that is previously recorded in the computer system.

A part or the entirety of the image coding device 11 and the image decoding device 31 in the above embodiment may be realized as an integrated circuit such as large-scale integration (LSI). Each functional block of the image coding device 11 and the image decoding device 31 may be configured as an individual processor or may be configured as a processor by integrating a part or the entirety thereof. A technique for circuit integration is not limited to LSI and may be realized by a dedicated circuit or a general-purpose processor. In a case where a technology for circuit integration that replaces LSI emerges by advances in semiconductor technologies, circuit integration realized by the technology may be used.

While one embodiment of this invention is described heretofore in detail with reference to the drawings, a specific configuration thereof is not limited to that described above, and various design modifications and the like can be carried out to the extent not departing from the gist of this invention.

CONCLUSION

One aspect of the present invention is a residual prediction device characterized by including a reference image interpolation unit that derives two residual prediction motion-compensated images of rpSamples and rpRefSamples and a residual synthesis unit that derives a residual from the difference between the two residual prediction motion-compensated images and derives a residual compensation predicted image by adding the residual to a motion-compensated image, in which the residual synthesis unit derives a predicted image by adding the residual to the motion-compensated image in a case where a target block is greater than a predetermined size, derives the motion-compensated image as a predicted image in a case where the target block is smaller than or equal to a predetermined size, and furthermore, derives mvT that is a vector of a prediction unit on a picture at a location indicated by the vector mvLX of the target block as the residual prediction vector mvRP in a case where disparity prediction is not performed for the target block (in a case where ivRefFlag is equal to 0), and derives the residual prediction motion-compensated image rpSamples derived from a block at a location indicated by the disparity vector mvDisp and the residual prediction motion-compensated image rpRefSamples derived from a block at a location indicated by a vector of the sum of the disparity vector mvDisp and the vector mvRP.

One aspect of the present invention is characterized in that the residual prediction device derives, as the residual prediction vector mvRP, mvT if mvT that is a vector of a prediction unit on a picture at a location indicated by the vector mvLX of the target block exists as a disparity vector and the disparity vector mvDisp of the target block if mvT does not exist as a disparity vector in a case where the sub-block motion compensation flag subPbMotionFlag is equal to 1 and disparity prediction is not performed for the target block (in a case where ivRefFlag is equal to 0) and derives the residual prediction motion-compensated image rpSamples and the residual prediction motion-compensated image rpRefSamples.

One aspect of the present invention is characterized in that the residual synthesis unit, furthermore, derives the residual prediction motion-compensated image rpSamples and the residual prediction motion-compensated image rpRefSamples in a case where the target block is greater than the predetermined size and otherwise does not derive the residual prediction motion-compensated image rpSamples and the residual prediction motion-compensated image rpRefSamples.

One aspect of the present invention is a residual prediction device characterized by including a reference image interpolation unit that derives two residual prediction motion-compensated images of rpSamples and rpRefSamples and a residual synthesis unit that derives a residual from the difference between the two residual prediction motion-compensated images and derives a residual compensation predicted image by adding the residual to a motion-compensated image, in which the residual prediction device splits a luma block of a target block into split blocks of a predetermined size, derives the motion-compensated image and the two residual prediction motion-compensated images in units of the split blocks, and derives the residual compensation predicted image as a predicted image in a case where the target block is a luma block, derives a residual compensation predicted image from the two residual prediction motion-compensated images in units of the target blocks in a case where the target block is a chroma block, derives the residual compensation predicted image as a predicted image in a case where the target block is greater than a predetermined size, and derives the motion-compensated image as a predicted image in a case where the target block is smaller than or equal to a predetermined size.

One aspect of the present invention is characterized in that the residual prediction device derives mvT that is a vector of a prediction unit on a picture at a location indicated by the vector mvLX of the target block as the residual prediction vector mvRP in a case where disparity prediction is not performed for the target block (in a case where ivRefFlag is equal to 0) and derives the residual prediction motion-compensated image rpSamples derived from a block at a location indicated by the disparity vector mvDisp and the residual prediction motion-compensated image rpRefSamples derived from a block at a location indicated by a vector of the sum of the disparity vector mvDisp and the vector mvRP.

One aspect of the present invention is characterized in that the predetermined size is the width of a luma block size and is equal to 8, the residual prediction motion-compensated image rpSamples and the residual prediction motion-compensated image rpRefSamples are derived for chroma components in a case where the luma block size of the target block is greater than 8, and otherwise the residual prediction motion-compensated image rpSamples and the residual prediction motion-compensated image rpRefSamples are not derived for chroma components.

One aspect of the present invention is an image decoding device characterized by including a residual prediction index decoding unit that decodes a residual prediction index, in which a residual prediction index decoding unit that decodes the residual prediction index in a case where a partition mode of a coding unit including a target block is 2N×2N and otherwise sets the residual prediction index to 0 is included, furthermore, the residual prediction device is included, and residual prediction is performed in the residual prediction device in a case where the residual prediction index is equal to other than zero.

One aspect of the present invention is an image coding device characterized by including a residual prediction index coding unit that codes a residual prediction index, in which a residual prediction index coding unit that codes the residual prediction index in a case where a partition mode of a coding unit including a target block is 2N×2N and otherwise does not code the residual prediction index is included, furthermore, the residual prediction device is included, and residual prediction is performed in the residual prediction device in a case where the residual prediction index is equal to other than zero.

INDUSTRIAL APPLICABILITY

The present invention can be preferably applied to an image decoding device that decodes coded data in which image data is coded and to an image coding device that generates coded data in which image data is coded. In addition, the present invention can be preferably applied to a data structure of coded data that is generated by the image coding device and is referenced by the image decoding device.

REFERENCE SIGNS LIST

1 IMAGE TRANSMISSION SYSTEM
11 IMAGE CODING DEVICE
101 PREDICTED IMAGE GENERATION UNIT
102 SUBTRACTION UNIT
103 DCT AND QUANTIZATION UNIT
10311 RESIDUAL PREDICTION INDEX CODING UNIT
10312 ILLUMINANCE COMPENSATION FLAG CODING UNIT
104 ENTROPY CODING UNIT
105 INVERSE QUANTIZATION AND INVERSE DCT UNIT
106 ADDITION UNIT
108 PREDICTION PARAMETER MEMORY (FRAME MEMORY)
109 REFERENCE PICTURE MEMORY (FRAME MEMORY)
110 CODING PARAMETER DETERMINATION UNIT
111 PREDICTION PARAMETER CODING UNIT
112 INTER PREDICTION PARAMETER CODING UNIT
1121 MERGE MODE PARAMETER DERIVATION UNIT
1122 AMVP PREDICTION PARAMETER DERIVATION UNIT
1123 SUBTRACTION UNIT
1126 INTER PREDICTION PARAMETER CODING CONTROL UNIT
113 INTRA PREDICTION PARAMETER CODING UNIT
21 NETWORK
31 IMAGE DECODING DEVICE
301 ENTROPY DECODING UNIT
302 PREDICTION PARAMETER DECODING UNIT
303 INTER PREDICTION PARAMETER DECODING UNIT
3031 INTER PREDICTION PARAMETER DECODING CONTROL UNIT
30311 RESIDUAL PREDICTION INDEX DECODING UNIT
30312 ILLUMINANCE COMPENSATION FLAG DECODING UNIT
3032 AMVP PREDICTION PARAMETER DERIVATION UNIT
3035 ADDITION UNIT
3036 MERGE MODE PARAMETER DERIVATION UNIT
30361 MERGE CANDIDATE DERIVATION UNIT
303611 MERGE CANDIDATE STORAGE UNIT
303612 ENHANCEMENT MERGE CANDIDATE DERIVATION UNIT
3036121 INTER-LAYER MERGE CANDIDATE DERIVATION UNIT
3036123 DISPARITY MERGE CANDIDATE DERIVATION UNIT
3036124 VSP MERGE CANDIDATE DERIVATION UNIT
303613 BASE MERGE CANDIDATE DERIVATION UNIT
3036131 SPATIAL MERGE CANDIDATE DERIVATION UNIT
3036132 TEMPORAL MERGE CANDIDATE DERIVATION UNIT
3036133 COMBINED MERGE CANDIDATE DERIVATION UNIT
3036134 ZERO MERGE CANDIDATE DERIVATION UNIT
30362 MERGE CANDIDATE SELECTION UNIT
30363 DISPARITY VECTOR DERIVATION UNIT
304 INTRA PREDICTION PARAMETER DECODING UNIT
306 REFERENCE PICTURE MEMORY (FRAME MEMORY)
307 PREDICTION PARAMETER MEMORY (FRAME MEMORY)
308 PREDICTED IMAGE GENERATION UNIT
309 INTER PREDICTION IMAGE GENERATION UNIT
3091 MOTION DISPARITY COMPENSATION UNIT
3092 RESIDUAL PREDICTION UNIT
3092B RESIDUAL PREDICTION UNIT
3092C RESIDUAL PREDICTION UNIT
30922 REFERENCE IMAGE INTERPOLATION UNIT
30922C REFERENCE IMAGE INTERPOLATION UNIT
30923 RESIDUAL SYNTHESIS UNIT
30923C RESIDUAL SYNTHESIS UNIT
30924 RESIDUAL PREDICTION VECTOR DERIVATION UNIT
3093 ILLUMINANCE COMPENSATION UNIT
3094 VIEW SYNTHESIS PREDICTION UNIT
30941 PARALLAX ARRAY DERIVATION UNIT
30942 REFERENCE IMAGE INTERPOLATION UNIT
310 INTRA PREDICTION IMAGE GENERATION UNIT
311 INVERSE QUANTIZATION AND INVERSE DCT UNIT
312 ADDITION UNIT
351 DEPTH DV DERIVATION UNIT
41 IMAGE DISPLAY DEVICE

The invention claimed is:

1. A residual prediction device comprising:
reference image interpolation circuitry that derives two motion-compensated images for residual prediction; and
residual synthesis circuitry that derives a residual using a difference between the two motion-compensated images and derives a residual compensation predicted image by adding the residual to a motion compensated image,
wherein the residual synthesis circuitry derives the residual compensation predicted image by adding the residual to the motion-compensated image in a case where color components of a target block are chroma components and a width of a prediction block is greater than 8, and derives the residual compensation predicted image from the motion compensated image in a case where the color components of the target block are the chroma components and the width of the prediction block is less than or equal to 8.

2. The residual prediction device according to claim 1,
wherein the residual synthesis circuitry derives the residual compensation predicted image by adding the residual to the motion-compensated image in a case where a color component of the target block is a luma component.

3. The residual prediction device according to claim 1,
wherein the reference image interpolation circuitry generates the motion compensated image and the residual compensation predicted image using bilinear interpolation.

4. An image decoding device comprising:
residual prediction index decoding circuitry that decodes a residual prediction index; and
the residual prediction device according to claim 1,
wherein the residual prediction index decoding circuitry decodes the residual prediction index in a case where a partition mode of a coding unit including the target block is 2N×2N and otherwise infers the value of the residual prediction index to be equal to 0.

5. An image encoding device comprising:
residual prediction index encoding circuitry that encodes a residual prediction index; and
the residual prediction device according to claim 1,
wherein the residual prediction index encoding circuitry encodes the residual prediction index in a case where a partition mode of a coding unit including the target block is 2N×2N and otherwise infers the value of the residual prediction index to be equal to 0.

6. An image decoding device comprising:
residual prediction index decoding circuitry that decodes a residual prediction index; and
the residual prediction device according to claim 3,
wherein the residual prediction index decoding circuitry decodes the residual prediction index in a case where a partition mode of a coding unit including the target block is 2N×2N and otherwise infers the value of the residual prediction index to be equal to 0.

7. An image encoding device comprising:
residual prediction index encoding circuitry that encodes a residual prediction index; and
the residual prediction device according to claim 3,
wherein the residual prediction index encoding circuitry encodes the residual prediction index in a case where a partition mode of a coding unit including the target block is 2N×2N and otherwise infers the value of the residual prediction index to be equal to 0.

* * * * *